(12) United States Patent
Katz et al.

(10) Patent No.: US 11,380,169 B2
(45) Date of Patent: Jul. 5, 2022

(54) SYSTEM FOR PRIZING REMOTE USERS USING REAL LIFE SPORTS PERSONALITIES

(71) Applicant: Milestone Entertainment, LLC, Beverly Hills, CA (US)

(72) Inventors: Randall M. Katz, Beverly Hills, CA (US); Gary Dawson, Thousand Oaks, CA (US)

(73) Assignee: MILESTONE ENTERTAINMENT LLC, Beverly Hills, CA (US)

( * ) Notice: Subject to any disclaimer, the term of this patent is extended or adjusted under 35 U.S.C. 154(b) by 0 days.

(21) Appl. No.: 17/531,109

(22) Filed: Nov. 19, 2021

(65) Prior Publication Data

US 2022/0076524 A1   Mar. 10, 2022

Related U.S. Application Data

(63) Continuation of application No. 17/180,025, filed on Feb. 19, 2021, now Pat. No. 11,183,030, which is a
(Continued)

(51) Int. Cl.
*G07F 17/32* (2006.01)
*A63F 13/86* (2014.01)
(Continued)

(52) U.S. Cl.
CPC .......... *G07F 17/329* (2013.01); *A63F 13/355* (2014.09); *A63F 13/655* (2014.09);
(Continued)

(58) Field of Classification Search
None
See application file for complete search history.

(56) References Cited

U.S. PATENT DOCUMENTS 3,825,255 A   7/1974  Kennard et al.
3,873,092 A   3/1975  Fagan
(Continued)

FOREIGN PATENT DOCUMENTS

CA   2085460 C   2/1997

OTHER PUBLICATIONS

IGDA International Game Developers Association, IGDA Online Games White Paper Full Version, Presented at the Game Developers Conference 2002, 68 pages.
(Continued)

*Primary Examiner* — Damon J Pierce
(74) *Attorney, Agent, or Firm* — David B Murphy

(57) ABSTRACT

Systems, methods and apparatus for game play using virtual players, sometimes referred to herein as vBots, where they may have images including those of real world personalities, such as sports personalities, is disclosed. In one aspect, a system for electronic game play involves the use of the system wherein one or more virtual players are displayed to the player of the game, preferably, the virtual players have differing play characteristics, receiving from the user association with a selection of a virtual player, displaying a simulated game using the virtual players, identifying a subset of the virtual players as being winners of the simulated game, and awarding a win to the lottery user if the selected virtual player is in the subset of virtual players. In one aspect, a team may be formed in which real life sports personalities images are utilized.

30 Claims, 26 Drawing Sheets

Related U.S. Application Data continuation of application No. 16/832,502, filed on Mar. 27, 2020, now Pat. No. 10,930,118, which is a continuation of application No. 16/394,613, filed on Apr. 25, 2019, now Pat. No. 10,614,672, which is a continuation of application No. 15/946,494, filed on Apr. 5, 2018, now Pat. No. 10,275,994, which is a continuation of application No. 14/281,435, filed on May 19, 2014, now Pat. No. 9,940,792, which is a continuation of application No. 11/294,683, filed on Dec. 5, 2005, now Pat. No. 8,727,853.

(51) Int. Cl.
    *A63F 13/655* (2014.01)
    *A63F 13/355* (2014.01)
    *A63F 13/40* (2014.01)
    *A63F 13/828* (2014.01)
    *A63F 13/80* (2014.01)

(52) U.S. Cl.
    CPC .............. *A63F 13/86* (2014.09); *G07F 17/32* (2013.01); *G07F 17/3276* (2013.01); *G07F 17/3286* (2013.01); *A63F 13/40* (2014.09); *A63F 13/80* (2014.09); *A63F 13/828* (2014.09)

(56) References Cited

U.S. PATENT DOCUMENTS

| | | |
|---|---|---|
| 4,348,027 A | 9/1982 | Escamilla-Kelly |
| 4,582,324 A | 4/1986 | Koza et al. |
| 4,772,025 A | 9/1988 | James et al. |
| 4,836,546 A | 6/1989 | DiRe et al. |
| 4,856,787 A | 8/1989 | Itkis |
| 4,883,278 A | 11/1989 | Scott |
| 4,943,090 A | 7/1990 | Fienberg |
| 5,035,422 A | 7/1991 | Berman |
| 5,046,737 A | 9/1991 | Fienberg |
| 5,074,566 A | 12/1991 | Desbiens |
| 5,112,050 A | 5/1992 | Koza et al. |
| 5,116,049 A | 5/1992 | Sludikoff et al. |
| 5,119,295 A | 6/1992 | Kapur |
| 5,157,602 A | 10/1992 | Fields et al. |
| 5,158,293 A | 10/1992 | Mullins |
| 5,256,863 A | 10/1993 | Ferguson et al. |
| 5,269,521 A | 12/1993 | Rossides |
| 5,271,626 A | 12/1993 | Llenas et al. |
| 5,317,135 A | 5/1994 | Finnocchio |
| 5,327,485 A | 7/1994 | Leaden |
| 5,407,199 A | 4/1995 | Gumina |
| 5,409,225 A | 4/1995 | Kelly et al. |
| 5,409,234 A | 4/1995 | Bechter |
| 5,417,424 A | 5/1995 | Snowden et al. |
| 5,472,196 A | 12/1995 | Rusnak |
| 5,475,205 A | 12/1995 | Behm et al. |
| 5,499,816 A | 3/1996 | Levy |
| 5,513,852 A | 5/1996 | Robinson |
| 5,518,253 A | 5/1996 | Pocock et al. |
| 5,569,082 A | 10/1996 | Kaye |
| 5,569,512 A | 10/1996 | Brawner et al. |
| 5,586,937 A | 12/1996 | Menashe |
| 5,620,182 A | 4/1997 | Rossides |
| 5,628,684 A | 5/1997 | Bouedec |
| 5,643,088 A | 7/1997 | Vaughn et al. |
| 5,651,735 A | 7/1997 | Baba |
| 5,655,961 A | 8/1997 | Acres et al. |
| 5,685,541 A | 11/1997 | Lovell, Sr. |
| D387,390 S | 12/1997 | Seiler |
| 5,697,844 A | 12/1997 | Von Kohorn |
| 5,709,603 A | 1/1998 | Kaye |
| 5,721,583 A | 2/1998 | Harada et al. |
| 5,772,510 A | 6/1998 | Roberts |
| 5,772,511 A | 6/1998 | Smeltzer |
| 5,779,549 A | 7/1998 | Walker et al. |
| 5,785,315 A | 7/1998 | Eiteneer et al. |
| 5,791,990 A | 8/1998 | Schroeder et al. |
| 5,795,228 A | 8/1998 | Trumball et al. |
| 5,813,913 A | 9/1998 | Berner et al. |
| 5,816,575 A | 10/1998 | Keller |
| 5,816,918 A | 10/1998 | Kelly et al. |
| 5,842,921 A | 12/1998 | Mindes et al. |
| 5,855,514 A | 1/1999 | Kamille |
| 5,857,175 A | 1/1999 | Day et al. |
| 5,871,398 A | 2/1999 | Schneier et al. |
| 5,909,875 A | 6/1999 | Weingardt |
| 5,916,024 A | 6/1999 | Von Kohorn |
| 5,931,467 A | 8/1999 | Kamille |
| 5,934,671 A | 8/1999 | Harrison |
| 5,935,001 A | 8/1999 | Baba |
| 5,936,661 A | 8/1999 | Trew |
| 5,937,380 A | 8/1999 | Segan |
| 5,949,042 A | 9/1999 | Dietz, II et al. |
| 5,971,855 A | 10/1999 | Ng et al. |
| 6,012,983 A | 1/2000 | Walker et al. |
| 6,015,344 A | 1/2000 | Kelly et al. |
| D420,057 S | 2/2000 | Colombo |
| 6,024,640 A | 2/2000 | Walker et al. |
| 6,024,641 A | 2/2000 | Sarno |
| 6,048,268 A | 4/2000 | Humble |
| 6,070,872 A | 6/2000 | Squitieri |
| 6,077,163 A | 6/2000 | Walker et al. |
| 6,080,062 A | 6/2000 | Olson |
| 6,082,887 A | 7/2000 | Feuer et al. |
| 6,086,477 A | 7/2000 | Walker et al. |
| 6,102,395 A | 8/2000 | Such |
| 6,102,400 A | 8/2000 | Scott et al. |
| 6,168,521 B1 | 1/2001 | Luciano et al. |
| 6,193,610 B1 | 2/2001 | Junkin |
| 6,203,011 B1 | 3/2001 | Nulph |
| 6,220,961 B1 | 4/2001 | Keane |
| 6,234,896 B1 | 5/2001 | Walker et al. |
| 6,238,288 B1 | 5/2001 | Walker et al. |
| 6,240,555 B1 | 5/2001 | Shoff et al. |
| 6,241,246 B1 | 6/2001 | Guttin et al. |
| 6,241,606 B1 | 6/2001 | Riendeau et al. |
| 6,244,957 B1 | 6/2001 | Walker et al. |
| 6,250,685 B1 | 6/2001 | Walker et al. |
| 6,251,017 B1 | 6/2001 | Leason et al. |
| D444,507 S | 7/2001 | Lundberg |
| 6,267,376 B1 | 7/2001 | Jenkins |
| 6,267,670 B1 | 7/2001 | Walker et al. |
| 6,273,817 B1 | 8/2001 | Sultan |
| 6,273,820 B1 | 8/2001 | Haste, III |
| 6,277,026 B1 | 8/2001 | Archer |
| RE37,371 E | 9/2001 | Gerow |
| 6,290,600 B1 | 9/2001 | Glasson |
| 6,293,865 B1 | 9/2001 | Kelly et al. |
| 6,306,035 B1 | 10/2001 | Kelly et al. |
| 6,309,298 B1 | 10/2001 | Gerow |
| 6,312,334 B1 | 11/2001 | Yoseloff |
| 6,319,127 B1 | 11/2001 | Walker et al. |
| 6,322,446 B1 | 11/2001 | Yacenda |
| 6,354,593 B1 | 3/2002 | Frommer et al. |
| 6,373,462 B1 | 4/2002 | Pan et al. |
| 6,382,627 B1 | 5/2002 | Lundberg |
| 6,416,414 B1 | 7/2002 | Stadelmann |
| 6,424,703 B1 | 7/2002 | Katz |
| 6,435,500 B2 | 8/2002 | Gumina |
| 6,443,452 B1 | 9/2002 | Brune |
| 6,443,840 B2 | 9/2002 | Von Kohorn |
| 6,446,964 B1 | 9/2002 | Kelly et al. |
| 6,454,648 B1 | 9/2002 | Kelly et al. |
| 6,475,085 B2 | 11/2002 | Moody |
| 6,488,280 B1 | 12/2002 | Katz et al. |
| 6,491,215 B1 | 12/2002 | Irwin, Jr. et al. |
| 6,497,408 B1 | 12/2002 | Walker et al. |
| 6,514,144 B2 | 2/2003 | Riendeau et al. |
| 6,547,242 B1 | 4/2003 | Sugiyama et al. |
| 6,565,084 B1 | 5/2003 | Katz et al. |
| 6,569,017 B2 | 5/2003 | Enzminger et al. |
| 6,602,135 B1 | 8/2003 | Gerrard |
| 6,607,439 B2 | 8/2003 | Schneier et al. |
| 6,634,942 B2 | 10/2003 | Walker et al. |

(56) References Cited

U.S. PATENT DOCUMENTS

| | | |
|---|---|---|
| 6,656,042 B2 | 12/2003 | Reiss et al. |
| 6,656,048 B2 | 12/2003 | Olsen |
| 6,663,105 B1 | 12/2003 | Sullivan et al. |
| 6,676,522 B2 | 1/2004 | Rowe et al. |
| 6,749,198 B2 | 6/2004 | Katz et al. |
| 6,749,500 B1 | 6/2004 | Nelson et al. |
| 6,758,755 B2 | 7/2004 | Kelly et al. |
| 6,778,711 B2 | 8/2004 | Morita |
| 6,811,484 B2 | 11/2004 | Katz et al. |
| 6,824,469 B2 | 11/2004 | Allibhoy et al. |
| 6,888,929 B1 | 5/2005 | Saylor et al. |
| 6,908,382 B2 | 6/2005 | Walker et al. |
| 6,939,229 B2 | 9/2005 | McClintic |
| 6,941,135 B2 | 9/2005 | Minear et al. |
| 6,969,317 B2 | 11/2005 | Walker et al. |
| 6,988,732 B2 | 1/2006 | Vancura |
| 6,994,625 B2 | 2/2006 | Falciglia, Sr. |
| 7,008,317 B2 | 3/2006 | Cote et al. |
| 7,018,292 B2 | 3/2006 | Tracy et al. |
| 7,052,010 B2 | 5/2006 | Katz et al. |
| 7,054,928 B2 | 5/2006 | Segan et al. |
| 7,140,964 B2 | 11/2006 | Walker et al. |
| 7,156,739 B2 | 1/2007 | Walker et al. |
| 7,163,459 B2 | 1/2007 | Tanskanen |
| 7,181,690 B1 | 2/2007 | Leahy et al. |
| 7,186,180 B2 | 3/2007 | Lathrop et al. |
| 7,192,352 B2 | 3/2007 | Walker et al. |
| 7,194,542 B2 | 3/2007 | Segan et al. |
| 7,204,756 B2 | 4/2007 | Jubinville et al. |
| 7,285,048 B2 | 10/2007 | Karmarker |
| 7,309,280 B2 | 12/2007 | Toyoda |
| 7,322,885 B1 | 1/2008 | Luciano, Jr. et al. |
| 7,329,183 B2 | 2/2008 | Michaelson et al. |
| 7,331,860 B2 | 2/2008 | Herrman et al. |
| 7,357,715 B2 | 4/2008 | Kane |
| 7,374,484 B2 | 5/2008 | Bennett, III |
| 7,398,225 B2 | 7/2008 | Voltmer et al. |
| 7,404,764 B2 | 7/2008 | Bozeman |
| 7,422,213 B2 | 9/2008 | Katz et al. |
| 7,470,186 B2 | 12/2008 | Cannon |
| 7,510,116 B2 | 3/2009 | Robb et al. |
| 7,533,885 B2 | 5/2009 | Nicely et al. |
| 7,546,411 B2 | 6/2009 | Bruner et al. |
| 7,559,838 B2 | 7/2009 | Walker et al. |
| 7,611,065 B2 | 11/2009 | Behm et al. |
| 7,621,810 B2 | 11/2009 | Gilmore et al. |
| 7,631,871 B2 | 12/2009 | Bozeman |
| 7,634,864 B2 | 12/2009 | Segan |
| 7,645,194 B2 | 1/2010 | Van Luchene et al. |
| 7,654,529 B2 | 2/2010 | Rogers |
| 7,662,038 B2 | 2/2010 | Bozeman |
| 7,666,082 B2 | 2/2010 | Kane et al. |
| 7,666,084 B2 | 2/2010 | Hermann et al. |
| 7,666,095 B2 | 2/2010 | Van Luchene |
| 7,686,691 B2 | 3/2010 | Van Luchene |
| 7,690,996 B2 | 4/2010 | Iddings et al. |
| 7,716,126 B2 | 5/2010 | France et al. |
| 7,726,652 B2 | 6/2010 | Jubinville et al. |
| 7,734,251 B1 | 6/2010 | Harvey et al. |
| 7,749,066 B2 | 7/2010 | Hartman et al. |
| 7,749,081 B1 | 7/2010 | Acres |
| 7,753,772 B1 | 7/2010 | Walker et al. |
| 7,753,774 B2 | 7/2010 | Gail et al. |
| 7,753,789 B2 | 7/2010 | Walker et al. |
| 7,756,742 B2 | 7/2010 | Gilmore et al. |
| 7,766,739 B2 | 8/2010 | Kane et al. |
| 7,766,740 B2 | 8/2010 | Penrice |
| 7,771,264 B2 | 8/2010 | Kane et al. |
| 7,785,193 B2 | 8/2010 | Paulsen et al. |
| 7,785,195 B2 | 8/2010 | Palmer et al. |
| 7,794,324 B2 | 9/2010 | White et al. |
| 7,797,717 B1 | 9/2010 | Harvey et al. |
| 7,798,896 B2 | 9/2010 | Katz et al. |
| 7,811,172 B2 | 10/2010 | Asher et al. |
| 7,815,502 B2 | 10/2010 | Hardy et al. |
| 7,819,747 B2 | 10/2010 | Kane et al. |
| 7,860,131 B1 | 12/2010 | Harvey et al. |
| 7,871,327 B2 | 1/2011 | Walker et al. |
| 7,874,908 B2 | 1/2011 | Walker et al. |
| 7,874,914 B2 | 1/2011 | Walker et al. |
| 7,896,735 B2 | 3/2011 | Kelly et al. |
| 7,899,915 B2 | 3/2011 | Reisman |
| 7,908,638 B1 | 3/2011 | Harvey et al. |
| 7,914,374 B2 | 3/2011 | Walker et al. |
| 7,918,736 B2 | 4/2011 | Walker et al. |
| 7,934,986 B2 | 5/2011 | Kane et al. |
| 7,945,856 B2 | 5/2011 | Leahy et al. |
| 7,946,916 B2 | 5/2011 | Naicker |
| 7,955,169 B2 | 6/2011 | Walker et al. |
| 7,959,502 B2 | 6/2011 | Kane et al. |
| 7,967,292 B2 | 6/2011 | Katz et al. |
| 7,976,374 B2 | 7/2011 | Kane et al. |
| 7,980,942 B2 | 7/2011 | Kane et al. |
| 7,988,551 B2 | 8/2011 | Walker et al. |
| 8,002,630 B2 | 8/2011 | Nguyen et al. |
| 8,012,013 B2 | 9/2011 | Walker et al. |
| 8,016,668 B2 | 9/2011 | Hardy et al. |
| 8,025,567 B2 | 9/2011 | Kane et al. |
| 8,029,361 B2 | 10/2011 | Hardy et al. |
| 8,038,529 B2 | 10/2011 | Kane et al. |
| 8,046,256 B2 | 10/2011 | Chien et al. |
| 8,047,907 B2 | 11/2011 | Kane et al. |
| 8,075,386 B1 | 12/2011 | Leake |
| 8,075,387 B2 | 12/2011 | Meyer et al. |
| 8,082,501 B2 | 12/2011 | Leahy et al. |
| 8,083,583 B2 | 12/2011 | Bennett, III et al. |
| 8,099,182 B1 | 1/2012 | Kasten |
| 8,109,828 B2 | 2/2012 | Kane et al. |
| 8,118,660 B2 | 2/2012 | Pace |
| 8,133,113 B2 | 3/2012 | Nguyen et al. |
| 8,137,178 B2 | 3/2012 | Lind et al. |
| 8,147,325 B2 | 4/2012 | Kane et al. |
| 8,157,630 B2 | 4/2012 | Herrmann et al. |
| 8,206,210 B2 | 6/2012 | Walker et al. |
| 8,241,100 B2 | 8/2012 | Katz et al. |
| 8,241,110 B2 | 8/2012 | Katz et al. |
| 8,287,351 B2 | 10/2012 | Boykin et al. |
| 8,290,816 B2 | 10/2012 | Whiteman et al. |
| 8,308,162 B2 | 11/2012 | Rogers |
| 8,342,959 B2 | 1/2013 | Mahaffey et al. |
| 8,357,040 B2 | 1/2013 | Ansari et al. |
| 8,357,044 B2 | 1/2013 | Ng et al. |
| 8,376,826 B2 | 2/2013 | Katz et al. |
| 8,393,946 B2 | 3/2013 | Katz et al. |
| 8,425,297 B2 | 4/2013 | Kane et al. |
| 8,425,300 B2 | 4/2013 | Kane et al. |
| 8,460,081 B2 | 6/2013 | Meyer |
| 8,529,336 B2 | 9/2013 | Katz et al. |
| 8,535,134 B2 | 9/2013 | Katz et al. |
| 8,538,563 B1 | 9/2013 | Barber |
| 8,626,582 B2 | 1/2014 | Ariff et al. |
| 8,663,003 B2 | 3/2014 | Blackburn et al. |
| 8,696,431 B2 | 4/2014 | Safaei et al. |
| 8,696,432 B2 | 4/2014 | Kane et al. |
| 8,708,814 B2 | 4/2014 | Kane et al. |
| 8,727,853 B2 | 5/2014 | Katz et al. |
| 8,727,858 B2 | 5/2014 | Davis et al. |
| 8,727,867 B2 | 5/2014 | Kane et al. |
| 8,764,543 B2 | 7/2014 | Houle et al. |
| 8,794,630 B2 | 8/2014 | Katz et al. |
| 8,795,071 B2 | 8/2014 | Katz et al. |
| 8,935,714 B2 | 1/2015 | Frazier et al. |
| 9,280,875 B2 | 3/2016 | Pincus et al. |
| 9,478,095 B2 | 10/2016 | Walker et al. |
| 9,508,225 B2 | 11/2016 | Katz et al. |
| 9,557,901 B2 | 1/2017 | Hughes et al. |
| 9,626,837 B2 | 4/2017 | Katz et al. |
| 9,773,373 B2 | 9/2017 | Katz et al. |
| 9,911,278 B2 | 3/2018 | Katz et al. |
| 9,911,285 B2 | 3/2018 | Katz et al. |
| 9,940,792 B2 | 4/2018 | Katz et al. |
| 9,947,178 B2 | 4/2018 | Katz et al. |
| 10,032,329 B2 | 7/2018 | Katz et al. |
| 10,074,240 B2 | 9/2018 | Katz et al. |

(56) References Cited

U.S. PATENT DOCUMENTS

| | | |
|---|---|---|
| 10,121,326 B2 | 11/2018 | Katz et al. |
| 10,173,128 B2 | 1/2019 | Katz et al. |
| 10,176,674 B2 | 1/2019 | Katz et al. |
| 10,217,322 B2 | 2/2019 | Katz et al. |
| 10,269,221 B2 | 4/2019 | Katz et al. |
| 10,275,994 B2 | 4/2019 | Katz et al. |
| 10,438,453 B1 | 10/2019 | Katz et al. |
| 10,445,980 B2 | 10/2019 | Katz et al. |
| 10,497,215 B2 | 12/2019 | Katz et al. |
| 10,614,672 B2 | 4/2020 | Katz et al. |
| 10,650,635 B2 | 5/2020 | Katz et al. |
| 10,825,294 B2 | 11/2020 | Katz et al. |
| 10,832,530 B2 | 11/2020 | Katz et al. |
| 10,854,045 B2 | 12/2020 | Katz et al. |
| 10,872,498 B2 | 12/2020 | Katz et al. |
| 10,930,118 B2 | 2/2021 | Katz et al. |
| 10,977,897 B2 | 4/2021 | Katz et al. |
| 10,984,626 B2 | 4/2021 | Katz et al. |
| 11,138,834 B2 | 10/2021 | Katz et al. |
| 11,170,608 B2 | 11/2021 | Katz et al. |
| 11,176,771 B2 | 11/2021 | Katz et al. |
| 11,183,030 B2 | 11/2021 | Katz et al. |
| 2001/0004609 A1 | 6/2001 | Walker et al. |
| 2002/0037766 A1 | 3/2002 | Muniz |
| 2002/0039918 A1 | 4/2002 | Anderson et al. |
| 2002/0039923 A1 | 4/2002 | Cannon et al. |
| 2002/0069265 A1 | 6/2002 | Bountour et al. |
| 2002/0094869 A1 | 7/2002 | Harkham |
| 2002/0115488 A1 | 8/2002 | Berry et al. |
| 2002/0119824 A1 | 8/2002 | Allen |
| 2002/0165020 A1 | 11/2002 | Koyama |
| 2002/0165025 A1 | 11/2002 | Kawahara |
| 2002/0187825 A1 | 12/2002 | Tracy et al. |
| 2003/0023547 A1 | 1/2003 | France et al. |
| 2003/0045340 A1 | 3/2003 | Roberts |
| 2003/0064771 A1 | 4/2003 | Morrow |
| 2003/0176215 A1 | 9/2003 | Palmer et al. |
| 2003/0189288 A1 | 10/2003 | Katz et al. |
| 2003/0195043 A1 | 10/2003 | Shinners et al. |
| 2003/0229900 A1 | 12/2003 | Reisman |
| 2004/0023711 A1 | 2/2004 | Knapp |
| 2004/0110552 A1 | 6/2004 | Del Prado |
| 2004/0152511 A1 | 8/2004 | Nicely |
| 2004/0204222 A1 | 10/2004 | Roberts |
| 2004/0242320 A1 | 12/2004 | Jackson |
| 2004/0259626 A1 | 12/2004 | Akram et al. |
| 2004/0259629 A1 | 12/2004 | Michaelson et al. |
| 2004/0259631 A1 | 12/2004 | Katz et al. |
| 2005/0096117 A1 | 5/2005 | Katz et al. |
| 2005/0164779 A1 | 7/2005 | Okuniewicz |
| 2005/0181870 A1 | 8/2005 | Nguyen et al. |
| 2005/0250569 A1 | 11/2005 | Kane et al. |
| 2006/0025197 A1 | 2/2006 | Kane et al. |
| 2006/0068917 A1 | 3/2006 | Snoddy et al. |
| 2006/0105837 A1 | 5/2006 | Walker et al. |
| 2006/0105839 A1 | 5/2006 | Graeve et al. |
| 2006/0128453 A1 | 6/2006 | Hoffman |
| 2006/0148556 A1 | 7/2006 | Weller et al. |
| 2006/0148567 A1 | 7/2006 | Kellerman et al. |
| 2006/0217188 A1 | 9/2006 | Walker et al. |
| 2006/0248025 A1 | 11/2006 | Walker et al. |
| 2006/0251383 A1 | 11/2006 | Vronay et al. |
| 2007/0041626 A1 | 2/2007 | Weiss et al. |
| 2007/0198647 A1 | 8/2007 | Lingafelt et al. |
| 2007/0259710 A1 | 11/2007 | Walker et al. |
| 2008/0009335 A1 | 1/2008 | Walker et al. |
| 2008/0009340 A1 | 1/2008 | Walker et al. |
| 2008/0009344 A1 | 1/2008 | Graham et al. |
| 2008/0045334 A1 | 2/2008 | Shvili |
| 2008/0058049 A1 | 3/2008 | Lutnick et al. |
| 2008/0113816 A1 | 5/2008 | Mahaffey et al. |
| 2008/0146337 A1 | 6/2008 | Halonen et al. |
| 2008/0146342 A1 | 6/2008 | Harvey et al. |
| 2008/0215623 A1 | 9/2008 | Ramer et al. |
| 2008/0242423 A1 | 10/2008 | Kerr et al. |
| 2008/0248865 A1 | 10/2008 | Tedesco et al. |
| 2009/0011812 A1 | 1/2009 | Katz et al. |
| 2009/0011827 A1 | 1/2009 | Englman et al. |
| 2009/0061980 A1 | 3/2009 | Holton et al. |
| 2009/0117966 A1 | 5/2009 | Rogers et al. |
| 2009/0228351 A1 | 9/2009 | Rijsenbrij et al. |
| 2009/0234745 A1 | 9/2009 | Ramer et al. |
| 2009/0234861 A1 | 9/2009 | Ramer et al. |
| 2009/0240568 A1 | 9/2009 | Ramer et al. |
| 2009/0240586 A1 | 9/2009 | Ramer et al. |
| 2009/0247259 A1 | 10/2009 | Napolitano |
| 2011/0059786 A1 | 3/2011 | Walker et al. |
| 2011/0218025 A1 | 9/2011 | Katz et al. |
| 2019/0134495 A1 | 5/2019 | Katz et al. |
| 2021/0056799 A1 | 2/2021 | Katz et al. |
| 2021/0074116 A1 | 3/2021 | Katz et al. |

OTHER PUBLICATIONS

IGDA International Game Developers Association, IGDA Online Games White Paper, 2$^{nd}$ Edition, Mar. 2003, 140 pages.

IGDA International Game Developers Association, 2004 Web and Downloadable Games White Paper, Presented at the Game Developers Conference 2004, 93 pages.

IGDA International Game Developers Association, 2004 Persistent Worlds Whitepaper, Presented by the IGDA Online Games SIG, 82 pages.

IGDA International Game Developers Association, 2005 Casual Games White Paper, 125 pages.

IGDA International Game Developers Association, 2005 Mobile Games White Paper, Presented at the Game Developers Conference 2005, 55 pages.

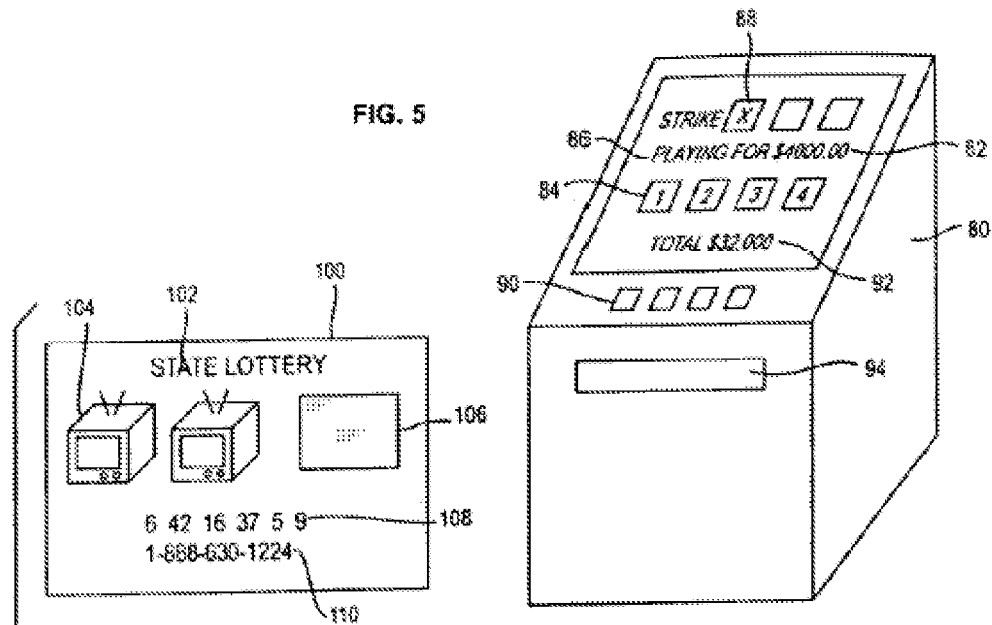
FIG. 5
FIG. 6
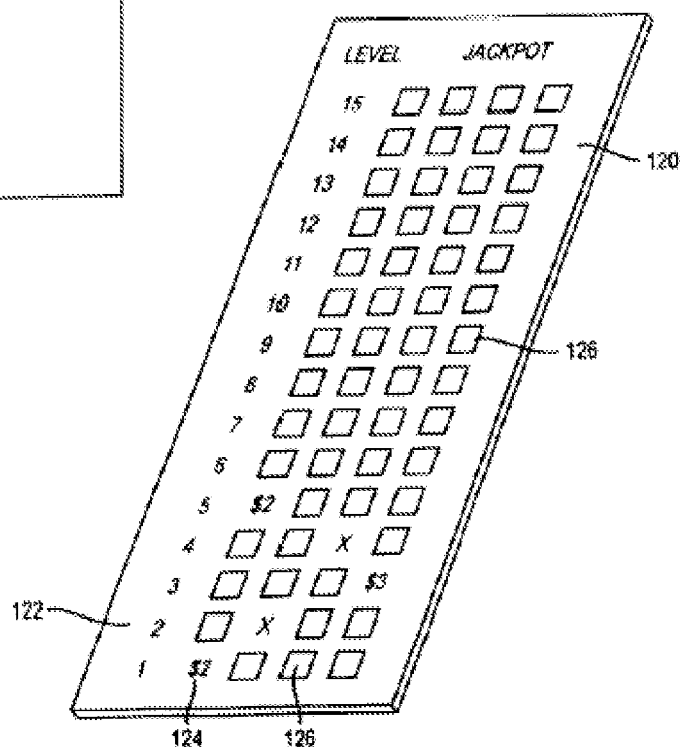
FIG. 7

Poko
Winning Hands

- Five 7's is "POKO"
- Five of a kind
- Four of a kind
- Full House
- Three of a kind
- Two pairs

$24,679
Poko Jackpot

Here is your hand...
9 4 9 9 9

Here is your dealer's hand...
8 8 8 8 7

FIG. 8

Match Game Minute

What's the game fellas?

- Studio contestant is asked a series of "Super Match" questions against the clock as a "stake-setter"
- Contestants are paid off for each #1, #2, or #3 answer they give
- Only home players that answer the same as contestant remain in the game. Others are eliminated as we play
- At the end of the time, the contestant can keep their money or try to multiply it by 5
- To win, we randomly pick a home player and the contestant must match the player in a "Head to Head" match

FIG. 12

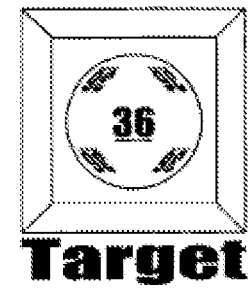
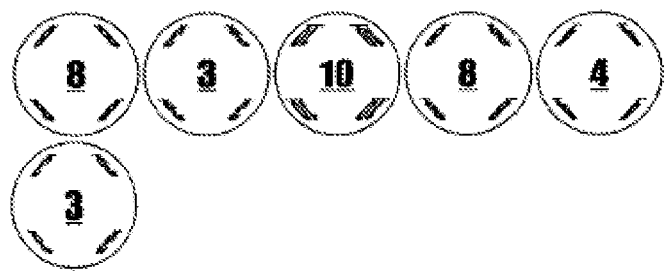
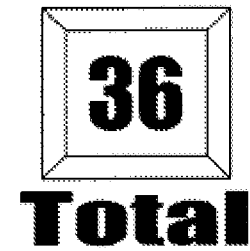
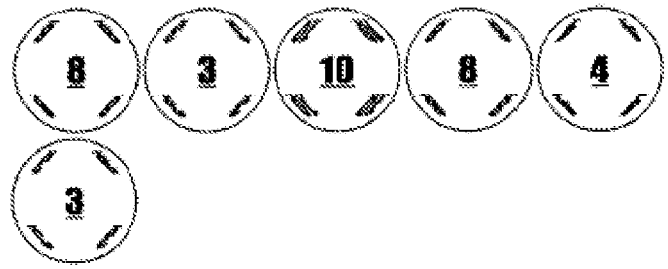
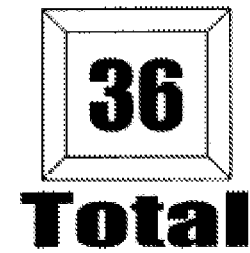
FIG. 13

WELCOME TO
LOTTERY.COM

Registered Users _____

User ID: _____ Enter Ticket identification Number Here

Password: _____

Not Registered?

Register Now

FIG. 19

| TIN Number | Game | Prize Amount | Non-Monetary Prize | Last Date to Play | Game Play Required to Reveal Prize? |
|---|---|---|---|---|---|
| 65432981 | Hot Seat | $1,000.00 | | 05/03/02 | Yes |
| 65432982 | JACKO | $50.00 | | 04/23/02 | No |
| 65432983 | LOTO | $500.00 | | Open | Yes |
| 65432984 | LOTO | 0 | Free Play | Open | Yes |

*FIG. 20A*

| Vending Merchant | Personalized Retail Coupons | Cross-Promotion | User ID | Password or PIN |
|---|---|---|---|---|
| 7-11, Chatsworth & Main | 7-11 | Coke | Lotoman26 | 123456 |
| 7-11, Chatsworth & 5th | 7-11 | Pepsi | None | None |
| Ralph's, Century City, CA | Ralphs | None | Scratchem | 4327 |
| 7-11, Chatsworth & Main | 7-11 | Coke, 30% Discount | None | None |

*FIG. 20B*

| Link to Other Game | Date of Play | Time of Play | Sequence Number | # of Plays Allowed |
|---|---|---|---|---|
| www.coke.com/game | 04/22/02 | 13:23:32 | 6354 | 3 |
| none | 04/21/02 | 12:13:10 | 63 | 1 |
| www.xgames.com | 04/14/02 | 09:33:41 | 1324 | 1 |
| none | 04/23/02 | 10:15:13 | 1325 | 1 |

*FIG. 20C*

| Citizenship Information | Computer Address | E-mail Address | Physical Address | Registered Frequent Player |
|---|---|---|---|---|
| 469384323FR | 1324597223 | jami@hotmail.com | 3 rue de la Seine Paris, FR | yes |
| 3555462NL | 3968736293 | FRStone@aol.com | unknown | no |
| SSN 564-35-1283 | 6945112442 | unknown | unknown | no |
| SSN 523-25-3232 | 6978854645 | dons@earthlink.et | 1243 Main St. Yuba, CA 91331 | Yes |

FIG. 20D

| Frequent Player Points | Form of Compensation | Acknowledgment Number |
|---|---|---|
| 13244 | Cash | 422026354100coke |
| 0 | Airline Miles | 164777538865 |
| 0 | Further Game Play | 164777538866 |
| 103 | Cash | 164777538867 |

FIG. 20E

*Affirmative Game Play Required Before Redemption is Possible

| Authorized Retailer/ Redemption Location | User Remote Game Play | Game Play Server (e.g., webserver) | Lottery System |
|---|---|---|---|
| Obtain Base Game Ticket | Begin Game Enter # | Determine if # is Win/Loss if Win, Amount of Win Update Record Indicating Game Play Occurred | |
| | Display "Win/Lose" and if Win, Amount to Player | | |
| Player provides Ticket to Authorized Redemption Location | | | |
| Redemption Location Confirms Game Play | | | System Confirms Game Play |
| Prize Paid | | | |

FIG. 21

*Variable Game Play in Remote Site Environment

| Authorized Retailer/ Redemption Location | User Remote Game Play | Game Play Server (e.g., webserver) | Lottery System |
|---|---|---|---|
| Obtain Base Game Ticket<br><br>Play Base Game | | | |
| | Contact Remote Site for Game Play<br>Enter Number | | |
| | | Determine Variables Associated With Ticket Numbers<br><br>Update database Indicating Game Played | |
| | Conduct Game Play in Accordance with Variables | | |
| Redemption Ticket at Authorized Outlet | | | |

FIG. 22

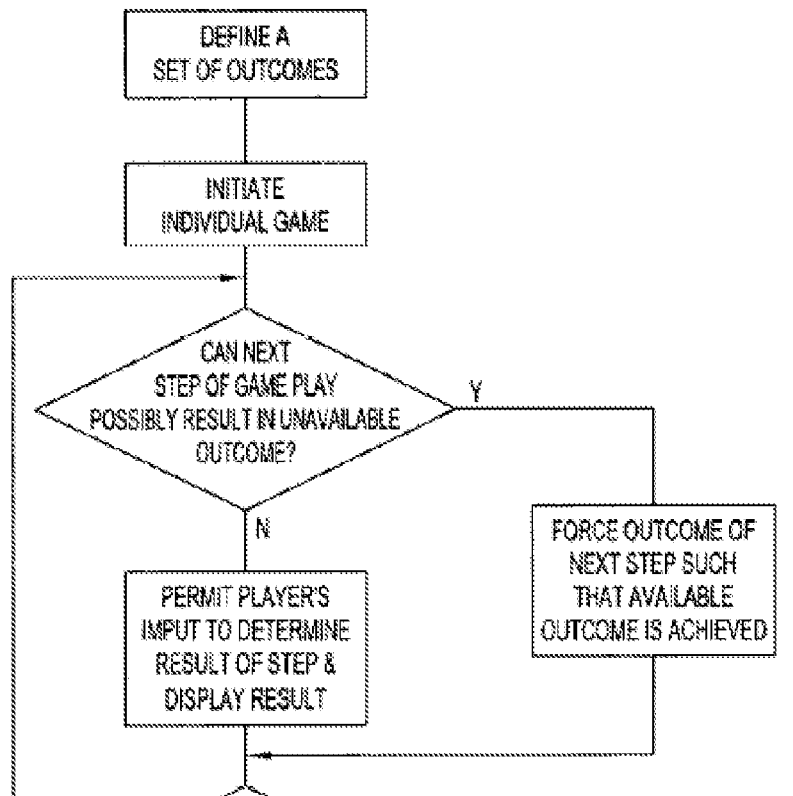

SYSTEM FOR PRIZING REMOTE USERS USING REAL LIFE SPORTS PERSONALITIES

PRIORITY CLAIM

This is a continuation of application Ser. No. 17/180,025, filed Feb. 19, 2021, now U.S. Pat. No. 11,183,030, which issued on Nov. 23, 2021, which is a continuation of application Ser. No. 16/832,502, filed Mar. 27, 2020, now U.S. Pat. No. 10,930,118, which issued on Feb. 23, 2021, which is a continuation of application Ser. No. 16/394,613, filed Apr. 25, 2019, now U.S. Pat. No. 10,614,672, which issued on Apr. 7, 2020, which is a continuation of application Ser. No. 15/946,494, filed Apr. 5, 2018, now U.S. Pat. No. 10,275,994, which issued on Apr. 30, 2019, which is a continuation of application Ser. No. 14/281,435, filed May 19, 2014, now U.S. Pat. No. 9,940,792, which issued on Apr. 10, 2018; which is a continuation of application Ser. No. 11/294,683, filed Dec. 5, 2005, now U.S. Pat. No. 8,727,853, which issued on May 20, 2014.

RELATED APPLICATION

Additionally, this application is related to, but does not claim priority to, application Ser. No. 10/559,119, filed Jun. 27, 2006, now U.S. Pat. No. 8,241,110, which issued on Aug. 4, 2012 (which is a filing under 35 U.S.C. § 371 of PCT/US04/28560, filed Sep. 1, 2004, which claims priority to application Ser. No. 10/654,585, filed Sep. 2, 2003); application Ser. No. 10/654,585, filed Sep. 2, 2003, now U.S. Pat. No. 7,798,896, issued on Sep. 21, 2010, application Ser. No. 10/123,861, filed Apr. 15, 2002, now U.S. Pat. No. 8,393,946, application Ser. No. 09/965,620, filed Sep. 26, 2001, now issued as U.S. Pat. No. 6,811,484, application Ser. No. 09/672,179, filed Sep. 27, 2000, now issued as U.S. Pat. No. 6,488,280, and application Ser. No. 09/585,987, filed Jun. 2, 2000, now issued as U.S. Pat. No. 6,565,084, which are incorporated herein by reference as if fully set forth herein.

FIELD OF THE INVENTION

These inventions relate to methods, and systems and apparatus for their implementation, of unique player participation games, and for improved methods of play for games of chance and skill. More particularly, these inventions relate to new and improved games involving player participation in a broadcast medium, such as television, and in other communication media, such as over the Internet, mobile phones or other communications networks and devices.

BACKGROUND OF THE INVENTION

Player participation games fall broadly under the categories of games of chance and games of skill. One of the main forms of games of chance is lotteries, which by definition, involve the three elements of: 1) prize, 2) chance and 3) consideration. If these three elements are present, then the game is considered to be a lottery, and is typically then run by a governmental entity. In the United States, lotteries are typically run by the individual states, or collectively by a group of states. In other countries, it is typically the national government that runs the lottery. Countries and states attempt to strictly limit the game play to their geographic boundaries. For example in Austria, while electronic access to the game may be available over the Internet, in order to play the person must have a bank account in Austria and be able to navigate the non-english menu.

Games have been conducted in any of a number of formats. Certainly, live, in person games have been performed. Yet other games have been played and broadcast over a broadcast medium, such as radio or television. Yet other games have been played through active communication media, such as the telephone, or over a communication network such as the Internet.

Various attempts have been made to provide game play over the Internet. By way of example, the game show Jeopardy has been placed on the web at http://www.sony.com.

Various other attempts have been made to extend the general concept of gambling to broad communication media, such as the Internet. For example, U.S. Pat. No. 5,800,268 entitled, "Method of Participating in a Live Casino Game from a Remote Location" has been asserted in a litigation in against an off shore corporation. The '268 patent discloses a system in which a player may participate in a live casino game from a location remote from the casino. A player interface station, such as a computer terminal or other special input device, is connected by a communication line to the casino. A second communication line is established from the casino to the player's financial institution. The player is presented with an image of an actual "live" game. The player then participates directly as if they were physically present at the casino. A wager is cleared with the player's financial institution to insure adequate resources to cover the bet.

U.S. Pat. No. 4,845,739 to Ronald A. Katz is entitled, "Telephonic-Interface Statistical Analysis System". The patent describes various operating formats, including a format to be performed in association with television media. Specifically, in one embodiment, a real-time format is provided in which television viewers participate on a real-time basis in a game show for prizes. Expanded audience participation is achieved. Various levels of qualification are provided, such as for a child's television game format is utilized, parental clearance may be required. The use of personal identification numbers (pin numbers) is disclosed. In one implementation, the caller is prompted to identify which of the actual studio of audience participants the caller will be aligned with. Additionally, the caller may be instructed to indicate the extent of a wager. As the game progresses, the individual player's accounts are credited or debited, thereby providing on-going accounting data. In yet another implementation, a non real-time operation is provided. Such a show might involve a quiz for callers based on their ability to perceive and remember occurrences within the show. Pre-registration is optionally utilized. In this implementation, a sequence or time clock could be utilized in order to limit or control individual interfaces to a specific time or geographic "window". In this way, the caller questions may be utilized across various time zones without the caller having obtained the question earlier than other callers within a given time zone.

In yet another patent issued to Ronald A. Katz, U.S. Pat. No. 5,365,575 entitled "Telephonic-Interface Lottery System", various scratch off lottery tickets are described. One ticket includes a scratch off ticket having a first concealed area with a matching game, and a second scratch off area concealing a unique number. A player may call a specified telephone number to participate in a second chance game.

Berman, U.S. Pat. No. 5,108,115 discloses a game show and method entitled "Interactive Game Show and Method for Achieving Interactive Communication Therewith". An interactive communication system is provided which permits individuals to electronically select at least one possible outcome of a plurality of outcomes of a future event. Successful contestants possibly share in a prize which is associated with the event. A home audience of a televised game show may electronically communicate a series of random numbers using their touch tone telephone to participate in the show.

Recently, various governmental entities and trade organization have addressed the issue of game play over the Internet. Senator Kyl has introduced a bill which could preclude the offering of Internet based gaming, though permitting states to offer Internet gambling. Consideration has been given to requiring that the states sponsored gaming be limited to an intranet, in an effort to limit those participating to persons physically resident within the states boundaries. Various international lottery organizations have promoted similar restrictions, namely, precluding the individuals offering of games of chance, and reserving that option exclusively to the state.

Various lottery formats are known to the art. In one classic format, a predetermined number of tickets are provided with certain printed matter, such as numbers or other indicia, where the information is then obscured by a scratch off layer. By removing the layer and revealing the underlying information, the ticket holder may determine whether they have won or not. Various extensions have been made to a "virtual" scratch off ticket where no physical product is provided.

A conventional lottery proceeds as follows. First, a series of numbers are selected, either by the player or by some automated selection system, such as by computer. Upon the occurrence of a predefined event, such as on a set date and time, numbers are randomly chosen. Both mechanical methods, such as selection of ping-pong balls bearing numeric designations, or electronic means such as through a random number generator, may be utilized. The selected numbers are then provided to the participants, such as through a broadcast medium like newspapers, radio and television. Finally, the holder or holders of winning the tickets then present their ticket for payment.

In yet another aspect of game play, a typical television presented game show lasts on the order of one half hour. Various shorter format games or shows have been utilized, for example, a football based advertisement or game has been presented by IBM during televised football games under the name "you make the call". Yet other shorter version games have been presented over web TV or on the game show network.

The television game show "Who Wants to be a Millionaire" is believed to have originated in Britain, and has become extremely popular in the United States. The game is a trivia game. While being principally a game of skill, the nature of the questions, or the contestant's knowledge of the potential answers, makes the game at times a guessing game or game of chance. The format consists of one contestant and one host. The contestant is presented with a question and four possible answers. If the contestant answers the question correctly, they advance to a next level, each level being associated with a higher monetary prize amount, which is roughly twice the amount of the preceding level. A contestant is given three "life lines": a "50/50" where in two incorrect answers are removed, thereby leaving the correct answer and one incorrect answer, the "phone a friend", wherein the contestant may call a friend by telephone and solicit their response to the question, subject to a 30 second time limit, and an "ask the audience" option where the audience is polled regarding their view of the correct answer to the question. Various safe levels are established, such as at $1,000.00 such that the contestant could be awarded that amount of money in the even that they fail to correctly answer a question. Finally, after a question is posed, the contestant may elect to discontinue play, and to receive that amount of money won at the preceding level.

Various proposals have been made to extend the game play experience, particularly in a scratch-off lottery environment. For example, in Kaye, U.S. Pat. No. 5,569,082, entitled "Personal Computer Lottery Game", methods and systems for playing a player interactive lottery type game are described. A gaming piece, e.g., a printed card, computer memory, disk, contains a "Destiny Code" which is an encrypted symbolic code signifying the outcome of the particular game of chance to be played by the player. Game play proceeds under computer processor control to reveal whether the player has won, and if so, how much, or whether they have lost. The Destiny Code itself contains the win/loss information, and if a win, the amount. The outcome of the game is forced in that the processor controls the outcome of the game of chance. For example, if the Destiny Code indicates that the player is to win $75, the system can match the prize to the game play such that the desired outcome is achieved. If the predetermined outcome is a loss, the game play will include selection of losing numbers. Computer game play may be either local, such as at a stand alone terminal or remote through an on-line service. When played in the on-line environment, the Destiny Code is input by the player, and provides the encrypted information regarding the win (and amount)/loss outcome. In certain instances, the player may select the form of game to be played, e.g., a murder mystery, a horse race type game, or various card games. In the online environment, the system can store a Destiny Code and not allow the code to be played twice. A history file may include various information, such as the number of times the game medium was played, information about how many times the particular player has played, information about different habits of the player, and general information as to what has transpired in the game. A winning game medium is somehow marked to show that the particular Destiny Code has been played. Receipt of prize money may be made at a local machine or at a redemption location.

PCT Application No. WO 00/39761 in the name of Applicant Ingenio, Filiale DeLoto-Quebec, Inc., entitled "Computer Gambling Game". The game includes a computer program to provide a sequence of game states, which lead to a game outcome. A game seed is required by the computer program to generate one of the sequences of the games. Each game seed corresponds to one of the sequences of the game states. An initiator code is required to begin game play, that code being printed on an instant play lottery ticket or distributed via a computer network. The computer program utilizes a look-up table to retrieve the game seed corresponding to the initiator code. Oberthur Gaming Technologies has an integrated package of three lottery tickets and a compact disc which is sold through authorized lottery retailers. The compact disc contains a program having various games where entry of an access code is necessary to begin game play. The compact disc permits creation of a password, thereby providing limited access to the game. Winning tickets are redeemed at an authorized lottery retailer. The lottery ticket itself contains encoded information as to the win (and amount)/loss status of the ticket in that the retailer can scan the ticket to see if it is a winner.

Various lotteries have implemented guaranteed prizing structures. One known structure is the so-called GLEPS structure, standing for guaranteed low-end prizing structure. GLEPS prizing requires that some outcomes are at least partially determined. GLEPS prizing is typically used in relatively high turnover type games, e.g., scratch-off ticket lottery games. Finocchio U.S. Pat. No. 5,317,135 entitled "Method and Apparatus for Validating Instant-Win Lottery Tickets" describes various GLEPS systems. The Finnochio system stores the status as 'paid' or 'not yet paid' of game tickets to be validated. The data is stored in the main memory of a computer. Game play occurs with conventional physical tickets. The electronic system merely validates the ticket.

Despite the wide spread participation in various forms of game play, as well as the suggestions for implementing those games on a mass communication network, such as through the telephone or Internet, the possibility for new games, or improved game play exists. In particular, there is a need for improved games of chance, which provide excitement for the player, and optionally a viewer audience.

SUMMARY OF THE INVENTION

These inventions relate to methods, and associated systems and apparatus, for novel game play and/or electronic entertainment. In various embodiments, the games are games of chance, games of skill, or combinations of both.

Systems, apparatus and methods are provided for enhanced electronic entertainment, such as game play, over remote communications networks. The system may receive a number of mandated parameters. These parameters must be achieved by the system as a whole. These top level parameters may be mandated, fixed or defined, typically being provided by the game sponsor, such as a lottery. These precedential parameters form the boundary constraints or boundary conditions for the game. Exemplary mandated parameters may consist of prize pay out and win rates, and may include such factors as the minimum payout amount, the maximum payout amount, a defined percentage payout, the number of prizes, and/or the form of prizes. Within the system, the mandated parameters are generally input to the system, and preferably stored in memory within the system. Having received the mandated parameters, the system processor then selects among dependent variable parameters to implement game play and prizing in a way that achieve the mandated parameters. As such, the variable parameters may be considered to be derivative or dependant upon achieving the mandated parameters. Within the system, the processor may interact with a store of variable parameters information associated with the processing system. As a possible result of the processing of the variable parameter information, while ultimately subject to the mandatory parameters, the system then permits interaction with the users via the user interface. Optionally, the processing system may then interface with other systems, including the conventional lottery system, the required communications systems, and various financial systems to effect a complete interaction with the player.

The systems and methods of these inventions permit greatly enhanced flexibility in game play and the prizing experience for a player, while globally achieving the mandated parameters. These systems and methods may be utilized with any type of game play, including but not limited to predetermined games, outcome games and games of skill. Predetermined games are those in which a player's actions do not affect the game outcome. Predetermined games may be either scripted, wherein the result is a priori determined, or dynamic, in which variable game play occurs. Outcome games, namely those in which a player's actions can affect the game's outcome, may include probability games, both simple probability games and hybrid games in which skill and probability affect the outcome, and games of skill.

There are any number of variable parameters available for game play ultimately serving to achieve the mandated parameters and/or provide for enhanced or optimized game play and prizing experience. By way of example, the game selection itself, whether done by the player or by the system, may be one variable parameter. Another variable parameter may be the game structure itself, such as in the use of decision points, numbers of levels of game play, and/or duration of game play. The game play experience may be modified such as where the system utilizes probabilities corresponding closely with real world probabilities. By way of example, a coin flip game even played electronically should appear to operate under a 50/50 percent probability. While the mandated parameters may constrain the game to provide prizing which could not be achieved through the use of the real world probabilities, the system and methods herein permit the use of the real world probabilities, but achieving the mandated parameters through modification of the prizing and pay out experience of the player. Within these systems and methods, greater flexibility is achieved with regard to the play on a particular individual event, while achieving the mandated parameters for the game as a whole.

The game play parameters and prizing structure parameters generally comprise that collection of variables that shape the game experience and define the prizing structure. Game play generally refers to the player experience, whether passive or active. By way of example, game play parameters may include the structure and operation of the gaming experience, such as the duration of game play, number of levels, the decision points, e.g., inducements for various game play options, GLEPS or other allocation variables, such as in the number or frequency of winning outcomes, and player experiences, such as the number of near wins. Again by way of example, the prizing structure parameters may include the desired payout amount, GLEPS or other allocation variables, the frequency of wins (1:X), overall number of winners and prizing structure and allocation of prizes.

Generally, the methods consist of a series of electronic interactions between the user of the system, as players of games or interacting users with an entertainment device, which are controlled to achieve desired game play and prizing criteria. By varying the interaction of the system with the users so as to achieve the desired game play and prizing parameters, the game experience may be enhanced while also ensuring that the desired prizing criteria are achieved.

In one aspect, the games described herein may be played either as a predetermined game or a game in which the player's actions determine the outcome, or a hybrid or combination of the two. In a predetermined outcome scenario, the system has determined which ticket or tickets are winners, or at what level the win will be paid, and the action of the player has no impact on the outcome of the game play. While the appearance of selection may still appear to be "random" to the player, the system may select the required number or other indicia in order to force the predetermined outcome. In the case of a probability game, the outcome is determined based upon the actions of the player. However, the constraints imposed by the prizing parameters may require that some game events are forced, such that the necessary prizing outcome is achieved.

Prizing results fulfilling the prizing parameters may be calculated prior to game play, or may be calculated according to an algorithm as the game proceeds. The system may ensure that the predefined prizing criteria are achieved through various methods. For example, if the player's actions actually determined the outcome of a particular game, the system could ensure that any possible prize the player may receive is available. One option is to utilize a prize board to 'even up', that is, apply the prizing criteria to the possible outcomes such that the prizing criteria are met.

In one implementation, prizing structure may implement a prizing structure which includes a predefined number of lower tier prizes. The allocation of prizes may be defined in various ways, such as by defined numbers and values of prizes for a given number of plays, system-wide for every Nth play, or based on the number of plays for a particular player, or groups of players, or based on the source of the play, such as a given retailer, or by the geographic region of the source of the play, or based on a time parameter, such as a predefined number of wins of certain amounts per week.

The mode of interaction may vary. For example, the series of interactions with the users, such as through visual displays and audio experience, may be determined by the system and then be revealed. In certain games, the entertainment may be broadly divided into a first game play phase and a second prizing phase. The use of a second prizing phase, or "prize board" phase, of the interactive electronic game play lends flexibility to game play while permitting application of various prizing structures. Game play in the first phase may be of any manner, whether predetermined, or where the player's actions determine the game outcome, or a combination of the two, such as in a hybrid game. The game play in the second phase may then apply the prizing parameters such that the correct prizing payouts are achieved, irrespective of the results from the first phase of game play. Any prizing structure may be imposed during the prize reveal, even if the prizing amounts differ from those which could be strictly calculated according to probabilities. For example, a true probability game may suggest that the payout should be of a first amount, but the system may apply predefined imposed prizing parameters which specify the payout amount to be different. By providing a second phase for prize reveal, the amount or mode of prize may be set as defined by the rules.

In yet another aspect, game play in the first phase may be made to simulate game play using real world or actual probabilities. The results provided to the player in the first phase may be set to provide winning outcomes which would be expected based on true game probabilities. The predefined prizing parameters are utilized in the second, prizing phase to ensure that the game as a whole achieves the proper payout. By separating the first play phase from the prizing phase, the player experience in the first phase may be set as desired. For example, the first phase game play may be set where the player 'wins' at a probability greater than the true game probability. Since the player must complete the prizing phase, the system can correct the first phase perception of a heightened probability of wins in the second, prizing phase. The system may also provide the player with an enhanced number of 'near wins', such as where the player achieves a score which was close to a win, but not sufficient to win. Player interest may be maintained, while also maintaining the prizing structure and parameters.

In yet another aspect of this invention, a set or series of game plays will have a set or series of outcomes, but a particular game play is not specifically associated with a given outcome. This system permits game play where the player's actions can determine the outcome of the individual game, but where the outcome for a set or series of game plays is predefined. A player provides input for game play, where for at least some players their actions determine their individual outcome. In operation, a set of outcomes is defined for multiple plays. Prior to individual game play, an initial check is made to determine whether any possible outcome in unavailable. If all possible outcomes are available, the player plays the game where their actions determine, at least in part, the outcome of the game. The player's individual outcome, e.g., a $5 win of a hand of blackjack, is selected from the set of outcomes and awarded to the player. If certain outcomes are no longer available in the set of outcomes, e.g., all of the $5 wins are gone, the system will, if necessary, cause game play to proceed such that the outcome is one which still exists in the set. After an outcome is presented to the player, it is removed from the set. In this way, the game sponsor or system has a predefined pay out schedule, but individual's game play may determine the actual outcome for at least some players. Generally, as the set of unclaimed outcomes decreases, the system will force more outcomes for the individual game play.

In one of the instant inventions, a game is provided in which the player must communicate electronically with a remote location which contains the information as to whether a player will win or lose the game, and if they win, the prize that they will receive. In one implementation, a lottery game, such as a scratch off lottery game, may include a unique access or Ticket Identification Number (TIN). The TIN may be purchased through the conventional in-store lottery network or may be obtained electronically, such as where an account or other payment mechanism is established. In order to determine whether the player is a winner, the player may electronically access a remote site. Modes of electronic addressing of the remote site include internet access, cable access, or access through a conventional communication network such as by a phone. The user is prompted to enter the TIN number, which is used by the system to access memory to determine whether the player has won or lost, and if they have won, the prize for winning. Game play proceeds via the electronic system in a way so as to ultimately inform the player as to whether they have won or lost and if appropriate, as to their prize.

The TIN may optionally be information bearing, though the meaning of the information may not be recognized by the user. By way of example, the TIN or other number may identify the application or game to be played. It may specify other variable information about game play, such as the identity of the game, either one game or a set of games, the level of difficulty of game play, win/loss status of the ticket, prize amount, if any. The TIN or other number may identify the player, such as where the player has registered or otherwise has an account with the system. Through use of an information bearing number being provided to the user, some or all game functions may be performed locally. For example, if the player were to receive multiple numbers corresponding to game play, and the numbers were downloaded to a mobile device, the game could be played at a later time, with its full functionality, but without necessarily connecting (or reconnecting) to the remote portions of the system. As these unique numbers are generated, or provided from the system to the player, or indicated as having been played or redeemed, they should be designated as such in the system, such that the number is consumed or crossed off the list of valid numbers. Optionally, validity checks may be performed on the numbers prior to permitting use.

When implemented in conjunction with a lottery type game, the system utilized consists of the lottery system, such as the online terminals located at various vendor locations, and additionally includes communication paths between the electronic game play path, e.g., via the internet through website game play, and its interaction with the lottery system and its associated database. The lottery processing system may be separate from or integrated with the servers and systems which permit electronic game play. These servers or systems may access information, such as ticket database information, financial data or lottery real-time information.

By way of a more specific example, the lottery game may comprise a conventional scratch-off type game, and include a second or auxiliary game with the base game, such as by providing the two games on a given lottery ticket. The second game includes at least the provision of TIN number information for the player to electronically access the game play system. Optionally, the second game may include a scratch-off aspect on the same ticket which can reveal variable information, such as whether the ticket will entitle the holder to play the second game, e.g., where, for example, two out of five numbers must match, the prize amount the player will play for in the second game, or other variable factors such as the game to be played or the degree of difficulty of the game. The player enters their TIN number over the electronic communication system, wherein turn the number is checked for validity and entitlement for game play. Entitlement for game play may include a determination of whether the TIN number has been previously used. Optionally, once the TIN number is used, it may be consumed or otherwise checked-off from the table or memory. Assuming qualification and entitlement, the TIN number is utilized by the system to look up in memory various aspects about the game play, e.g., what game is to be played, whether the player will win or lose, and the type of prize to be awarded to winners. The system retains a record of TIN numbers which have been played. Redemption of prizes may occur at the authorized retail vendor locations equipped with the lottery infrastructure. The vendor may positively confirm that the TIN number has been played in the electronic game through use of the lottery terminals and infrastructure. Payment of the prize amount may be conditioned on receiving a positive indication that the TIN number has been utilized in the electronic game play. While the TIN may be provided as matter on the ticket or other physical cardstock or substrate material, it may be provided electronically, as a virtual TIN (vTIN), where the TIN is provided electronically and not associated with a physical product, or may be provided with a physical product which is not a lottery ticket, e.g., a number provided on a physical product such as a drink cup from a retail restaurant location or a cereal box from a grocery store.

In yet another aspect of the invention, promotional materials are provided in association with the electronic game play. For example, the lottery system knows the identity of the vendor of a batch of tickets, and may use that information to offer a personalized coupon or promotion. The information regarding coupons or promotions may be provided to the vendors check out and scanning system so as to automatically apply the discount. Optionally, frequent player's clubs may be utilized, such as where points are rewarded for game play. Typically, such a club or system requires player identification, and preferably includes a second form of player identification, such as a code or their own personal PIN number.

In one version, a game comprises the steps of randomly selecting a target number from a first range of numbers having a minimum and a maximum, e.g., from 20 to 50. The number may be selected by the house, or by a player, or by an alternate method of number selection. After presenting the indication of the target number to the player, the player selects numbers from a second range, having a minimum and a maximum, where the maximum is equal to or less than ½ of the minimum of the first range. For example, the second range may be from 1 through 10. The player elects whether or not to draw another number from the second range. The player continues to draw, and the total number of the various graphical or audio depictions being summed, until the player declines to draw further. At that point, the system then draws repeatedly (either predetermined or random) from the second range. The player wins if the system draws numbers which total in excess of the target number. The system wins if the drawn numbers exceed the player's total. Optionally, the system may provide an indication of the odds that the player could go over the target with a subsequent draw. This game is arbitrarily termed JACK-O.

In yet another game, arbitrarily termed POKO, the system receives a buy-in or purchase from the player. Multiple indicia are randomly selected from a predefined set, e.g., the numbers from 1 to 10. The system may select a predefined number of numbers, such as 5 numbers. A graphical depiction of the randomly selected indicia are displayed to the player. Optionally, the display may consist of a depiction of a ball, such as the type of ball used in a lottery drawing. Next, a second group of multiple indicia are randomly selected from the predefined set. The number of indicia selected is the same for both the player and the house or system. The first and second sets of numbers are then compared under predefined sets of rules to establish a winner. Payment is then provided to those winning under the rules. By way of example, the system may define a rule for an automatic winner where the player receives five of a kind, e.g., five 7's. Other rules may be utilized, including those from conventional games, such as Poker.

In yet another game format, a second or ancillary game is played in parallel with a first or primary game. By way of example, in association with a first game comprising a lottery number ball draw, a second game may involve a selected player's guessing whether the next ball draw will be of a higher or lower number, or odd or even or the like. For example, during the real time ball draw for a lottery, the improved game play could involve running a parallel or ancillary game along with the ball draw. One implementation could involve a first ball draw, followed then by game play by a contestant such as predicting whether the next ball drawn could be of a higher or lower number, or could be odd or even. The underlying ball draw may be performed (either as an actual drawing or through the use of a random number generator or the like) in real time or may consist of previously generated numbers, including the use of drawn numbers from an earlier drawing.

In one implementation, the master of ceremonies could advise the player which of these options had a better probability of being the outcome, thereby making the ancillary game more a game of chance as opposed to a game of skill. Optionally, scoring may be done, such as where one player or audience participant is scored or ranked relative to another player or participant. Optionally, this game may be played through a quick pick format, or through an online or other real time communication network format.

Yet another game format is arbitrarily termed The Zone. In this game, a number is randomly selected from a first range of numbers preferably having a minimum equal to the sum of the lowest numbers to be drawn and a maximum equal to the sum of the highest numbers to be drawn. The game proceeds with sequential drawing of numbers until the player has a total of the draws approaching a predefined zone away from the target number. For example, the target zone may be numbers within 10 of the target. Payment amounts are based upon the player's proximity to the target number, preferably without going over the target number.

Yet another game is arbitrarily termed Perfect 10. The game permits extended reveal of the game result in an electronic environment. In one embodiment, the result is a predetermined outcome. In one implementation, a player initiates contact with the system to begin game play. Optionally, the prizing mechanisms are provided to the player. For example, the player may be advised that achieving a score of 10 results in the top prize, achieving a score of 9 results in a lesser prize, e.g., a $2.00 win, and achieving an 8 results in yet another prize, such as an additional free play of the game. The player receives a first number, typically within some range such as 1 to 5. The player then receives a second number, typically selected from the same range of numbers, and the first and second numbers are added. If the cumulative score is less than the lowest prizing level, the player receives a third number which is then added to the previous two. Prizing results if the sum of the number equals one of the predefined win levels. The game may be played in a predetermined manner, that is, the loss, win, and if so, amount, may be known to the system prior to game play. The game may be played as a simple automatic reveal, or played where the player's input affects the outcome. This game is particularly suited for play on a mobile phone, such as those utilizing a messaging system, such as SMS.

Yet another game is one played at a multiple number of levels. At each level, the contestant is presented with multiple options, such as a depiction of four uniquely labeled boxes, amongst which the contestant may choose. The options could include at least one positive outcome and at least one negative outcome. In the case of four boxes, e.g., one could include a strike, two could include a monetary amount, which may be either the same or different and optionally, the fourth box could comprise a mystery box, described below. The contestant selects, at random, one of the options. If the option selected is one of the positive options, such as a monetary amount, they proceed to the next level and the winnings (cash or non-cash, e.g., points, free play, advancing to other levels) are added to the prior winnings total. If a negative option is selected, such as a strike, in the preferred embodiment, the level is reset and play continues at that level. Preferably, the player is allowed a predetermined number of negative events, such as three strikes, prior to discontinuing play. The occurrence of a negative event may result in the player going back one or more levels.

The 'mystery box' consists of a decision within a decision. A first decision was to select that option, which then was revealed as comprising a mystery box. The player is then given the option of whether to reveal that option. The option within the mystery box could include at least one positive result and optionally at least one negative result. In the preferred embodiment, there could be three results possible with a mystery box, a positive result such as a multiplier for the money, such as a doubler of the contestant' prior winnings, an updating of the safe level for the player or an additional monetary amount. Alternatively, other positive results such as a free play or a reduction in the number of negative events is possible. Preferably, the probability of a negative result from the opening of the mystery box should be equal to the probability of a negative event if the mystery box were not selected.

In yet another aspect, game play utilizes the real time data compiled during a lottery ball draw. Most particularly, the data regarding the number of potential lottery winners is utilized for companion game play. The data may be used directly, such as where the absolute number is guessed or by counting the number of times a give digit appears, or indirectly, such as where the game determines if a digit of the next number will be higher or lower than the last. The data may be used as a secondary random number generator.

The prizes at the various levels may be set as desired to result in a predetermined payout and prizing structure for the game. Optionally, guaranteed low end prize structures (GLEPS) may require payment of predetermined prize amounts, and possibly payment of a minimum amount of a prize e.g., $500.00. The monetary spacing between various levels may be set as desired, either as an arithmetic progression or as a multiplicative progression, e.g., a substantial doubling of the prize amount at every level, or at any arbitrary level. Optionally, when a maximum game level is reached a jackpot or other proportionally large prize may be awarded. If the jackpot is not won in a given game, it may then roll over to a subsequent game. Parimutuel prizing may be employed, that is, where there is some form of prizing based on the amount wagered or otherwise put in play by the players. Alternative forms of progressive play may be utilized.

Various prizing structures may be utilized with the games. The prizing structure may optionally include a virtual GLEPS (vGLEPS) system in which the universe of play numbers may be subdivided to promote a desired guaranteed prizing structure. By way of example, the universe of potential plays may be subdivided into smaller units or subunits, e.g., a "book" of 100 plays, and then the prizing structure applied to those subunits. The subunits may serve to implement a guaranteed prizing structure. Within the subunit "book", the predefined number of specified wins could be assigned to that subset of plays. The use of the prizing structure on the subset may be applied to a subset of N numbers, where N is arbitrary, ranging from a relatively small number, e.g., 10, 50, or 100, up to and optionally including where N equals the potential universe of game plays. In yet another implementation, the prizing structure maybe applied on a per player basis. The set of plays by a given player may be subject to the prizing structure rules such that a player could be guaranteed a certain minimum prizing over some number of plays, e.g., 50 plays. Yet other subgroupings of the universe of potential plays may be made. A grouping may be made by a combination of players, e.g., for a "tournament", they may be grouped by the source, e.g., the retailer or sponsor, they may be grouped by geographic region, e.g., various states, cities, or countries, they may be grouped by time, e.g., the prizing structure being applied in its entirety per day, per week, they may be applied by a particular game or a collection of games, or by any other predefined criteria for definition of a subunit. The subunit may be defined by a combination of factors, e.g., the prizing structure being applied for game play associated with a given retailer in a given geographic region. Yet other aspects of game play may be GLEPSed. For example, the amount of game play time maybe subject to predefined rules. Thus, the play may be set such that at least a certain percentage of the plays are extended play.

The prizing structure may include a hybrid rule set in which a first set of prizes are assigned to subgroups, but a second set of prizes is either unassigned by rule or is subject to a second set of rules, different from the first set of rules. For example, a vGLEPS system may be utilized for assigning low tier prizes, but higher level prizes are assigned based on skill of the player. Alternately, the first game phase may serve to qualify the players to enter a second phase, and no prizing is associated directly with the first phase. Further, success in the first phase of play may lead to a variable prizing phase, such as where the players with the top scores in the first phase are permitted to play the second phase for the top prizes. In this way, the player's results in an earlier phase of the game determine their ultimate level of winnings in a later phase of the game. Players may thus be required to qualify to enter the prize pool. Optionally, the prizes remaining in the pool may be displayed to the players. Either all of the prizes remaining may be displayed, or only a subset of prizes remaining may be displayed, as where the top prizes remaining are either displayed or suppressed from display.

In yet another aspect, of a multi-level electronic environment a first phase of a game is played interactively between one or more users and the system, followed by a second phase in which prize information is revealed. More particularly, the prize information which is revealed is preferably determined at least in part by predefined imposed prizing parameters. By way of example, the predefined imposed prizing parameters may include a GLEPS type system, which characteristically includes a requirement that 1 out of X, e.g., 1 out of 7 events is a winning event. Yet another example of a predefined prizing is setting a defined percentage payout, such as 50% or 75%. Many of the predefined imposed prizing parameters may be defined by a lottery sponsor, and may ultimately be defined by legislation (typically state based or national legislation outside of the United States).

In another aspect of this invention, game play in a first game may require progression through a plurality of levels, leading to game play on a second game for those who have reached the maximum level on the first game. In one implementation, the maximum prize level in the first game may be equal to the minimum prize level in the second game. The various levels of game play may also include various prizing levels. In one implementation, the user may play a first game, typically for a wager, and if they win, be given the option of playing a prize board or other prizing step. The player may be given the election of whether to play the prizing step at that time, or to return to game play with the option of later playing a different prizing step at a later time. Optionally, a further wager is received for the next round of game play. The prizing steps could typically be of more value as the player progressed, e.g., a Silver prize board, a Gold prize board and a Platinum prize board. The increased value could be any or all of: the minimum prize amount, a guaranteed minimum prize, the maximum prize amount, the odds of winning, or any other parameter relating to prizing Various modes of play are contemplated. In studio game play may be utilized with a broadcast, either live or for taped replay, at a studio, at home or with a networked camera, such as a camera on a computer networked through the internet. Yet another mode of game play involves playing at a gaming venue, such as where other games of chance, e.g., slot machines, are played. Yet another venue may consist of game play by the player from their hotel room in a venue which allows gambling. In yet another mode of game play, a network, such as the internet, may be utilized to permit game play, whether for a monetary amount or to provide other points or indications of score. The game may be played in any venue where not prohibited, whether on land or in an airplane or ship, and may be played in any form of wired or wireless environment, such as via hand-held web enabled communication devices.

The game may be played by a single individual, or may be played with multiple players. The multiple players may play against one another, for scoring, or may merely play in parallel without further interaction.

In yet another aspect, methods and apparatus are provided for participating in on-line or other electronic access games, especially lottery games played over a network, such as the Internet. A player could obtain a lottery product, either scratch-off or on-line directed to playing an electronic game, such as a game on the Internet or played through a telecommunication network, either wired or wireless. By utilizing the conventional sales and distribution channels, the traditional safeguards regarding sales of gaming tickets to under aged players can be maintained. Having obtained the ticket containing a participation number, the player may then enter that number, which could enable play for the amount of money purchased. The number may be entered electronically or manually, and any form of input device may be used, such as keyboards, keypads, telephone buttons, bar code or other scanners. Winnings may be paid out by presenting the ticket to a retailer, who could verify the winnings via a conventional on-line system. Alternately, winnings may be credited electronically, such as by providing a credit to a credit card or other linked financial account. Optionally, the ticket may contain variable information regarding the electronic play, such as the amount to be won, the level of difficulty of a game or what game could be played.

In yet another aspect, the games may be played either with real money, or may be played with virtual money, sometimes referred to as vCoins. A vCoin will typically be a multiplier times the corresponding numeric monetary value, e.g. one dollar equals 500 vCoins. The multiplier is typically an integer number, and is usually an amount of 100, 500 or 1000, though any amount may be used. The multiplier may be fixed over time and over games, or it may vary based on factors, such as time, game or player status. For example, play during certain times may result in 'double vCoins'. The multiplier may change for different games, such as where the multiplier increases where the real or perceived level of skill required is greater. vCoins may be acquired by purchase, or may be awarded in a non-cash purchase manner such as provided for a credit, an inducement or a promotion. A bonusing feature may include a vBonus, such as where a certain amount of vCoins are awarded, either as a result of game play or merely randomly. The vCoins may be traded for cash or other forms of games, prizes or non-cash goods or services.

In yet another aspect, the games may be played by an automated systems, sometimes referred to as a vBot. The player would typically set parameters for the vBot, such as defining how much to bet per game or per hand. A quick pick option may be provided.

Methods and apparatus for game play using virtual players, sometimes referred to herein as vBots, is disclosed. In one aspect, a method for game play involves the use of the system electronic system environment described herein, wherein one or more virtual players are displayed to the player of the game, preferably, the virtual players have differing play characteristics, receiving from the user association with a selection of a virtual player, displaying a simulated game using the virtual players, identifying a subset of the virtual players as being winners of the simulated game, and awarding a win to the lottery user if the selected virtual player is in the subset of virtual players. In this way, the player of the game is selecting a virtual player to do the playing of the base game, thereby providing the excitement of player participation in a game of skill or chance, yet not actually be playing the game.

Yet another parameter for modified and enhanced game play is the arrangement and presentation of various graphics, symbols, or icons (collectively "indicia") to the player. The arrangement of the indicia in a predefined arrangement indicates that the player has won. By way of example, a grid or array arrangement may be used wherein the winning combination is a set of indicia arranged in a line, either horizontally in a row, vertically in a column or diagonally. Other patterns using multiple adjoining segments may be used, such as an X-pattern or a T-pattern. Alternatively, a predefined patter of non-adjoining segments may be used, such as where a win includes matches in a four corners or north, south, east and west positions.

Accordingly, it is an object of this invention to provide systems and methods for implementing mandated parameters and optimized game play and prizing experience through the selection and implementation of variable parameters.

It is yet a further object of this invention to provide an improved game of chance having a higher level of audience interest and potential participation.

It is yet another object of this invention to provide for an improved electronic games of chance.

It is yet a further object of this invention to provide for enhanced modes of game play in association with existing forms of game play.

It is yet a further object of these inventions to provide systems and methods to prevent gambling abuse, such as underage gambling or to encourage age appropriate game play by utilizing the lottery infrastructure.

It is yet a further aspect of these inventions to provide for an enhanced electronic game play experience.

BRIEF DESCRIPTION OF THE DRAWINGS

FIG. 5 shows a perspective view of a casino type apparatus.

FIG. 6 shows a lottery ticket for possible participation in a feature broadcast game show.

FIG. 7 shows a perspective view of a scratch off implementation of the game.

FIG. 8 shows graphical depictions of a lottery game termed POKO.

FIG. 12 shows graphical depictions of a lottery game in miniature form.

FIG. 13 shows graphical depictions of a lottery game termed On the Nose.

FIG. 19 is a depiction of a graphical user interface for use with the electronically remote game play system.

FIGS. 20A through 20E depict various potential data field within the remote play system.

FIG. 21 shows a chronological flowchart for game play requiring an affirmative indication of remote game play prior to redemption of the player's prize.

FIG. 22 is a chronological flowchart of variable game play.

FIG. 25A is a flowchart of a system wherein a defined set of outcomes exists, and player input may determine the outcome.

FIG. 25B is a block diagram of the components for the system of FIG. 25A.

DETAILED DESCRIPTION OF THE INVENTION

Figure 1:
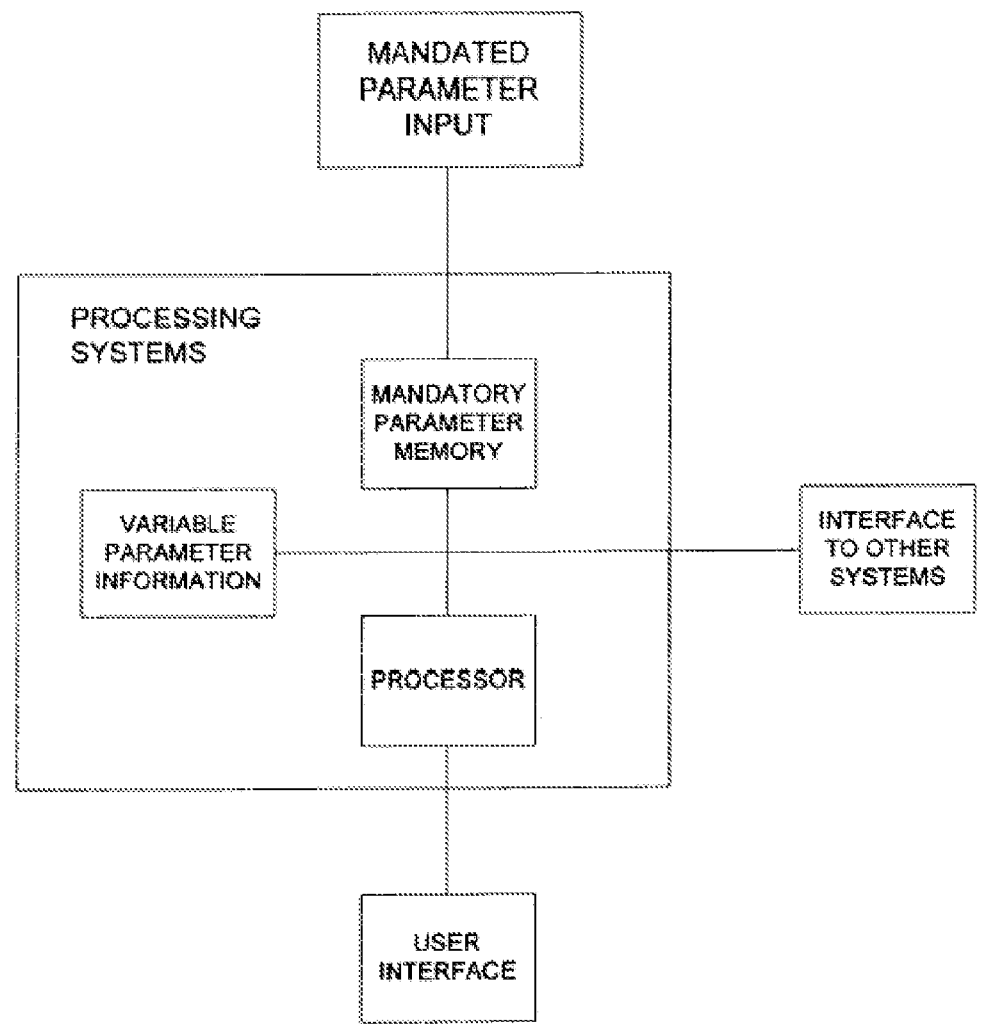
FIG. 1 shows a block diagram of the system for receiving mandated input parameters, a processor for implementing the mandated parameters through selection and implementation of variable parameters, and interfaces to the user and the remainder of the system.
Figure 2:
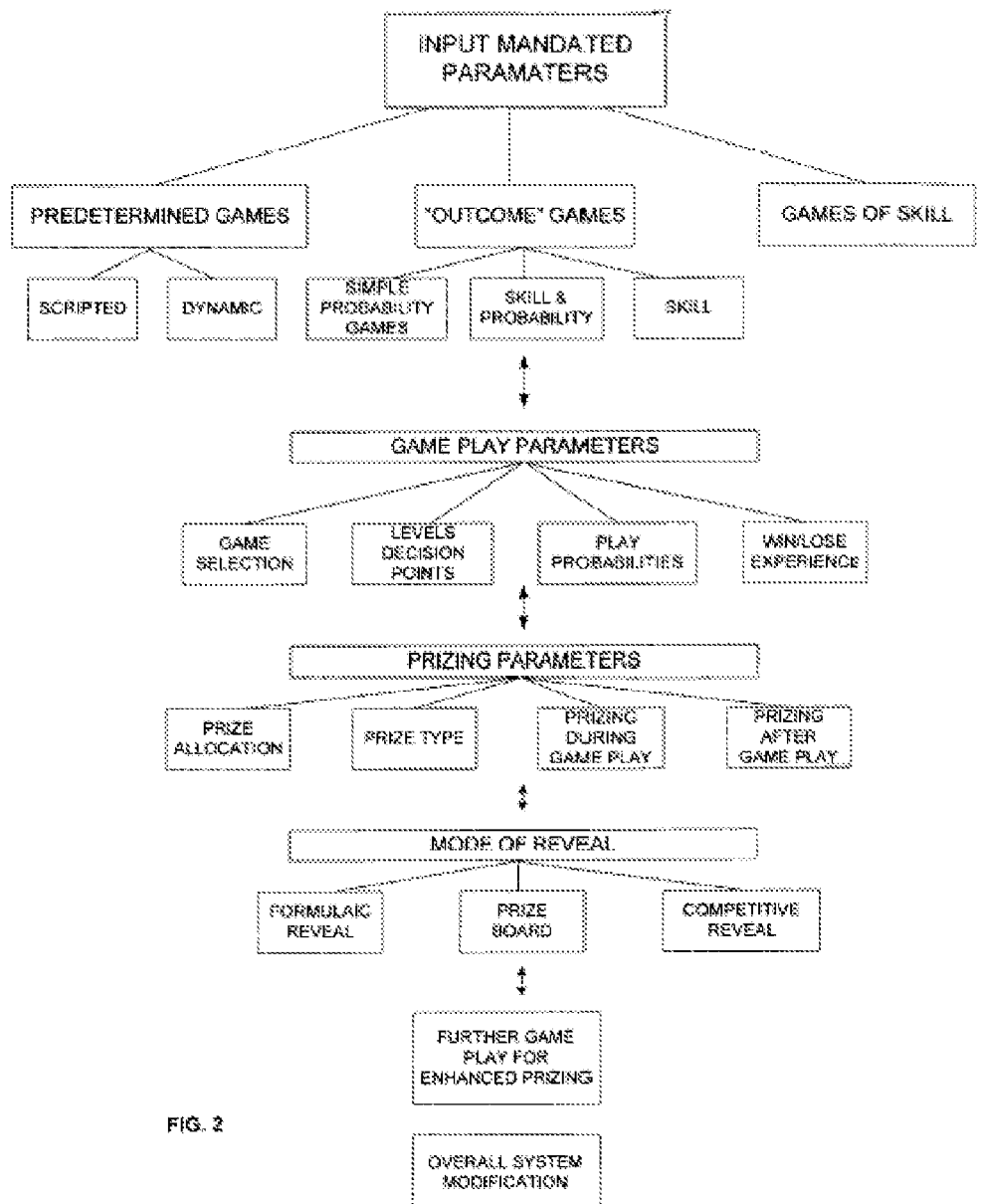
FIG. 2 is a block diagram flow chart of various functionalities performed by the methods, as implemented by the system.

FIG. 1 is a diagrammatic block diagram of one implementation of the system or apparatus for use in conjunction with the methods described herein. FIG. 2 shows a decision tree of exemplary mandated and variable parameters which may be utilized within the system. These two figures may be considered together to obtain an overview of the system and methods described herein.

Mandated parameters may be input to the processing system. Typically, the mandated parameters are then stored within the processing system, such as in the mandated parameter memory. The processor receives and implements the mandated parameters by selecting among the possible variable parameters for implementation. As shown, the processor is coupled to both the mandated parameter memory and the variable parameter memory. The output of the processor is then provided to the user via the user interface. The processing system may interface to other systems as well. The system of FIG. 1 is placed in the larger context of the overall system, for example in FIGS. 16 and 18, below.

FIG. 2 provides a decision tree or flowchart diagrammatic listing of various parameters which maybe utilized in conjunction with the systems. Parameters may in one context be a "mandated" parameter and yet in another context a "variable" parameter. For example, in one game, the lottery may mandate certain prizing structure, such as the use of a GLEPS structure, wherein other game, the lottery does not provide such a mandate, but rather, the system determines to utilize a GLEPS type structure as a variable parameter. To the extent that the description herein refers to something as a "mandated" or "variable" parameter, it is to be understood that the reference is to the particular implementation then being described. What is a "mandated" parameter in one game may be a "variable" parameter in another, and vice versa. Further, while various parameters are listed from the top to bottom in FIG. 2, they need not be implemented in a linear order, or indeed, be used at all in a given implementation. Any combination of variable parameters in any order may be utilized to achieve the mandated parameters.

Beneath the Input Mandated Parameter description in FIG. 2 comes a first level of decision, that is, whether the game is a predetermined game, an "outcome" game or a game of skill. If a predetermined game, namely, one in which a player's actions do not affect the outcome of the game, the game play may be either scripted, such as where it is a priori determined, or dynamic, such as where the game play is variable. If any "outcome" game, namely, one in which the player's actions can affect the player's individual outcome, there are the options of simple probability games, hybrid games which include a combination of skill and probability, and games of skill.

Another variable layer of decision includes the game play parameters. Game selection may be performed by the player or by the system. For a given game, there are numerous parameters, including the number of levels in a game, the decision points within the game and desired duration of the play experience. The play experience may be varied such as by awarding extended game play, providing free play awards, advancing a player one or more levels based upon game play and/or the provision of complex decisions. The game play experience may be varied by changing the play probabilities. In one implementation, game play experience may utilize real world probabilities for the game play portion of the experience, but utilize other probabilities for the prizing portion of the overall game. By way of example, a simple probability game such a coin toss should emulate a 50/50 outcome experience as far as game play goes, but may be subject to a second prizing phase in which the mandated parameters can be achieved. For example, a prize board may be utilized to reduce the prizing payout to conform to the mandatad parameters. Thus, the game play experience can feel as if the real world probabilities are being achieved, but the lower prizing payout be implemented as required by the mandated parameters. The player's win/lose experience may also be varied. For example, if the player must lose a individual game, the system may elect to give the user a loss, but one in which they appear to have come 'close' to wining a prize.

Yet another group of variables include prizing parameters. Prize allocation may be utilized, such as where the prizes are allocated by person, by multiple people, by number of plays (1:X), by source, e.g., retailer, by geography, by time (per day, per week, etc.) and by game. Prizes may be allocated by combinations of the foregoing or by hybrid systems wherein certain prizes are subject to prize allocations but yet other prizes are not. Further, the prizing may be reset on a periodic basis, such as on a daily basis, out of the possible remaining prizes so as to give a player access to the broadest possible cross-section of remaining prizes. Prizing may be done during the game play phase. For example, an outcome game may be utilized wherein the player's actions truly affect the outcome of the game, but constraining the player's prizing options to those which remain available. Alternately, the prizing may occur after a game play phase has concluded, the game play phase typically involving multiple plays or players. The system may then award prizes based on the player's ranking relative to other players, awarding the prizes based on time, e.g., the first 50 players to achieve a certain status are designated as winners, allocating prizes according to some other algorithm, or may require further competition to determine the prize winner or winners.

Yet another layer of decision consists of the mode of reveal. A formulaic reveal would be a reveal based directly on the results of the game. (See, e.g., Perfect 10, FIGS. 23A-D, below). Alternately, a prize board mechanism may be utilized, providing a perceived interactive reveal. Finally, a competitive reveal may be utilized, such as where a leader board is displayed. In one option, the leader board displayed to players may vary, such as to enhance their particular game experience.

Yet another parameter may include whether further game play is available for enhanced prizing. The player may initially play to qualify for yet further competition. Optionally, an additional wager may be required to enter the enhanced prizing round.

Figure 3:
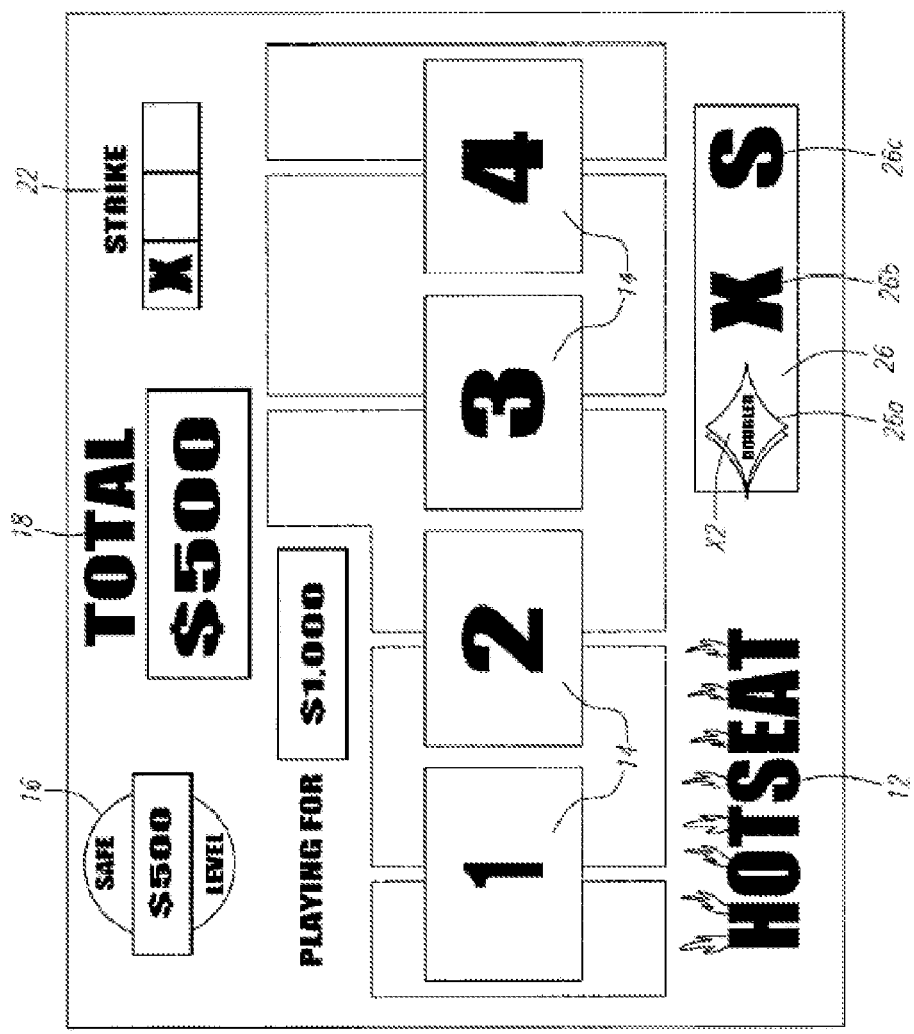
FIG. 3 shows a screen of the type particularly adapted for a broadcast type format.

FIG. 3 is a view of one possible display for use in game play. For example, the depiction may be of a portion of a broadcast studio with associated game play, such as for television broadcast. The display 10 may optionally include a logo or other word mark region 12. The multiple options presented to the players may be depicted as uniquely designated boxes 14. While shown as numbers in FIG. 3, the designators for boxes 14 may be of any form, such as letters, characters or other visual depictions. The display preferably will include other functional aspects of the game. A safe level display 16 displays that amount of money or points which are guaranteed to the player in the event that they can no longer continue with the game given that they have reached a predetermined negative level. The total display 18 shows the total amount of money, points, prizes (cash or non-cash, such as phone ring-tones, background images, display 'wall paper', points, merchandise, player's club points, affinity points, e.g., airline miles or other services such as advertisements or discounts) or other winnings accumulated by the player. The strike display 220 shows a depiction of the number of negative events, here strikes, which have occurred. As shown, the display 10 contemplates three strikes in the game. As shown, sub box 24 includes a "X" indicating one strike.

Display region 26 shows the possible outcomes from the selection of the mystery box or other denominated decision within a decision. As shown in display 10, the outcomes of the mystery box include a multiplier for the monetary amount previously won by the player, here shown to be a multiplicative doubler of the monetary amount (shown at 26*a*), or a negative result, such as a strike (shown at 26*b*) or an updating of the safe level (as shown at 26*c*).

Figure 4:
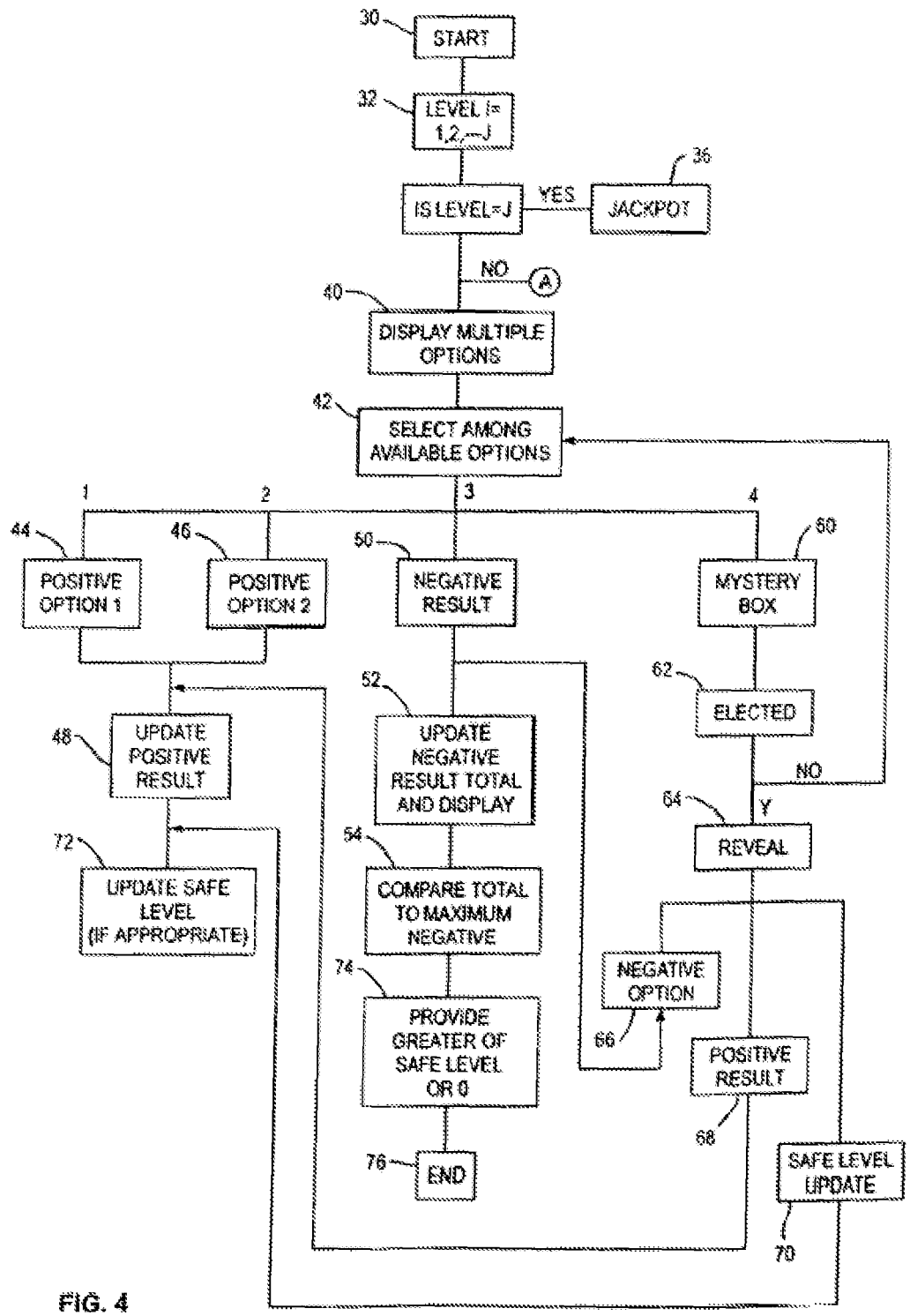
FIG. 4 is a flow chart showing options for game play.

FIG. 4 is a flowchart of one implementation of the game format. The game starts with start box 30. Level box 32 indicates the multiple levels possible for game play. Game play begins at the first level. The number of levels ends at the first level. The number of levels may be chosen consistent with the expected prizing and desired duration of the game. In the event of the broadcast version, in a half-hour or full hour broadcast format, 10 or 15 game levels may be desired. In contrast, a sixty second or few minute game may only involve three, four or five levels. Decision box 34 determines whether the maximum level J has been reached, and if so, indicates that the jackpot 36 is to be awarded. In the event that the jackpot is not awarded, it may be rolled over for future games.

Returning now to the flowchart, the multiple options 40 are displayed to the contestant. As shown in FIG. 3, the multiple options could comprise four uniquely numbered boxes or squares. Any form of display or random selection may be utilized. Thus, while the term "display" is utilized, it should be construed in a manner consistent with selecting, such as where an alternative random selection method is utilized. One possible alternative is the ping pong ball draw, such as where the balls are distinguishable and are drawn by the machine. Yet another selection method could include a computer generated selection, such as through the use of a random number generator. Thus, the output of selection box 42 is a determination of one of the various possible outcomes from that election or selection.

As shown in FIG. 4, two positive options, positive option 1 44 and positive option 2 46 are shown. The positive options 44, 46 may represent a monetary amount, a point value or other financial or prize information. In the preferred embodiment, the positive options are of an equal amount, though they may be of differing amounts or of differing types of prize.

The negative result box 50 may be of various types. In the preferred embodiment, the negative result 50 may comprise a strike. Preferably, the game is structured as to permit a predetermined number of strikes, such as 3 strikes, prior to the player losing the game. In such a system, the system could update the negative result tally at box 52, and perform a comparison 54 of the totaled number of negative events to the maximum number of negative events allowed. If the comparison 54 indicates that the maximum number has been reached, then program flow proceeds to box 74 where the player is awarded the last existing safe level amount, or if no such safe level amount exists, then whatever minimum prize is indicated according to the rules. That minimum amount may be 0 or some other guaranteed amount. Certain lottery systems require guaranteed low-end prize structure (GLEPS) which guarantee a certain prize or result for certain contestants.

The fourth option shown in FIG. 4 consists of the mystery box 60. In the preferred embodiment, the competitor is given the option at decision stage 62 whether to reveal the content of the mystery box. If the player elects not to elect the content of the mystery box, then play resumes at the same level with four boxes. However, if the player elects to reveal the content at step 64, the content may consist of a negative option 66, positive result 68 or safe level update 70. In the event that the negative option 66 is selected, the negative result is updated at box 52, with the player indicated comparison step 54 being performed. Program operation is the same as for the flow leading from the negative result box 50. In the event that a positive result 68 occurs, the program flows to box 48 for an update of the positive result. For example, if the positive option 1 44 is a monetary amount, the monetary amount may then be added to prior winnings, or alternatively may be the entirety of the award which may be won.

If the safe level update box 70 is selected, the safe level is updated at box 72. In this way, when the player has reached the maximum number of events at box 54, the safe level amount 72 is then provided. After the update of the positive result 48, and optionally, an update of the safe level 72, program flow returns to the level selection 32, at which time the next higher level is selected.

In the preferred embodiment if the number of negative results is less than the maximum number of negative results (box 54), then the decision flows to path A, which returns the player to the decision to select among the available options 42. In the preferred embodiment, when the player has received a strike at a given level, the level is reset and played again. Alternatively, in the event of a negative event, the negative event could be tallied and the player advanced to the next level.

FIG. 5 shows a perspective view of a device for use at a gambling or gaming venue. A housing 80 may include a display 82, such as a CRT or flat panel display, on which is displayed the multiple options 84. The other information or designations may be as described in connection with FIG. 3 and FIG. 4. For example, the display 82 may include a designator 86 for the amount the player is playing for. A display 88 may visually depict the number of strikes existing. A selection system 90, such as an array of buttons is utilized for player input of the desired selection. However, any mode or manner of input may be utilized. For example, a computer mouse, voice detection system or other input mechanism permitting the player to interface with the machine may be utilized consistent with the goals and objects of this invention. The display may include a depiction of the total amount then won, or comprising a safe level. Optionally, a slot 94 for pay back of a player's winnings may be provided. Alternatively, the payment format may be of any various modes, such as if players based upon the use of credit card information, the credit card may be provided with a credit in the event that the player is a winner.

The displays of FIG. 3 and FIG. 5 may be of various types and resolution. For example, certain of the displays may be in a standard resolution format, whereas others may be in a high resolution format. Certain of the displays may show a graphical image, whether static or dynamic, and yet other displays may show textual information. Combinations of any of the preceding, e.g., text on certain displays and high resolution dynamic images on other displays, may be utilized.

In addition to visual displays, voice prompts may be provided, such as where the contestant is prompted to enter information or is otherwise cued to provide a responsive action. Voice input to the system is also feasible.

FIG. 6 shows a ticket 100 having a front face and a back face. The ticket 100 may include textual data such as state lottery or may include other graphic indicia indicative of the game. In one implementation, the lottery ticket 100 includes a means or mechanism for the players to be selected for inclusion in a broadcast in the underlying game. A scratch off layer 106 is deposited an operative portion of the ticket, which, when removed, reveals images. As shown in FIG. 6, the scratch off layer has already been removed from the left and center images, depicting the television sets. Thus, if the player were to possess a card 100 that had three television sets, that may form the basis for their participation in the broadcast game show, or to permit them to participate in the selection process leading to a further game, such as the broadcast game. By way of example, having a lottery ticket with three similar images may permit the player to be entered into a drawing or other selection mechanism for game play.

The images 104 and game play associated therewith may be in addition to the game play of a lottery, such as designated by the numbers 108. Thus, if a player purchases a ticket and receives numbers 108, they may be additionally entitled to play the game depicted by the graphics 104 for possible play on a future lottery game show. In this way, interest in a future lottery game may be created through game play on an existing lottery.

As shown, the ticket 100 optionally includes a bar code 112. As shown, the bar code 112 is disposed on the backside of the lottery ticket. The bar code 112 may be placed wherever desired. In operation, the machine readable bar code may be utilized for tracking or other monitoring purposes.

FIG. 7 shows a perspective view of a ticket or card 120 representing a scratch off version of the multilevel game. Card stock or other substrate 120 has printed thereon an indication of the various levels of the game 122, such as 1, 2, 3 . . . 15. The player is presented with multiple regions 126 for scratch off. As shown, the player having scratched off the first box at level 1 revealed a winning prize of $2.00 at level 2, the player selected the second column, which results in a strike or X. At level 3, the player revealed the right most scratch off, revealing a winning number of $3.00. At level 4, an X was revealed in the third column. At this point, the player has two strikes. The player has then further elected at level 5 to reveal the scratch off in the first column. Thus, at this stage, the player has $7.00 of revealed winnings and two strikes. At this stage, the player could elect to discontinue play. The ticket may then be brought to a redemption center and receive the money in exchange for the ticket. In the event that the player continued to reveal obscure information, and that the predetermined number of negative events, such as 3 strikes, was reached, the ticket could become void and no compensation could be provided.

The games of this invention may be adapted to an on-line selection format, such as where a potential player purchases a lottery or lotto ticket at a retail vending location. The player may be prompted to provide their selection of numbers, such as where they provide one of four numbers for each level. That information may then be passed in an on-line manner to the lottery system. Optionally, game play on the television or other broadcast media may be used for game play by the viewing audience. For example, the game play of successful game play at a given level may be compared to the player's selections previously made through the on-line process. Improved audience viewing levels of a game of chance could result.

The game described herein may be played in any variety of formats. For example, the game may be played in a 30 minute or 1 hour television broadcast type format. Alternatively, the game is adaptable to a short, e.g., 60 second, format. Game play may be done in a broadcast mode, such as through in studio participation, either live or taped. Alternate modes may be utilized, such as in a gaming or gambling establishment. Game play may be over a network, such as the Internet or an Intranet. In an Internet game the player may provide credit card information or otherwise have an account with a monetary stake, and that amount may be increased or decreased as the player wins or loses. Alternatively, instead of money, the player may play for points.

Contestant selection may be done by any number of modes or modalities. For example, as described in connection with FIG. 6, a scratcher type ticket approach may be utilized. Alternatively, an online ticket may be utilized wherein during the printing of the play slip (to reflect the numbers either selected by the customer or generated by a quick pick). In an alternative implementation, Internet play, such as the high score may be utilized to select future contestants. In yet another implementation, a real time selection may be utilized, such as where a player is on the net and is selected by the system for future game play.

FIG. 8 shows various graphical depictions relating to a lottery game. The game is termed "POKO", but may be variously named. In a first step, a player "buys in" or otherwise pays for access to the game, either by affirmatively providing a wager amount, or by accepting a preset amount as a buy in. The acceptance may either be through an affirmative act, such as through payment of an amount at an in-store, on-line location, or through other forms of remote game play, such as by clicking or otherwise accepting or entering an amount into a computer or communications device, or merely through acquiescence and continuing game play (especially where a preexisting credit account or other ability to determine credit worthiness is utilized).

After having received the player's buy-in, the system randomly selects multiple indicia from a predefined set. In one embodiment, the predefined set may comprise a set of numbers, such as 1 through 10, and the number of indicia selected may be 5. As shown in FIG. 8, the graphical indicia may constitute numbers, further being depicted on an image of a ball, most preferably a ping-pong type ball, and may optionally include audio sound effects. In addition to, or in lieu of numbers, graphical images may be utilized, including classic card images including Ace, King, Queen and Jack. Since a physical card deck is not utilized to select the multiple indicia, but rather, a random selection is utilized, it is not possible for the player to "count cards" in the game.

After the various indicia, e.g., a set of first numbers, is selected, they are provided to the player in some graphical depiction. The mode of presentation of the graphics may vary, and the mode of presentation may be selected consistent with the communication bandwidth available. For example, if the game is played over a wireless device, especially one using a text messaging service, such as SMS or equivalent service, the graphical depiction may be merely of the number or other alpha numeric character supported by the display set of the device. For example, when playing POKO, the display may show 77777 indicating the player's numbers, or may optionally also include the display for the house. Characters may be displayed all at once or over some period of time. In systems permitting download a relatively higher bandwidth environment, the graphical depiction may constitute an image of the indicia, such as a number, on a ball, such as a ping-pong ball. The indicia may be displayed to the user on a screen, such as when the game is played over a computer network (wired or wireless), or may be printed on paper or other support media such as when a player purchases a ticket from a business establishment (retail location, kiosk or other commercial location) utilizing an on-line ticket dispensing system. Alternatively, the numbers may have been picked beforehand, printed onto a support medium and obscured, such as through the use of a scratch off layer.

The player now having received their numbers or indicia, the game proceeds to the selection (predetermined or random) of a second group of multiple indicia from the same predefined set. Thus, in one embodiment, the "house" (also variously referred to as the system or equivalent terminology) could select an equal number of indicia, such as by selecting five numbers. Preferably, the mode of display of the second group of numbers is similar to the first. Thus, as shown in FIG. 8, the ball indicia are utilized for both the first set of numbers (the players) and a second set of numbers (the house). Next, the first set of indicia and the second set are compared in order to establish a winner under a predefined set of rules. As shown in FIG. 8, a "POKO" may consist of all indicia being identical, such as where five 7's are drawn. In relative order, five of a kind would be four of a kind, which in turn would be a full house, which in turn would be three of a kind, which in turn would be two pairs, which in turn would be a single pair, which in turn would beat a high ball. As shown in the graphic of FIG. 8, if the player's hand consisted of a 9 4 9 9 9, and the dealer's hand consisted of an 8 8 8 8 7, each player having four of a kind, the player would win given that their number is higher.

Finally based upon the outcome of the winner determination, payment is provided, as appropriate. In one implementation, any POKO winner could share the overall jackpot. Other winning hands may be paid out with a fixed amount. For example, those having five a of a kind may receive $100, those having four of a kind receiving a smaller amount, e.g., $50, and so on.

While the foregoing description utilize the winning hand determination of poker as the defined set of rules, other existing game rules may be utilized as desired. By utilizing a truly random mechanism for selecting the indicia, the game becomes one of chance, as opposed to having a component based upon skill. Further, by utilizing a graphical depiction drawn from the conventional images associated with a random draw in a lottery, the game achieves more of a look and feel of a lottery, as opposed to a game of skill.

While described, above, for one player, the game may be expanded to an arbitrarily large number of players. When the game is played in a real time environment, such as over the television or other communication network (wired or wireless) the game may be played at predetermined times. For example, the game may be played every 15 minutes on the hour, once a day, etc. Optionally, a portion of the collective monies being wagered may go into the pot. In this way, there is the possibility of a carry-over amount, and the possibility of a "lottery fever". In yet another aspect, the game permits multiple purchases of entries. For example, a player buying tickets at a retail establishment may purchase a first ticket and only receive a "pair" of matching numbers. The player may continue to purchase additional tickets until receiving one that the player believes may be sufficiently valuable to have a acceptable chance of success. Such an arrangement may be performed either through a standard quick pick arrangement or via a scratch off. In contrast to a conventional lottery number selection scheme, the player must be precluded from selecting their own numbers in this game.

In yet another aspect, a push/pull system may be utilized. In such a system, the main system initiates the contact with the prospective players, such as by sending an SMS message or email. The player may then elect to participate, or not. In the event that the system provides information to the prospective player about their possible numbers, then the system may require a variable level of payment, such as where the system charges a first amount if the player elects to pass, in a second, higher amount, if the player elects to participate in the game.

Figure 9:
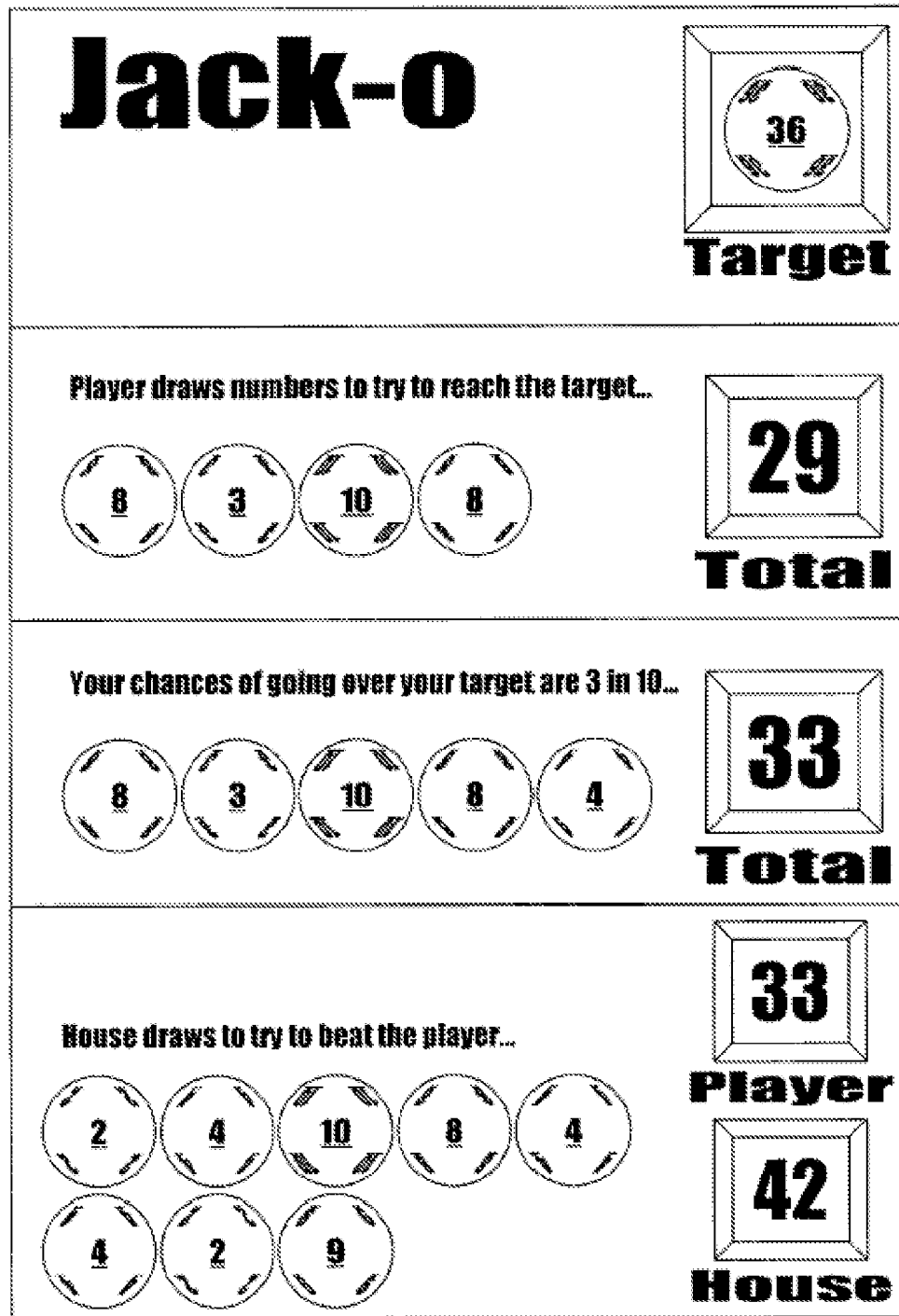
FIG. 9 shows graphical depictions of a lottery game termed Jack-O.

FIG. 9 shows a depiction of a lottery game termed "JACK-O". As shown in FIG. 9, a target number is randomly selected from a first range of numbers. The range of numbers includes a minimum number and a maximum number. For example, a typical range for the target numbers could be from 20 to 50. The player or the "house" (the system implementing the game) may select the target number. A graphical indication of the target number is presented to the player.

Next, a number is randomly selected for the player, where the number is selected from a second range, the range having a minimum and a maximum number. The maximum of the second range is equal to or less than ½ of the minimum of the first range. By way of example, if the second range is from 1 to 10, the first range is at least 20. Game play continues by receiving an indication from the player as to whether to draw again. If the player elects to do so, a next randomly selected number from the second range is presented to the user. The cumulative amount of the draws is titled. This step is repeated either until the player declines to draw further or the title exceeds the target number. In the event that the player declines to draw, the system randomly selects numbers from the second range, accumulating those numbers and comparing the total to the player's accumulated total amount. The winner is the one who has the highest total closest to or equal to, but not exceeding, the target number.

In yet another aspect of this invention, the player may be advised upon the option for a draw that there is a possibility of going over the target number. Further, the system may optionally provide an indication of the odds of exceeding the target number.

In one implementation, this game could be played in an interactive mode. Computer or other communication access could permit effective game play. Multiple players may play in parallel against the house, with the display for the other players being included upon all player's screens. While the main implementation contemplated includes a graphical display, yet other forms of conveying information to a player may be utilized, e.g., by providing the information audibly to the player, such as via the telephone or other speaker arrangement on a communications device.

Various aspects of enhanced game play and novel game are disclosed. In a first aspect, the game play method and system provides for the playing or running of a parallel game or ancillary game along with a first or primary game. For example, during the real time ball draw for a lottery, the improved game play could involve running a parallel or ancillary game along with the ball draw. One implementation could involve a first ball draw, followed then by game play by a contestant such as predicting whether the next ball drawn could be of a higher or lower number, or would be odd or even.

In one implementation, the master of ceremonies could advise the player which of these options had a better probability of being the outcome, thereby making the ancillary game more a game of chance as opposed to a game of skill. Optionally, scoring may be done, such as where one player or audience participant is scored or ranked relative to another player or participant.

Figure 10:
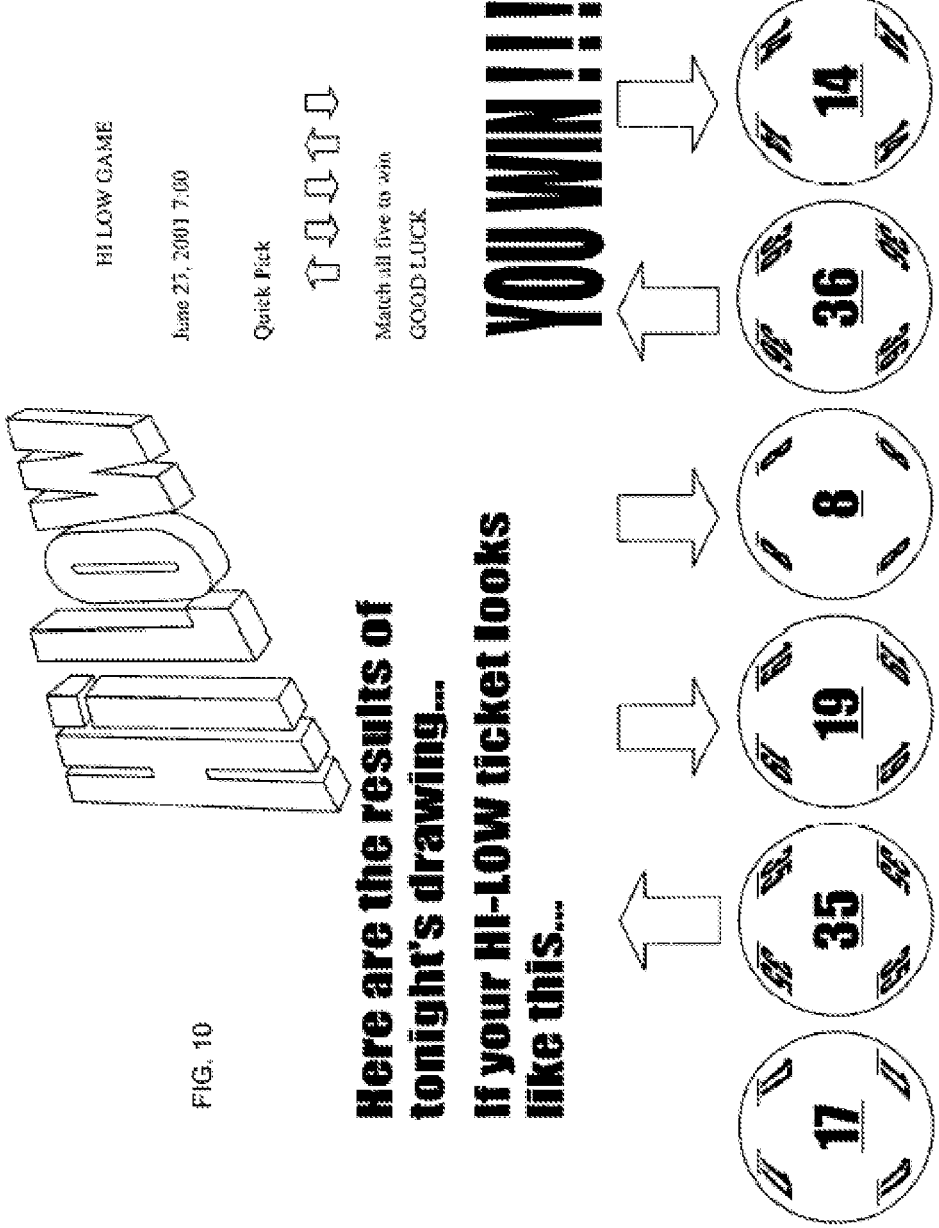
FIG. 10 shows graphical depictions of a lottery game termed High-Low.

FIG. 10 shows a graphical depiction of a game termed "HIGH LOW". The game is played along with a first lottery selection of a series of randomly selected numbers. For example, the instant game could be played in conjunction with a ball draw of six randomly selected balls bearing unique numbers for purposes of a traditional lottery game. The instant game then includes the step of receiving an indication whether the second ball to be randomly drawn in the base game will be higher or lower than the first draw. The player may continue through the game so long as there prediction as to higher or lower is correct.

In one implementation, the monetary award to the player may be based upon the number drawn in the base lottery. For example, if the first ball drawn in the lottery is 17, the potential prize award amount could be some multiple thereof, such as $17,000.00. If the next number drawn in the base lottery is 35, and the player as guessed "higher", then the 35× the multiplier, e.g., $35,000.00, may be added to the prior total, raising the potential winnings to $52,000.00. Of course, monetary amounts can be deducted for incorrect answers.

The game may be played in real time, that is, simultaneously with the base game, where the input mode permits essentially real time input. For example, input via a computer system or other communication system (wired or wireless) may be utilized. Alternatively, the selection of high/low may be made prior to the selection of the base numbers. The selection of the high/low may be made affirmatively by the player or may be done by a quick pick method. As shown in FIG. 10, a ticket may include an indication as to when the base game will be played, e.g., Jun. 27, 2001, at 7:00 p.m. And indicates the series of high/low outcomes. By running this game in parallel with the base lottery selection, viewer interest in the base lottery drawing is prolonged. Optionally, yet another option to win based on the full outcome of the base lottery selection may be provided. For example, the total number of "higher" ball draws may be rewarded. Alternatively, the final sum of the various ball draws may be rewarded.

In addition to monetary awards, the result of the game play may result in other opportunities or prizes. For example, the winner of the corollary or ancillary game may be placed in a pool for a drawing to be on a subsequent television or other broadcast show, such as a subsequent base ball draw. Systems and software currently exist, such as those supplied by Gtech, which permit the real time monitoring of the number of players holding tickets or participation interests which are still potential winners. In connection with the high/low game, the system may also monitor in real time the number of players of the high/low game who remain as potential winners.

Figure 11:
FIG. 11 shows graphical depictions of a lottery game termed The Zone.

FIG. 11 shows a graphical depiction of a game entitled "The Zone". The game is intended to be played in conjunction with a lottery type ball draw, that is, a drawing involving a random selection of a series of numbers. Typically, the series of numbers for the ball draw is in the range from 1 to 49. The maximum total of the numbers in the ball raw may be determined. Where the numbers are sequential, summing of the six largest numbers (44 to 49) is 279. The minimum number (summing 1 through 6) is 21. The player receives a randomly generated number. The number may be provided through a quick pick scheme, through a scratch off of a preprinted ticket, or by transmission of the selected number over a communications network (wired or wireless).

The random selection of a series of numbers for the base lottery then proceeds. The numbers for the base lottery are then tallied. Prizes are assigned or awarded to players based upon a schedule. For example, if the player's number equals the lottery total, the maximum prize could be awarded, e.g., $100,000.00. If the player's number is 1 away from, preferably 1 less than, the lottery total, a lesser prize is awarded, e.g., $5,000.00. The prize amounts continue to decrease as the difference between the player's number and the lottery total increase. Optionally, no further prizes are awarded once the difference between the player's number and the lottery total exceeds a certain number, e.g., 10 away. In the preferred mode of play, prizes are awarded only to those who have a player's number not exceeding the lottery total.

FIGS. 23A-D depict graphical displays for a game arbitrarily termed Perfect 10.

FIG. 12A shows the prizing structure in one implementation. As shown, the score of 10 results in awarding of the top prize, e.g., a monetary amount relatively larger than the middle and lower tier prizes, or some non-monetary prize generally deemed to be of greater value. Achieving a 90 results in a lower prize, such as a monetary amount, as shown being $2.00. An 8 may result in a prize deemed generally to be of yet lesser value compared to the 10 and 9 level prizes, for example, free play of the game. The display of the prizing structure is optional, or may preferably be displayed to the player upon their first instance of game play, but suppressed or otherwise not displayed in subsequent game play. FIG. 12B shows the beginning of game play, wherein the first number is displayed to the player. As shown, the number 3 is shown, as well as optionally showing the total or sum of the numbers provided to the player. FIG. 12C shows the display including the second number, here shown to be 4. The sum or total is optionally displayed, and here is the number 7. Optionally, the player may be advised of the amount required on their third number in order to win. FIG. 12D shows the graphic including the third number, here number 1. The total for the three numbers is 8. Based upon the prizing structure, the player is entitled to a free play. The game permits a slow reveal of the win or loss status for the player. Further, it invites multiple plays. Finally, the player must stay in the game until the end to learn of their win/loss status. The game is particularly well suited for play in a text based communication environment, such as with a SMS or simple messaging system.

FIG. 12 shows a graphic depiction of a game show format, preferably played in a "miniature" format, namely, less than 10 minutes, more preferably less than 5 minutes and most preferably, in 3 minutes or less. In order for a person to participate in the show, home players may qualify to play via a communication path, such as telephone, internet or other wired or wireless communication device. Typically, a predetermined number of people will qualify to play from home on the television show. Preferably, the on-air participants are selected to ensure quality game play and programming. The in-studio contestant is then asked a series of "super match" questions against a clock as a stake setter. The contestants are paid off for each correct answer they give, the game optionally limiting pay-off for any 1, 2, 3 answers. Contestants must answer the same as a contestant in order to remain in the game. Players are eliminated if they do not provide the same answer as the contestant. Optionally, at the end of the predetermined time, the contestant may keep their money or try to multiply it by a multiplier factor, e.g., 5 times. Out of the remaining home players who have answered as the in-studio contestant, a player will be picked, preferably at random. The remote contestant then must match the player in a head-to-head match.

FIG. 13 shows a graphical depiction of a game entitled "On the Nose". In this game, the house draws a target number from a universe of numbers, e.g., 20 to 50. One or more players draw numbers from a universe from 1 to 10. Players attempt to hit the target number on the nose without going over that number. Optionally, the player may freeze, that is, decline further draws, if they are within a predetermined amount from the target number. For example, the predetermined number may be 1, such that if the player is 1 away from the target number they may elect to freeze. The system (house) then draws in an attempt to beat the players. If the house hits the target exactly, the jackpot rolls over. The house will continue to draw at least to within the same predetermined distance from the target number as applies to the player. While any number of pay-out schemes may be utilizes, one preferred method is to share the jackpot amongst those hitting the target number on the nose, and to give those players who were within the predetermined distance from the target number an incentive for future game play, such as a free game play or reduced entry fee play.

Current lottery systems are often implemented in an "on-line" environment. That is, the sale of a lottery ticket, and the numbers corresponding to that ticket are, received by and stored in the overall system prior to the actual drawing of the lottery numbers. Thus, prior to the drawing of the lottery numbers, the system may determine how many tickets have certain combinations of numbers. That information may then be utilized for ancillary game play or for another purpose, such as for a secondary, random number generator. The following table provides exemplary numbers. For example, if the #1 ball is 28, there may be 22,316,429 people remaining. After the second ball draw of 15, there may be 6,562,156 remaining. The table then continues on through the sixth ball draw whereupon only two people remain.

| Ball | Number | # of Players with Numbers |
|------|--------|---------------------------|
| 1 | 28 | 22,316,429 |
| 2 | 15 | 6,562,156 |
| 3 | 9 | 171,025 |
| 4 | 25 | 3,790 |
| 5 | 49 | 83 |
| 6 | 31 | 2 |

The absolute number of players remaining may be utilized directly. For example, either the absolute number may be utilized, for example, is the number higher or lower than a predetermined number, or some portion of the number may be used. For example, the last digit may be compared to the prior last digit as to whether it is higher or lower. For at least the first number of ball draws, the last digit should be substantially random. In this way, a secondary random number generator is provided. The data regarding the number of players remaining may be used indirectly. For example, the contestants may indicate the number of occurrences of a given digit, such as the number of occurrences of a given digit, such as the number of 9's in a given number. Thus, those who had wagered that there would be one 9 in the number of players with the given number would be winners as to ball draw #1. In this way, game play is based upon the numbers of remaining players as determined in substantially real time. In yet another mode of game play, players may be awarded a certain amount of money for every predetermined digit. For example, a player may select a 4 and then for every 4 being revealed during the game, the contestant wins a predetermined amount, e.g., $25,000.00 for each occurrence. Thus, utilizing the data in the table above, the contestant could win $25,000.00 after the first ball draw because of the occurrence of one 4, but would not win further in this aspect as no further 4's arose. Viewer interest in the underlying lottery draw may be maintained as the players continue to potentially win through to the end. Thus, even if the viewer has "lost" on the underlying lottery, they may still be incentivized to watch where each new ball draw generates an event which may lead to a further win. In yet another implementation, the numerical data relating to the number of players remaining may be categorized for the number of draws which ended up with numbers that were odd or even.

Figure 14:
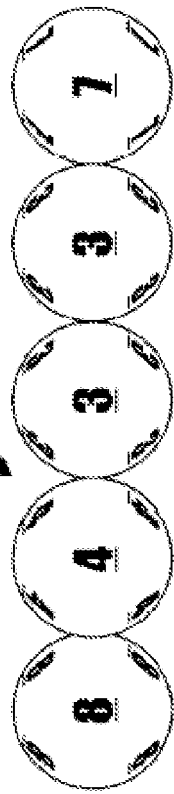
FIG. 14 shows graphical depiction of a game termed Blank Check.

FIG. 14 shows a graphical depiction of a game entitled "Blank Check". A player is provided with a series of numbers, typically five numbers, corresponding to a monetary amount. The digits are randomly selected from the set from 0 to 9. In the example of FIG. 11, the player amount is 84,334. The game proceeds with a sequential random selection of numbers from the same range. As shown in FIG. 11, the sequence of selected numbers is 84337. For the first four digits, the player was still in the game.

In yet another aspect, the game play includes the use of contestant game play to determine lottery numbers. For example, a contestant may be blind folded or otherwise be made unable to see various options. The person then selects from among the various options as the means by which the random lottery numbers are drawn. One example could comprise a blind folded contestant selecting objects.

In yet another aspect, this invention relates to an interstitial game show. Main or regular programming, such as is broadcasted on a given evening during prime time on a broadcast network could additionally include multiple interspersed, typically short, segments relating to game play. In the preferred embodiment, the game play could be for a relatively short period of time, for example, 1 to 2 minutes. For example, at 8:00 an initial round may be played prior to the beginning of prime time programming. Normal programming could then resume through the remainder of the 8:00 hour. At 9:00, a second short segment may be played. The play may continue at later times, such as to culminate at a show at 11:00. Possibly, the short segments could not necessarily be shown at a predetermined or predeterminable time as far as the audience was concerned. In that way, viewers who wish to see the progression of the game segments could need to continue viewing that channel, or at least, return to the channel fairly frequently. Optionally, the game play may be progressive from one interstitial game segment to another. Players may be presented with the option of stopping play or continuing.

In yet another game format, the show could include a display having an underlying image, with that image being at least partially obscured by overlying image regions which differ from the underlying image region. A contestant could be given a time limit in which they could be presented with information relating to a suggestion or a clue relating to an overlying image region, which if the player responded correctly, could be removed so as to reveal that portion of the underlying image which was below the overlying image. The suggestion or clues may be related to the underlying image or may merely be unrelated suggestions or clues with respect to that particular overlying image region.

Yet another embodiment of game play provides for the repurposing of an existing taped game show. The previously recorded game show could be segmented into subsets of issues, for example, presentation of questions or answers (as in the case of Jeopardy), those issues could be presented to one or more players, a response could be received from those players, and the answer could be compared to the correct answer. Scoring could then rank players relative to one another or to indicate the amount of the prize. In yet another game play implementation, one or more contestants could be presented with multiple images upon which predetermined data had been assembled. For example, images of five actresses may be presented to the player and the associated data could comprise opinion polling information as to whom the audience thought was the most attractive. The players could then play against each other to eliminate the images which they believe do not correspond to the most popular or number one response. The players could alternate until one player remained. In a second round, individual play, as opposed to play between contestants is utilized. Again, the player attempts to eliminate those answers which were other than the most popular answer of the audience. Alternately, the game may be set where the player may match the most popular answer.

In yet another aspect of enhanced game play, audience participation via an interactive video display, such as a computer connected over the Internet, or via an interactive television arrangement, may participate in the program.

Figure 15:
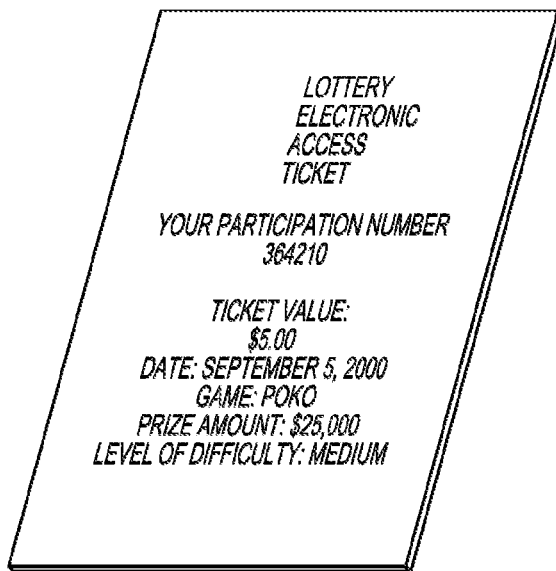
FIG. 15 shows a ticket containing a participation number.

The advent of electronic access to games has raised the serious issue of under-aged player participation. Controlling access by under-age players accessing a game over the Internet or other communication device, e.g., pager, cell phone, wireless application protocol device, SMS device, etc., has proved to be difficult. The inventive method and apparatus may be understood in connection with FIG. 15. A ticket comprising cardstock or other substrate or support media is provided with various printed matter. For example, the ticket may identify the various game, such as a lottery, and indicate that it is a lottery electronic access ticket. The ticket could provide a participation number, such as a pure numeric indication or alpha-numeric indication. Preferably, the ticket could have an indication of its value or purchase price. Optionally, date and time information may be provided. Having purchased the ticket, the presumably age qualified bearer of the ticket could then access the game, such as by addressing a website or by otherwise communicating with the game location. The player could be prompted or otherwise permitted to enter the participation number, such as by typing or keying it in. Game play could then proceed once the system had verified that the participation number was a valid participation number. Optionally, where the ticket is obtained from a retailer having an on-line ticket printing system, the participation number could be activated only upon the actual generation of the ticket bearing that number. If the participation number is valid, and a monetary amount remains available to the player, game play is permitted to proceed. The player is then provided with an indication of whether they have won, and if so, the amount. The monetary amount remaining on the card may be updated, such as by deducting losses or crediting wins. Optionally, the method includes the step of presenting the ticket bearing the participation number to a physical retail location, which may then access the system through its on-line connection, thereby verifying that the game play associated with the participation number is to be compensated.

In one aspect of this invention, the entertainment value of the retail purchase may be increased. For example, the tickets may contain variable information, either obscured or not obscured, regarding the electronic play. In one aspect, the amount of prize that the player can win could be presented. In the case of on-line ticket distribution, this amount would not need to be obscured, but could be obscured such as by a scratch-off strip in the case of a preprinted ticket. Yet another variable which could be utilized relates to the level of difficulty of game play. Yet another variable could be an indication of which of a plurality of games could be played by the player, e.g., POKO, LOTTO, The Zone, etc.

Figure 16:
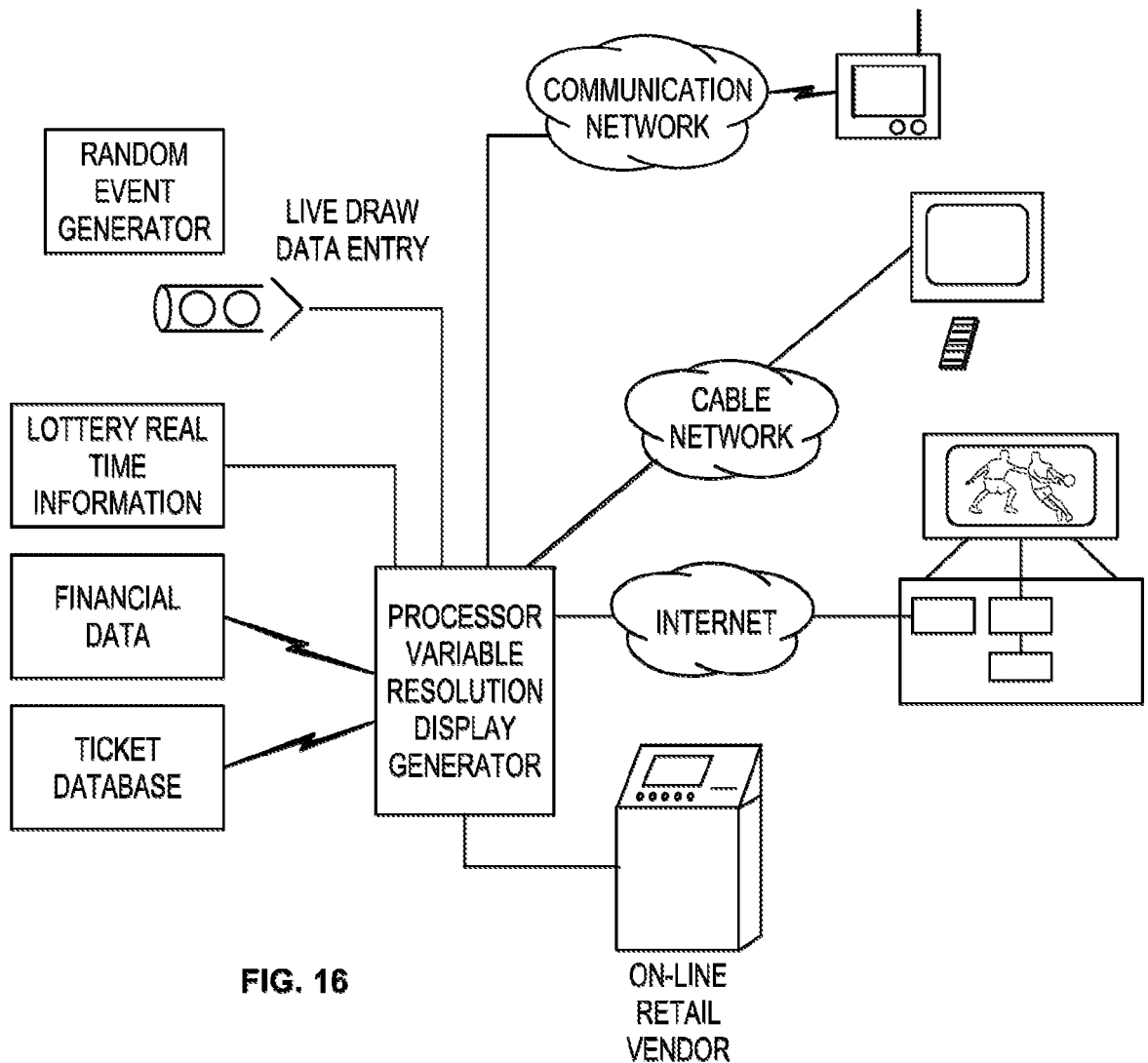
FIG. 16 shows a schematic diagram of an electronic system for implementation of these games.

FIG. 16 shows a schematic diagram of an overall system for use in performance of the games described herein. A processor is coupled to one or more player participating via an electronic communication system. For example, a player may participate through a wireless device, such as a cell phone, personal digital assistant, pager, messaging system or any portable wireless unit. Yet an alternative communication path may be through the conventional wired telephone network. Communication may alternatively be made through a cable network, such as where a computer or interactive television is provided. User input could typically be generated by a key pad, such as through a full sized keyboard or through a smaller sized remote input unit. In yet another mode, the Internet may be used as a communication path, typically coupling to a computer having a communication device, e.g., a modem, a microprocessor and associated storage.

The system also preferably includes a connection to a physical vending location for providing tickets. Preferably, the system includes an electronic communication between the system, e.g., the processor, and a on-line retail vendor. Preferably, the vendor possesses a ticket printing system which can print the tickets based upon input from the processor. The processor in turn potentially communicates with a number of databases, including possibly the lottery databases. A ticket database could contain at least information regarding the tickets sold and the associated information (e.g., the numbers selected for a lottery game, the amount of value associated with a ticket purchased, the amount associated with a prize, information regarding a game to be played or the level of difficulty of the game). In order to permit real time game play, the system could have a input path permitting entry of data from a live event, such as a televised ball draw. Optionally, the system also couples to a substantially real-time lottery information system, such as the fast-track system whereby ancillary games based upon the fast-track data may be played.

In yet another aspect of this invention, the previously described games may be played either as probability games (where the outcome of the game is determined based upon the actions of the player) or as a predetermined game (where the "winning" status of a particular game play is determined prior to the player's participation or other game play). As described previously, the game JACK-O was a probability game in that the user's election of whether or not to draw was a factor in determining the outcome of the game. JACK-O could be implemented as a predetermined win game. The system could determine whether, and in what amount, the player could win. The system could then force that outcome, such as by presenting a certain number to the player based upon the ball draw. Thus, while game play may appear "random" to the player, the system could act in a manner so as to cause the predetermined outcome. Optionally, game play may include steps which aid in achieving the desired outcome, such as by requiring the player to draw when their tally is within a predefined number (e.g., less than 5 away) from a target number.

Figure 17A:
FIG. 17A shows a plan view of a lottery scratch-off ticket having separate areas for a base lottery game and a second area for a scratch-off game for entry into the electronically remote game play system.
Figure 17B:
FIG. 17B shows an expanded view of the now exposed scratch off portion of the game play for entry into the electronically remote game play system.

FIGS. 17A and 17B show representative examples of scratch-off lottery tickets, FIG. 17A showing the overall ticket including multiple obscured areas. The central obscured area may be of a classic scratch-off lottery type ticket. The second scratch-off region relates to the electronically remote game play aspect of the system. FIG. 17B shows a blow-up of that portion, after the ticket having been scratched. As shown, the ticket includes variable information as to the potential prize amount for which the player can play in the electronically remote system. As shown, the $1,000.00 prize matches at two scratch-off locations, and accordingly, the player could be entitled to play the associated electronic game for that amount. The player is instructed on the electronic contact information, here shown to be an internet access via a website www.lottery.com. In one aspect, the instant inventions relate to providing a lottery ticket which contains variable information about a second or auxiliary game beyond the base lottery game. The information may be variable as to the prize amount, as shown in FIG. 17B, the form of the prize (e.g., cash prize, points based prize, goods or services as a prize), the amount of the prize, or some other factor such as a multiplier of a prize amount.

Another variable information component may be identification of the game to be played. For example, the scratch-off may reveal that the ticket holder is entitled to play an electronic version of POKO, HIGH-LOW, etc. Yet another variable component might constitute the degree of difficulty of game play, the level of game play at which the player can begin game play, and/or an indication of a bonus set of points or other form of advantage in game play. While one or more of these variable factors may be revealed through scratch-off of the lottery ticket, they may also be revealed solely through the electronically remote game play. For example, it may be revealed to the player that they will be playing the POKO game electronically, that the amount for which they are playing may not be revealed. Thus, in one aspect, a lottery game is augmented by having an additional game associated with it wherein at least one attribute of the second game is variable, whether as to the prize, the game to the played or the degree of difficulty of the game, all as stated previously.

Figure 18:
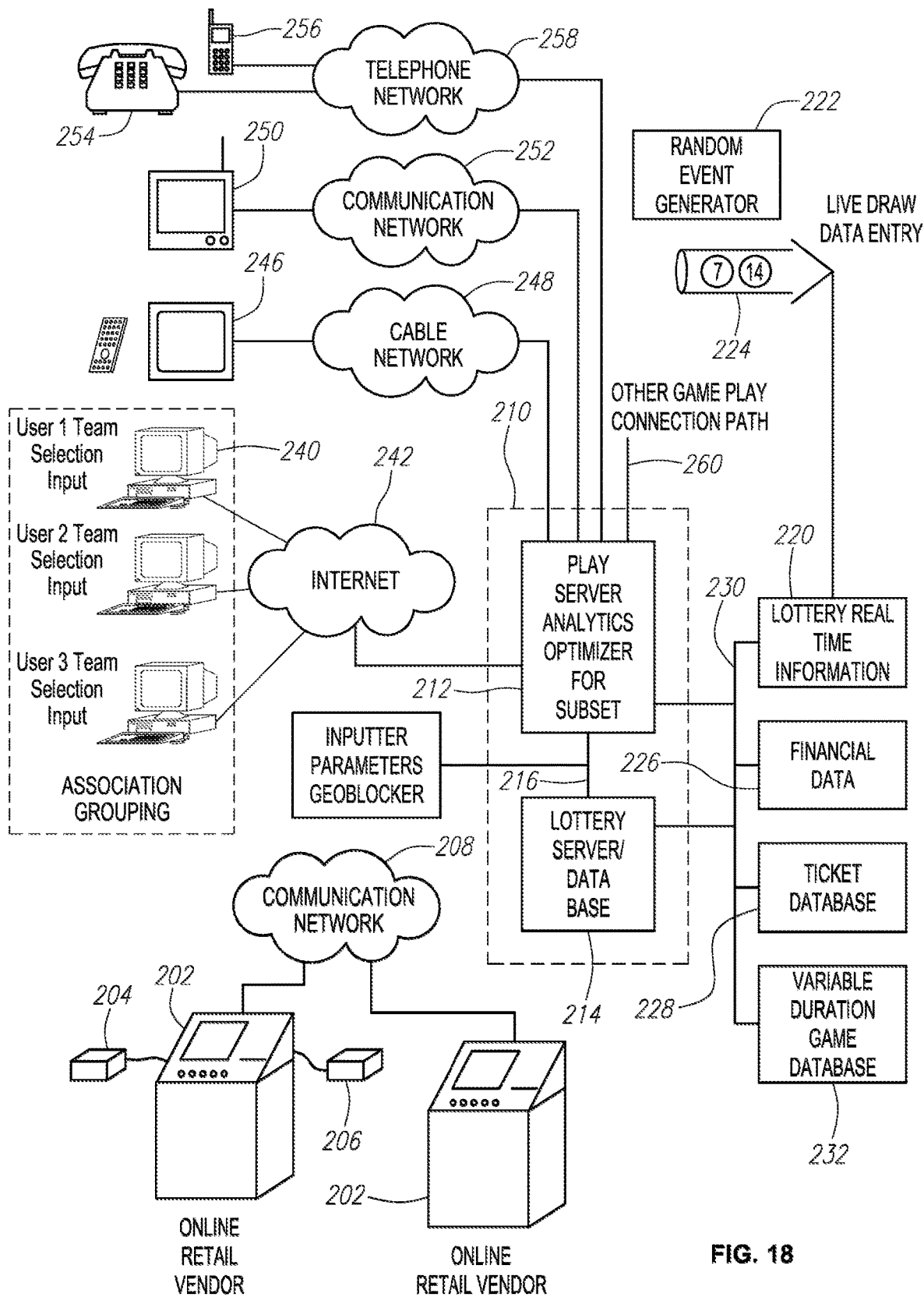
FIG. 18 is a schematic and block diagram of a system for implementation of the electronically remote game play.

FIG. 18 is a schematic and block diagram of one version of the system for implementing game play of the form described herein. Original vending of the tickets may proceed through any number of channels. For example, an online retail vendor unit 202 may be utilized when a computer generated play slip is required. Such systems may be utilized to enter a player selected number or for a quick pick operation. In the case of a scratch-off product, an online system is not necessarily required, as the vendor may merely provide the physical product to the customer. Optionally, the vending of the physical ticket product may be scanned or otherwise notated by the vendor, and that information that the ticket has been sold may be provided to the processing system to be described, below. Alternatively, lottery kiosks may vend the tickets or other computer generated play slip. As yet another alternative, the delivery of the ticket or corresponding information may be made through the internet or other electronic communication modality. As shown, the online retail vendor location system may further include printers 204 and scanning systems 206, such as a bar code scanning system. A communication network 208 interfaces the various vendor locations with the processing system 210. The processing system 210 may include various functionalities, such as the play server 212 and the lottery server 214. The play server 212 may be, for example, a web server for hosting the website accessed by the player. The lottery server 214 may be a separate server or computer which interacts with the various vendor locations. While shown as separate systems, the play server 212 and lottery server 214 may be part of the same computer or computer system 210. The particular form of implementation of the overall system may be varied as is well known to those of ordinary skill in the art. By way of example, a server could typically include a processor, such as a microprocessor, local memory, mass memory (such as disk based memory), and program memory. The required inputs, e.g., inputs for entering the parameters (game play parameters and prizing parameters) and outputs could be available, e.g., printers, visual display generators, audio generators, as is well known to those skilled in the art. As shown, the play server 212 interfaces with the lottery server 214 over a communication path 216. The communication path 216 permits bi-directional data flow, control flow and other signal flow between the various functional parts of the computer system 210. The computer system 210 may interface with lottery real time information memory 220, such as being provided through the use of a random event generator 222 or live ball draw 224. Financial data memory 226 may contain various financial or accounting data on the players. Finally, the ticket database 228 also interfaces with the computer system 210. The ticket database may contain any of the various information relating to game play, as described throughout the specification. A bus 230 is shown interconnecting the various memory components 220, 226 and 228, further coupling to the computer system 210. The particular bus architecture may be varied to meet the system requirements as are well known to those having ordinary skill in the art. The contents of the various memory systems 226 and 228 are described in greater detail in connection with FIGS. 20A through E, 21 and 22.

The player may engage in the electronic game play through any number of modes of entry. Computers 240 may access the system via the internet 242 or other communications network. An interactive TV system 246 may interface with the system 210 via a cable network 248. A wireless display enabled device 250 may communication with the system 210 through a communication network 252. Any form of electronic communication enabled device may be utilized, whether wired or wireless, such as a cell phone, personal digital assistant, pager, messaging system, wireless application protocol (WAP) system, WiFi system, an integrated hand-held game device, possibly comprising an integrated device having game play features, as well as optionally cellphone, web browsing, radio, digital music playing or other functionalities, a game equivalent of a digital device for downloading entertainment, e.g., an iPod like device, or other form of communication tool. Any form of communications protocol may be used, SMS, GSM, CDMA, 3G, 4G or 5G. Preferably, the system includes a graphical display capability, most preferably including the ability to display both static and dynamic images, preferably at variable degrees of resolution, ranging from low resolution to normal resolution to high resolution. FIG. 18 includes a depiction of a conventional wire line telephone 254 and a wireless phone 256 both communicating through a telephone network 258 to the computer system 210. The interaction of the system with the user may be both visual and verbal, or in any other mode or manner a device is capable of interacting with the user, such as a vibrating pager or other force device. An oral message might be, for example, to encourage the play to play the next game, 'oh, you were so close on the game. Do you want to play again?' A communication path 260 to the system 210 is provided for any other form of communication device. Yet another method and apparatus for revealing a 'close lose' could be where the player is advised of the winning outcome (after their game play), such as where after the player plays, the system could reveal a previously obscured outcome of a valuable prize, e.g., reveal the next square 'oh, it was a $1,000,000 winner'. In this way, the player may feel that they were close, and may be more likely to maintain interest in the game. The system and methods should preferably attempt to provide a realistic game play experience from the standpoint of probability, such that the player should not be given a 'close lose' on every play. Just as game play can appear unreal or unnatural when a low probability negative outcome is forced by the system, so to when the perceived positive outcome occurs with a frequency that is substantially, e.g., more than 20% of the time, more particularly more than 10% of the time, and most particularly more than 5% of the time greater than the unforced statistical outcome.

FIG. 19 shows a graphical depiction of a possible user interface in an internet context. A field or region is provided wherein the player can enter their ticket identification number. A player may play even though not registered. However, a player may desire to be a registered user so as to participate in additional features or functionalities, such as to participate in a frequent player's club. Provision may be made in the interface to permit registration online.

FIGS. 20A through E depict various types of data fields and particular data which may be stored within the system, whether in the computer system 210 or in one of the various databases or memory systems, such as the financial data memory 226 or ticket database 228. The depiction of particular data or data fields in a given subfigure is not material, they have been separated for ease of depiction in the figure.

A ticket identification number (TIN) could be provided on the ticket possessed by the player. While the term ticket is utilized here, it will be appreciated that any form of communication of the identification number may be made, such as where the identification number is otherwise printed on a piece of paper, supplied through an electronic display or otherwise. Additionally, while one implementation includes a lottery game as the base game, the electronic remote game play of the instant inventions may be utilized with the lottery game, or completely independent of a lottery game. For example, a business wishing to run a promotional game may provide players with identification numbers for their use in the game sponsored by the business. Thus, while the term ticket identification number will be utilized herein, it will be appreciated that the identification number is the information to be utilized, and that the reference to the ticket merely references the medium on which the particular identification number has been conveyed. As shown, the identification numbers are provided sequentially, while they need not be. The identification number may include encrypted information or may be subject to an accuracy check, such a mod 10 check or redundancy check.

The ticket database 228 contains information on the various tickets, including their win/loss status, and the amount of win, if any. In one aspect of this invention, prizing structures may be imposed upon the set of game play possibilities, such as the total listing of the ticket identification numbers. The system could typically include an input to receive a specification of the gaming structure. Implementation of the gaming structure may be effected by processing, such as performed by the lottery server, or a separate server. The prizing structure is applied against the potential ticket plays either prior to the initiation of game play by any player. The set of wins and losses is then completely existing prior to any game play, and therefore may be more acceptable to lottery regulatory authorities. Alternatively, they may be applied on a dynamic basis based upon an algorithm, or alternatively, performed in a batch mode.

In one aspect, the prizing structure may be applied as a virtual GLEPS (vGLEPS) in that subgroups of plays are considered as a logical unit against which the prizing structure is applied. Subunits may be defined as groups of N plays, where N may be arbitrarily large or small. Any number of virtual tickets representing N game plays may be defined. For example, if N=100, the prizing structure may be applied such that there are a guaranteed number of low end prizes within the 100 game plays. N maybe arbitrarily large, including the entire universe of potential game play. The identification numbers selected for the N units in the subset may be made in various ways, by sequential use of ticket identification numbers, by random assignment or by an algorithm. Systems in which the specific set of winning play numbers is determined prior to game play by any player may preferably be used in a regulated lottery context.

The prizing structure may be applied on a player basis. When applied on a single player basis, the game play of the player is grouped as a subunit against which the prizing structure is applied. For example, the player may be guaranteed that out of a set of plays they will win a certain number of low end prizes. For example, a player may be guaranteed that out of 50 plays, they will have at least 3 $5.00 wins. The subgroup may include multiple players. Players may designate a subgroup, such as where two players compete against each other. Yet larger groups of players may be associated, such as where "tournament" play is involved.

A subunit against which the prizing structure is applied may be defined by the source or sponsor of the game play. For example, game play purchased through a given retailer may be grouped and subject to a predefined prizing structure. Retailers may seek to increase their sales by offering an enhanced guaranteed prizing structure as compared to their competitor retailer. Yet other sources may be utilized such as a state lottery or other association or club grouping.

A subunit may be defined on a geographic basis. All tickets purchased within a given geography may be subject to a certain prizing structure. For example, all purchasers within a given city, state, or country may be grouped together (or further divided into subunits) for the application of the prizing structure. The subunit may be defined by the geographic presence of players within a given area. For example, players within a given wireless connection site (sometimes referred to as a 'hot spot') may be grouped together as a subunit for prizing purposes.

The subunits for prizing purposes may be divided by time. For example, a prizing structure may guarantee so many wins of a certain amount in a period of time, e.g., so may wins per day, so many wins per week, so many wins per game, where the game has a defined duration.

The prizing structure may be applied to subunits defined by a given game, or a collection of games if more than one game is available to the player. The prize structure may be such that the play of a suite of games results in a guaranteed low end prizing over that set.

Multifunctional prizing structures may also be utilized. The factors described herein may be used singly or in combination. For example, a prizing structure may group a subunit by the combination of both geography and by time. Thus, the prizing structure subunit is defined to be game play associated with a given retailer where the subunit is applied for game play during a given day. The subunit may be defined by any number of combined functional units.

A hybrid gaming system may be utilized. For example, a set of the prizes in the prizing structure may be distributed according to a vGLEPS technique, and a second set of prizes distributed by a non-guaranteed system. In one implementation, the prizing structure includes a vGLEPS component and a second medium to higher tier prize level based upon player skill. Parimutuel prizing may be employed, that is, where there is some form of prizing based on the amount wagered or otherwise put in play by the players.

In yet another aspect of a multi-level electronic environment a first phase of a game is played interactively between one or more users and the system, followed by a second phase in which prize information is revealed. The second phase may also be termed a prize reveal phase or use of a 'prize board'. Preferably, the prize information which is revealed is determined at least in part by predefined imposed prizing parameters. By way of example, the predefined imposed prizing parameters may include a GLEPS type system, which characteristically includes a requirement that 1 out of X, e.g., 1 out of 7 events is a winning event. Yet another example of a predefined prizing is setting a defined percentage payout, such as 50% or 75%. Many of the predefined imposed prizing parameters may be defined by a lottery sponsor, and may ultimately be defined by legislation (typically state based or national legislation outside of the United States). The prizing parameters need not be defined based on GLEPS, and may be of any form. Applicant's vGLEPS system permits prizing structures which divide the prizing by one or more parameters as defined by the game. As noted, the prizing structures may be divided bases on one or more of the following parameters: subgroups of N players or plays, one player's plays, a group of player's plays (e.g., tournament play), retailer, source, geographic region, purchase geography, geography of the player, time, the game, and a collection of games. Multiple parameters may be combined, or hybrid structures may be utilized, as previously described.

The use of a "prize board" phase of the interactive electronic game play lends flexibility to game play while permitting application of various prizing structures. Game play in the first phase may be random or the outcome determined based on the actions of the player, but the game play in the second phase may then apply the prizing parameters such that the correct payouts are achieved, irrespective of the results from the first phase of game play. Any prizing structure may be imposed during the prize reveal, even if the prizing amounts differ from those which would be strictly calculated according to probabilities. For example, a true probability game may suggest that the payout should be of a first amount, but the system may apply predefined imposed payout parameters which specify the payout amount to be different. By providing a second phase for prize reveal, the amount or mode of prize may be set as defined by the rules. A prize board may provide entry into what appear to be different prizing options. For example, if the player achieves 4 events out of 6, they may be entitled to enter first prizing pool, whereas if they 5 out of 6, they are entitled to enter a second, better pool. If they achieve 6 out of 6 events, they are entitled to enter a third, best prizing pool.

The ticket identification number is then associated with one or more other data elements regarding the game play or the player. For example, in the event that variable game play as to the particular game to be played forms a part of the system, the memory could include an identification as to that game. As shown, the TIN 65432981 indicates that the HOT SEAT game will be played, whereas the game JACKO will be played for someone entering the TIN 65432982. The system also contains information regarding the prize, both in form whether monetary or non-monetary and the amount. In the case of a predefined win situation, such as in a scratch-off, the identity of the winning identification numbers is known prior to the player receiving the ticket. After the game is played, the player may optionally be provided with an authentication number which confirms their game play. Optionally, the system may request that the player confirm receipt of the acknowledgment number. Time limits may optionally be imposed upon how long the identification number remain available for play. As shown, certain of the identification numbers are subject to a last date to play limitation, whereas others are not so limited and are open. In yet another optional aspect, game play through to a certain point may be required in order to reveal the prize information.

FIG. 20B continues with further possible contents of the memory. The vending merchant may be know, such as in the case of vending of a lottery ticket where the lottery system knows which TIN were sent to which merchant. A personalized retailer coupon field may be provided, such as where a promotional or cross-promotional offering is made by the system. A promotional or cross-promotional system may include a personalized retailer coupon, relating back to the vending location. For example, the game play may result in generation of a display or printable coupon which may be utilized at the vending location e.g., 7-11 as shown in FIG. 20B. Alternatively, the system may provide a promotional offer for another product or service, e.g., when you redeem your coupon receive a free Coke (or a discount thereon). Optionally, the coupon or discount may be provided electronically to the vendors general merchandise scanning and check-out system such that when the player goes to redeem their winnings and provides a TIN, the discount may be automatically applied when scanning the merchandise. Continuing with the example provided, if the TIN is associated with a 30% discount on a six-pack of Coke, that information may be provided electronically to the vendor check out system and that discount applied automatically. In certain applications, it may be desired to have a user identification and a secondary form of identification such as a PIN number or password. These may be utilized when higher levels of functionality such as a frequent player's club are utilized. Additionally, such user identification may permit the system to offer targeted discounts or offers of services or other upsells.

As shown in FIG. 20C, an optional link to other games may be provided. For example, if a player plays the lottery game, there may be a promotional game at another site to which the player may be linked. FIG. 20C continues with various additional data fields, such as the date of play and time of play. In certain instances, it may be useful to maintain a record of the serial contact number of the user, i.e., that this is the $123{,}456^{th}$ user, and the next is the $123{,}457^{th}$ user. Such information may be utilized where the game is structured to entitle the first 1,000 plays to engage in certain game play. The final data element of FIG. 20C shows the number of plays allowed. Often times, a identification number may only be used one time, but in certain other context, there may be the desire to have a higher number of plays allowed.

FIG. 20D shows yet further data elements potential of use in the system. Optionally, the system may contain citizenship information. Various state and national lotteries are strict about geographic participation in a lottery. Thus, for example, it is often necessary for a potential player to establish a local account, such as a local bank account, or possess certain identification information such as a social security number or other national identification number. Through a registration process, either directly with the lottery, or via an authorized vendor, or otherwise through online registration, the player may become registered whereby they are confirmed to possess the requisite citizenship or state or national contact to satisfy the lottery requirements. Yet another data element may be the player's email address or other electronic address. In certain instances, it may be desirable to know the player's physical address, such as a home or business address. Yet further data elements relate to the frequent player aspect. One data field may indicate simply whether the person is a frequent player, and if so, the number of points they possess. As shown in FIG. 20E, the form of compensation, such as cash, airline miles or further game play. FIGS. 21 and 22 now describe certain functional aspects of possible game play in a chronological flow chart manner. The left most column identifies an action that could typically occur at an authorized retailer or redemption location. The second column indicates an action of the user or player in the remote electronic game play. The third column identifies a contact with or action at the game play server. The right hand column depicts an action or contact with the lottery system. As described in connection with FIG. 18, the actions at the game play server and the lottery system may be combined, such that those functionalities may be performed in the other column, e.g., something listed in the game play server column may be performed in the lottery system column and vice versa.

FIG. 21 shows a simplified flow diagram for game play where affirmative game play on the electronic system is required prior to redemption of the prize. A player could obtain a base game ticket at an authorized retailer. The user or player could then enter the identification number into the communication device, e.g., the internet website. The game play server/lottery system could then access the system memory to retrieve the stored information associated with the identification data, such as to determine whether the player wins or loses, and if they win, the amount and form of their win. The system records could be updated to indicate that game play occurred. The system could then provide the user display with an indication of whether they had won or lost, and if so, the amount. The player then could return to the authorized redemption location and provide the ticket or some indication of game play to the vendor. The vendor may then confirm the fact of game play by querying the lottery system. Upon receipt of positive confirmation of game play, the prize could be paid.

FIG. 22 shows a chronological flow for a electronic game having a variable component. Initially, the player may obtain a base game ticket from an authorized retailer. At this point, the player may play the base game. If they win, they may elect at that point to redeem their winnings. The secondary game play includes provision of the identification number. The user could then electronically provide the identification number to the game play server/lottery system. The system could then access memory utilizing the identification number to determine the variables associated with that ticket identification number. Such variables may include the prize amount, the game to be played and/or the degree of difficulty as previously explained. The system database may then be updated to indicate that the game had been played. The variable information as to the game play is then utilized to conduct game play in accordance with those variables. Ultimately, the player may redeem their winnings at an authorized outlet, or via other accounting methods, e.g., a credit on a credit card or other financial instrument, such as a phone bill.

After the game play is concluded, the player may be offered a survey to fill out. Such surveys may be used to solicit personal information which may be updated in the player's individual records. Statistical processing of survey data or other game play data may be compiled by the system. In yet another variation, game play may be enabled between multiple players. Buddy lists or other association groupings may be utilized to form competitive game play pairings.

In order to more fully appreciate the apparatus, methods and modes of game play described herein, specific examples will be described. These specific examples are not meant to limit the generality of the inventions herein, but rather, provide specific detailed examples such that the scope of the inventive aspects may be fully appreciated. The Perfect 10 game, described previously, is well suited for a display system having relatively low level graphics. The game may be played in a simple form wherein the graphics are solely alphanumeric characters. Alternatively, the game displays may be made as graphic intensive, e.g., static graphics, dynamic graphics, high resolution graphics, etc. as is desired and consistent with the communication medium. The system may further interact with the player audibly. By way of example, if the player has a 'close to winning' experience, the system could announce to the user "you were very close on that last game, press 1 to play again." The level of enthusiasm or encouragement to the play may vary based on the game play progression. Considering the game play in a SMS or simple messaging system format, the game may be played as previously described. Prior to initial game play, the player could establish an account to be used for wagering. The account may be established in person, such as through a lottery office or lottery retail location or through a lottery office, or through the communications provider, such as the provider of the SMS service. The account may be prefunded, where the money must exist in the account prior to game play, or it may be billed, such as on the invoice sent to the user, e.g., the invoice relating to the communications device carrying the SMS service, or to a credit card or debit card account, or some other financial account, e.g., bank account or brokerage account. Optionally, the information regarding the account may reside in different places. Account information may reside with an authorized entity, such as the lottery system, or it may reside with a separate entity, such as the communications carrier, or may be stored locally in association with the phone, such as where the phone uses a smart card or other monetary value bearing card or device for effecting monetary transactions.

In operation, the player may initiate game play, such as by calling a predefined number corresponding to game play. Typically, the system will receive an indication of the calling parties identity, such as through the receipt of the mobile identification number (MIN) or other identification information such as that coming from a smart card or other identification from a locally stored set of data with the communications device.

Once the system determines the identity of the caller, either because the caller has entered identification data, e.g., telephone number, social security number, identification number possibly including a personal identification number (PIN), the system may check for entitlement for game play. Such an entitlement check may include a financial check, such as to determine that money is present in the account or for checking other status information, such as where an account is statused such that the player is not permitted game play. Assuming the caller is entitled, game play may then begin. If the player is not entitled for game play, the call may be terminated.

Assuming game play begins, the game may proceed as previously described. The player will receive a first number, e.g., 4, then a second number, e.g., 3, for a total of 7, and possibly information on what the player needs to receive on a later number in order to obtain a prize. Using the prizing scheme described previously, the player could receive a free game play if they receive a 1, could receive $2 if the third number is a 2 or when the larger prize if the third number is a 3, such that the total score is 10. The transmission of the data between the system and the player may be done in various modes. Since there are transaction costs generally based upon the number of connections between the communications device and the system, it is desirable to minimize those transaction or transport costs, if possible consistent with achieving player satisfaction. In a game such as Perfect 10, player satisfaction may be higher if the sequential numbers are revealed one at a time, as opposed to all at once. A relatively large number of communication transactions occur if only one unit of data is transmitted at a time, e.g., the caller calls the system, the system communications the first number, then a communication is sent from the user to the system indicating that the first number has been displayed and that the second number is desired, followed by a communication from the system to the player of the second number and so on. In this way, there are at least one, and possibly two, separate communication events for each of the three displayed numbers, resulting in a relatively higher transport cost. Alternately the system may send all of the display to the user's communication device at a single time. For an extended reveal or extended game play experience, the communications device should include storage which may hold the data prior to the time at which it should be displayed. Thus, the system may send the three numbers (e.g., 4, 3, 3), but display only the first number, holding the second two in memory until the program indicates that the next number is to be played. A symbol or character indicative of a timed pause may be inserted where appropriate to provide for a pause, either of uniform length or of differing length so as to create a dramatic pause. Communication devices have the ability to store and run programs or applets which could permit such game play. In this way, the total number of communication events is reduced, preferably minimized, yet the extended reveal permits enhanced and elongated game play. The application or applet resident on the communication device may have the ability to provide enhanced graphical displays. In this way, only the essential game play data, e.g., the particular numbers, need be communicated via the SMS system, thereby minimizing communication transport costs. Further, the application or applet may have computational abilities, such as where it might calculate that the first two numbers total to 7, and report that on the display, and possibly further to calculate that the player is 3 (10−7) away from the "Perfect 10", and select the display for the user appropriately. For example, if the player is three away, the display may advise as to the possibility of getting an 8, 9 or 10, whereas if the sum of the first two numbers is 8, the system calculates that a different display showing only the possibility of achieving a 9 or 10 should be displayed. The use of local programs and applications greatly enhances the texture of the game while keeping the transport costs to a minimum. The player may be queried as to the number of games they want to play, e.g., 5 games, and all of the game play data may be transmitted in a single SMS message. Again, game play maybe performed in an extended reveal manner, but the communication transport costs have been minimized. After game play is completed, a confirmation number may be provided. For example, a message may be provided that 'Your game play was given confirmation number 34127, please make a note of it.' The confirmation number will be stored in the system and may be used for various purposes, such as audit purposes. The game described may be structured as a predetermined game, or a non-predetermined game, or as a hybrid game.

The game may be played in a multiplayer format. Again, the game may be predetermined, or not predetermined, or a hybrid of both. If Perfect 10 is a predetermined game, the multiplayer interaction may consist of comparing the number of wins for the various players. A winnowing or pool may be used. Players may compete, and the pool of winning players allowed to proceed to the next phase or game may be decreased. Optionally, a prized board or prizing step may be utilized in which prizing information is revealed to the player. If the game is predetermined, the result will be displayed to the player, irrespective of their prior game actions. In an hybrid environment, the outcome may be influenced by player action, but also by factors relating to a predetermined outcome.

The programs or applets, such as those constituting a game to be played on a communications device, maybe made interactive. The system may download the game, either in response to a user initiated action or in a push-pull implementation, the downloaded game could be stored locally, the player could then play the game, followed by a communication from the communications device to the system. The communication from the player to the system could typically indicate information regarding the game play, e.g., that game had been completed, the score or other outcome achieved by the player, or data regarding multi-player interaction. A system containing an application or applet could include require processing and storage capabilities. Typically, a control processor is coupled to the communication system for incoming and outgoing communication. The communication system may communicate information such as game play numbers via an SMS system, or may also receive and transmit more complete data packages, such as where the system plays downloadable games. A memory is typically resident within the system for storing the downloaded information. Preferably, downloaded game application data is stored in memory for future game play use, such that the application need only be downloaded once.

The game may be subject to a predefined set of rules regarding prizing. In one implementation, a vGLEPS system is utilized to guarantee at least a low end prizing structure. The prizing requirements for the game may include, for example, that 1:X plays must be a winner, and that there are Y wins of a certain monetary amount per predefined grouping, e.g., 5 wins per 100 plays, or 5 wins based on geographic factors. The system may apply these rules prior to play by any player, or may be applied by an algorithm while the game play proceeds. If the game is a predetermined game, the outcome of a given play is known to the system in advance. Thus, while the player may perceive the game as one of chance, where they may still win until the ultimate outcome is revealed, the system has previously identified the play as a loss. Through vGLEPS, the play experience may be enhanced in that there is a predefined positive game experience for the player. As indicated, the positive experience can be the actual winning at a certain frequency. However, the play experience can also be enhanced by providing the player with a 'near win', that is, a result that while not resulting in a prize nevertheless was 'close' to achieving a prize. For example, in Perfect 10, if it has been determined that the particular game play will be a 'lose', it may enhance play experience to give the player a 3, followed by a 4, such that there is the potentiality of them winning (the sum of 7 can win if the next number is a 1, 2 or 3). Then, since that game play was predetermined to be a loss, the next number displayed could be a 4, putting the player slightly over the 'Perfect 10'. The required loss is achieved by the system, but the player may have a better play experience as compared, for example, to a game play where the player loses after the first two numbers (e.g., if the first 2 numbers are 1 followed by 1, for a sum of 2, and the maximum possible sum for the third number is 7, such that they know they have lost after the second number).

Yet another option for game play could be to use a prizing mechanism with a prize board. By way of example, when the play achieves a '10', that may entitle them to enter a secondary phase of the game experience. The player feels that they have 'won' since they have gotten into another round, yet no positive monetary amount has been awarded. In the second round, if the game is predetermined, may force the outcome necessary to comply with the rules of the game.

In one implementation, the 'prize board' may have multiple images corresponding to masked prizes. The play 'chooses' the image, and then the result is revealed to the player. In a predetermined game, the predefined outcome is then revealed to the player. Thus, if the play is predefined to be a loss, the loss is revealed. If the play is predefined to be a $2 winner, the $2 win is revealed. Since the game is played electronically, the graphic relating to the predefined outcome can be displayed irrespective of which image the player chose.

The definition of the prizing rules and the prize reveal mechanism may be combined to enhance play experience. It may be desirable to have the outcome of the play event appear to be as consistent with the perceived odds, or the actual odds, and thus as normal as possible, that is, the probability of a given outcome should be followed. It may be possible to use 'perceived odds' of winning, such as wherein data collected from players results in a defining of probabilities. Such perceived odds may be derived from marketing studies or focus groups or the like. That data may be stored in the system and used to present game play where the outcomes are related to the perceived odds. The game play may be at the perceived odds, or at some variation on them. If the perceived odds provide a prizing outcome which exceeds the payout for the game, a prize board may be used to reduce the payout. Continuing with the example of Perfect 10, assuming the possible numbers are 1, 2, 3, and 4, there should be a 25% chance of drawing any number, assuming all numbers are available on every draw. Further, there will be a probability distribution for the sum of the 3 numbers as follows:

| Sum | Number of Occurrences | % Probability |
|---|---|---|
| 3 | 1 | 1.56 |
| 4 | 3 | 4.69 |
| 5 | 6 | 9.37 |
| 6 | 10 | 15.62 |
| 7 | 12 | 18.76 |
| 8 | 12 | 18.76 |
| 9 | 10 | 15.62 |
| 10 | 6 | 9.37 |
| 11 | 3 | 4.69 |
| 12 | 1 | 1.56 |

Realistic game play, therefore, should attempt to mimic the odds. The prizing rules could make the straightforward application of the game appear not to comply with the real world odds. E.G., in a lottery game where the payout is set to be 50%, the probabilities in the game play could be modified. In one aspect of this invention, the real world probabilities may be utilized in the revealing of the numbers, such that the player feels as if the real world probabilities are being utilized. Then, in a secondary prizing phase, the prizing results may be modified such that the predefined outcome is achieved. By way of example, the probability of an 8, 9 or 10 in Perfect 10 'should be' 40%. Game play may be selected such that a 'win' occurs at that frequency. The predefined prizing structure may then be achieved in the secondary prizing phase. Alternately, the frequency of a result qualifying a player for entry into the secondary prizing phase may be greater than the real world probability. In the example of Perfect 10, the revealed numbers in the first phase of the game may 'win' more than 40% of the time (i.e., there is a percentage of events that qualify the player to enter the second, prizing phase which is greater than the real world percentage). The prizing phase then corrects the prizing result to achieve the predefined outcome. More players may achieve a positive play experience since they qualified for the second phase, even though they were not a monetary winner.

Free play may be awarded. In an electronic environment, there is generally no incremental cost associated with a 'free play'. In a predetermined environment, the 'free play' results in an extended game play experience. Considering Perfect 10, if the sum of the 3 numbers is 8, the prize may be 'free play'. The player continues with their free play, receiving their next 3 numbers. In a predetermined environment, this result is already known. Thus, if the ticket is a loser, the free play may reveal a loss (e.g., the second set of 3 numbers totals 7, a loss.) Alternately, the free play could be an extended reveal mechanism for a winning prize. In Perfect 10, the first round could result in an 8, indicating free game play, and the next round then result in a 9, to achieve the $2 prize. Any combination of extended reveals could be utilized to achieve enhanced player satisfaction.

Consider now the application of the inventive techniques to the game Hi Low, previously described. In a higher graphics environment, the game may include depictions of balls, such as in a ball draw. The first ball number may be selected by any number of means, including random number selection or predefined assignment of the number. Assume that the game is a predetermined game, where there will be 6 out of 49 balls drawn. A first number may be displayed as if they were drawn (to provide an example, assume that the first number drawn is 10). The player is prompted to indicate whether they think the next ball will be higher or lower. Game play proceeds interactively until the series is drawn. If the game play is predetermined, the system will ultimately reveal the necessary outcome. Continue with the example of 10 as the first ball. Assume that the predetermined outcome is a loss, as defined by having 2 or fewer correct 'higher/lower' guesses by the player. Absent the inventions described herein, the system may be forced to generate a result that appears highly improbable to the player, such as where the system must have 4 incorrect guesses in a row, as where the player guesses 'higher' than 10, but the next ball is 9. If this process must be repeated 3 more times (i.e., the player guesses higher, and therefore the system must select an even lower number ball). The player may perceive a divergence between the real world odds of that outcome and the game play to which they are subject. Player disenchantment may ensue.

Applying the instant inventions, the play may continue with the real world odds. Thus, when the last ball is a relatively low number, the odds of the next being higher are fairly substantial. The odds may in fact be the real world odds, such as could vary depending on which balls remained in the hopper. Alternately, the balls may be added back into the hopper for every draw. In any event, game play may continue until the 6 balls have been drawn. At that time, a second phase relating to prizing (or additional levels) may be entered. In that stage, the predefined prizing outcome may be achieved. It should be noted that even in a 'predetermined' game, the player's actions, choices and input could still be used to control game play. If the player's actions generated the outcome required by the predetermined outcome, no further action need be taken. If the player's actions, choices and input did not result in that outcome, game play could proceed to another phase where the necessary outcome is forced.

Games may be played on a predetermined schedule. For example, games may be played in association with a live event, such as a typically televised, in-studio audience attended ball draw. Games may be played on a periodic basis, such as on an hourly basis. Where multiplayer game play is involved, there may be a need to provide a common starting time. Within that game, the pool of winners advancing to a next phase could be narrowed or winnowed. If a player loses, they could be advised of the starting time of the next game, which the player could choose to join, or a notice could be pushed or sent to the player at or around the time the next game starts, and be invited to play. The game play may utilize prerecorded images, such as a series of taped drawings.

The techniques of these inventions may be applied to any known game of chance or game of skill. For example, they may be applied to games of chance such as coin flips, probability games where two players choose simultaneously from 3 equally probable events (e.g., 'rock/paper/scissors'), or dice based games. The inventions may be applied to card games, such as poker and blackjack. They may be applied to other probability games such as roulette.

Figure 24A:
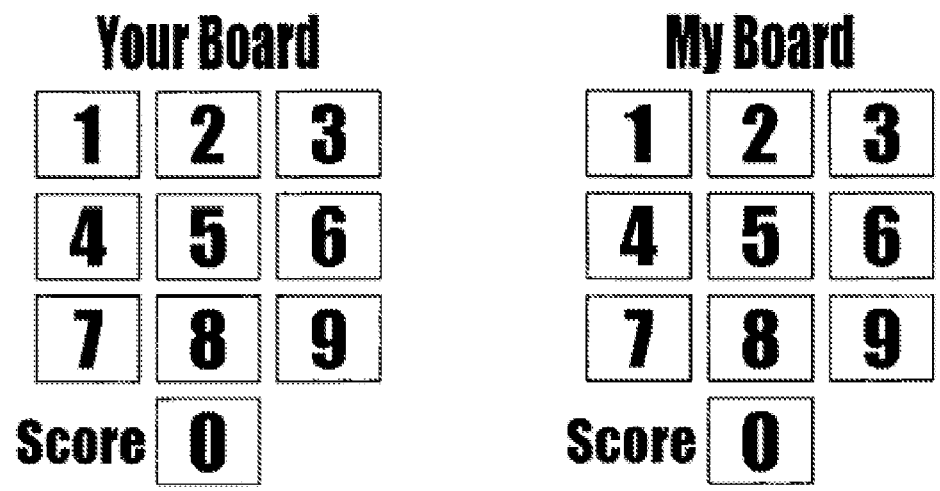
FIGS. 24A to D depicts various phases of a rock, paper, scissors game played utilizing the improvements described herein.
Figure 24B:
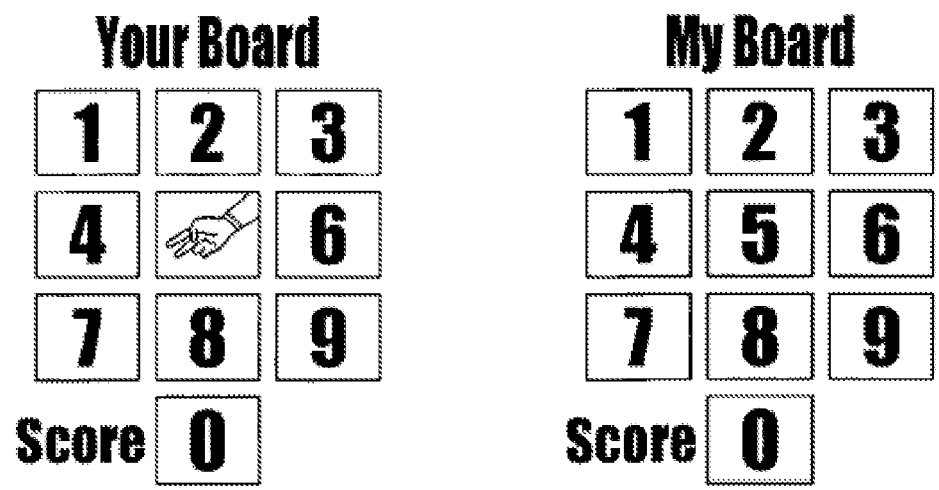
Figure 24C:
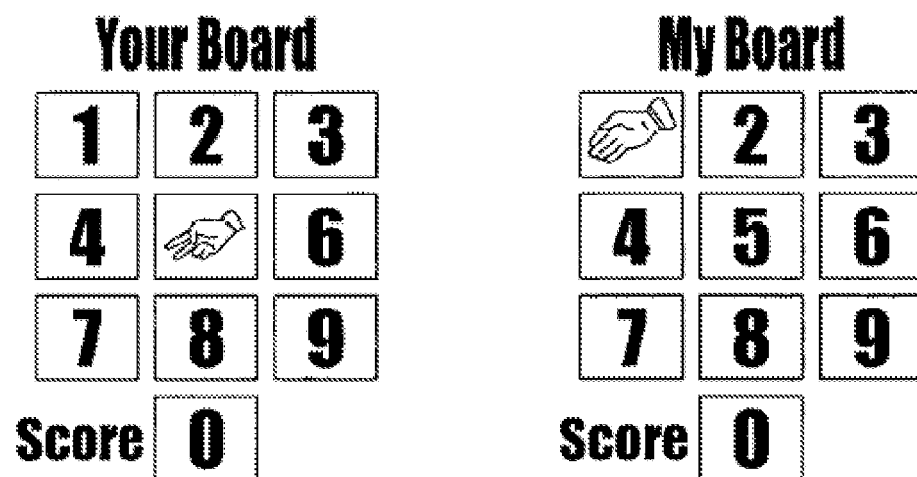
Figure 24D:
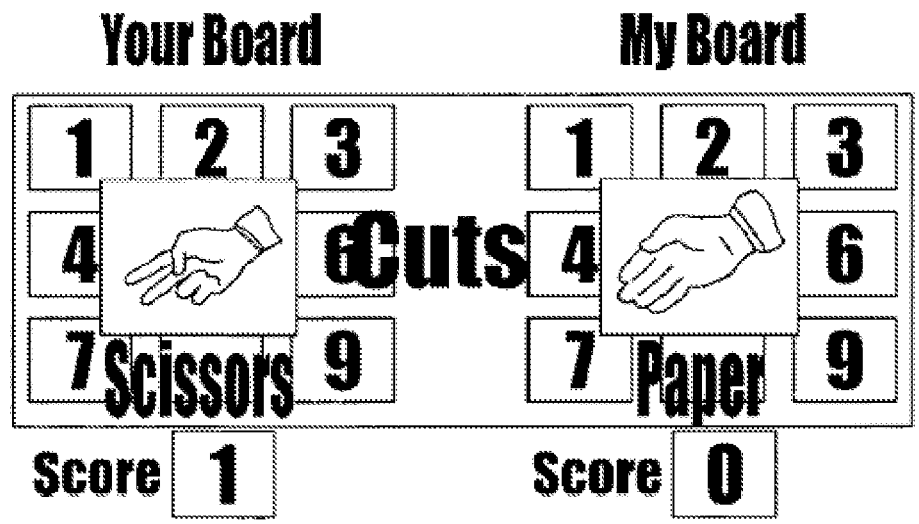

Consider the game rock, paper, scissors in reference to FIGS. 24A to D. The game is a probability game in which players choose among three possible objects, e.g., each player simultaneously chooses rock, or paper, or scissors. The game may be played between players, or may be played against the system. Each object has one of the other two which is superior and the other one inferior. If one player selects an object superior to the other player's inferior object, that player wins. If the two players choose the same object, the game is a draw. In lieu of the player choosing one of the three objects, the system may assign an object to the player, or the player may choose an obscured graphic, e.g., a box, and the 'content' of the box is then revealed as the players object. As shows in FIG. 24A, the board initially starts with a number of obscured choices. The player chooses a first number. As shown in FIG. 24B, the player chose box 5, which revealed a 'scissors'. As shown in FIG. 24C, the system chose box 1, which revealed 'paper'. Under the rules, 'scissors' cuts 'paper', so as shown in FIG. 24D, the player won this round. The score display is updated to show the score as player 1, system 0.

The techniques of these inventions may be applied here. For example, the winning may be subject to vGLEPS, whereby the player experience may be subject to predefined prizing criteria based on any number of parameters. A certain number, or a certain number of type of wins, may be required for very set number of events, e.g., 5 wins of $2 for every 20 plays. Any of the other parameters for allocating prizes may be utilized. In yet another aspect, the game may be played where the player's actual selections determine the outcome of the game. A prize board or secondary prizing step may be utilized to achieve predetermined prizing criteria. For example, the player may need to win a certain number of games in order to pick a prize. A prize table may be used wherein the prizes vary by score, e.g., a score of 3 results in a top prize of $50, but a score of 4 results in a top prize of $100. Further, multiple level prizing may be utilized, such as where the player optionally plays (places a subsequent or additional wager) to play further with the goal of participating in a better prizing step or pool.

Consider application of various techniques to blackjack. The system may operate in a predetermined mode. In that mode, the actions of the user or player do not affect the outcome of the game. The system may be arranged for a particular payout, e.g., 2.5% goes to the house, where the outcomes of the game play and the prize amounts are set for that result. Alternatively, the game may be played as a hybrid game. The system may permit actual play of blackjack, and then utilize a prize board. Use of the prize board permits the results of game play to correspond to the desired prizing parameters. In yet another alternate version, blackjack may be played and points awarded for results. Those with high scores may then enter a prizing round, or the number of points may correlate with the range of prizes available to the player.

In yet another aspect of this invention, a set or series of game plays will have a set or series of outcomes, but a particular game play is not specifically associated with a given outcome. FIG. 25A shows a flowchart for one implementation of such a system, and FIG. 25B is a block diagram listing of the data structure for FIG. 25A. By way of example, a set of 100 outcomes could be defined in a table, e.g., prize numbers 1 through 3 are $5 wins, prize numbers 4 through 8 are $2 wins, and so forth. Assume the game is blackjack. If all of the potential prizes are available, i.e., there is at least one $5 prize, one $2 prize, etc., remaining in the set, the player's actual game play may determine the result. Once the outcome based on their game play is determined, the prize is removed from the set of possible outcomes. However, if all possible outcomes are not available, e.g., if all of the monetary prize wins have been won such that the player must lose, the system will force that outcome. In this way, the system permits game play where the player's actions can determine the outcome of the individual game, but where the outcome for a set or series of game plays is predefined.

Figure 23A:
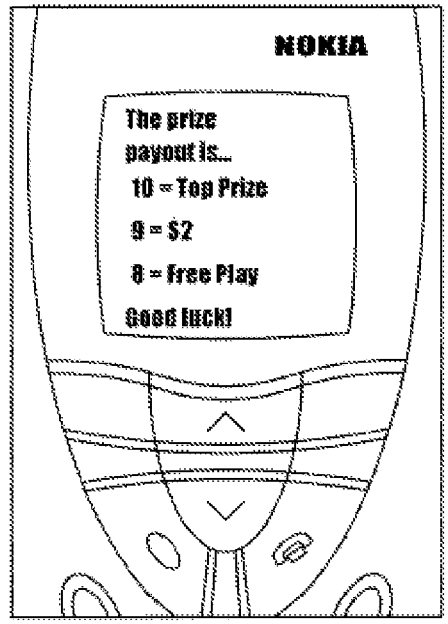
FIGS. 23A-23D depict various exemplary graphical depictions of the game termed Perfect 10.
Figure 23B:
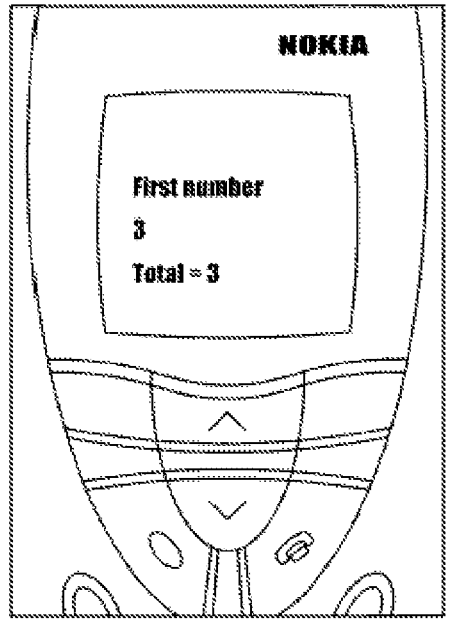
Figure 23C:
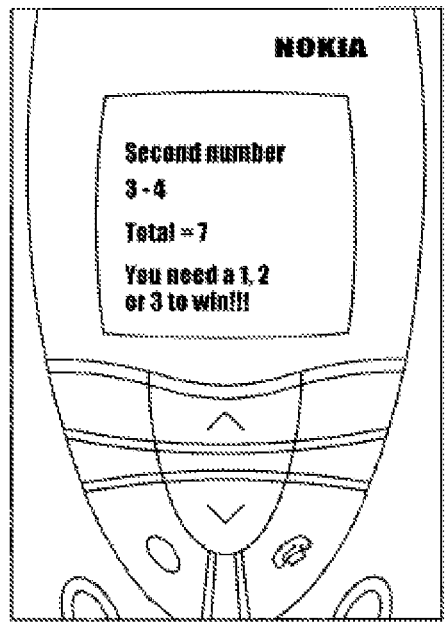
Figure 23D:
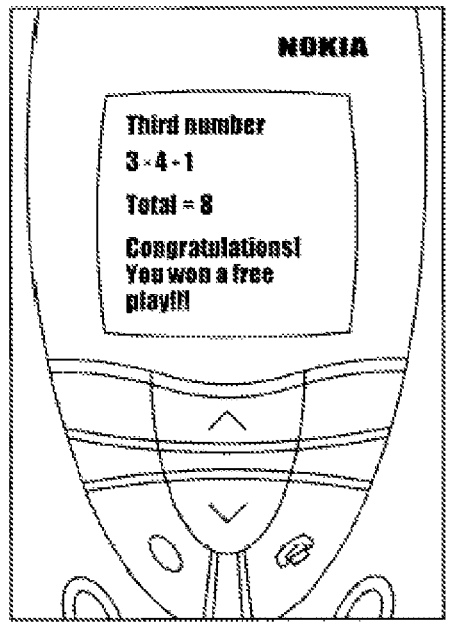

Considering FIGS. 23A and B in more detail, the first step is to define a set of outcomes. The set may be predefined prior to initial game play or may be calculated according to an algorithm during the course of play. In either event, the set of possible outcomes meet the desired prizing criteria. As shown in FIG. 25B, the prize number is associated with the prize amount. As shown, prizes 1, 2 and 3 correspond to $5 wins, prizes 4 and 5 correspond to $2 wins, and prizes 97, 98, 99 and 100 correspond to losses, i.e., $0. In this implementation, preferably, there is no predefined association of a given game play with a specific prize.

Individual game play is then initiated. The system determines whether the first step of game play can result in an unavailable outcome. In the blackjack example, if the first card dealt to the player was a 6, then no matter what card the player received as the second card could result in an unavailable outcome. Assuming the second card was an ace, the maximum total of 17 does not necessarily result in any particular outcome. Prior to the system deciding whether to draw a card, the prize table is checked to ensure that all possible outcomes are available. If they are, then the system may play blackjack in the normal manner. If however there are less than all possible outcomes remaining, e.g., all monetary prizes have been won, and so the play must lose, then the system will force that outcome. If the player has 17, the system will select and display a card totaling at least 18, and not more than 21, such that the system wins and the player loses.

When the complete set of outcomes is available, the players should be able to play the game where their actions do affect the outcome of the game. However, as the pool or set of available outcomes decreases, the system is more likely to have to force the outcome.

After an outcome is presented to the player, it is removed from the set. In this way, the game sponsor or system has a predefined pay out schedule, but individual's game play may determine the actual outcome for at least some players.

In an alternate version, game play is limited to a fixed time which is separated in time from the phase revealing the prizing status to the player. Game play proceeds, preferably in a mode where the individual player's actions may determine the outcome of the game. A set of outcomes for those games is stored. At some time, either a predetermined time or after predefined criteria have been achieved, e.g., 100 game plays having been completed, the system awards the outcomes to the players. The prizes may be assigned based upon player's relative standing compared to other players, or on any other basis desired. By associating a set of outcomes with a set of game plays, where the game play includes player's actions affecting the outcome, the game gives the player the feel of a conventional, non-electronic game, but also ensures that a predefined prizing criteria may be achieved.

FIG. 25 is a flowchart for one implementation of a multilevel prizing system and method. The various levels of game play may also include various prizing levels. In one implementation, the user may play a first game, typically for a wager, and if they win, be given the option of playing a prize board or other prizing step. The player may be given the election of whether to play the prizing step at that time, or to return to game play with the option of playing a different prizing step at a later time. Optionally, a further wager is received for the next round of game play. The prizing steps could typically be of more value as the player progressed, e.g., a Silver prize board, a Gold prize board and a Platinum prize board. The increased value could be any or all of: the minimum prize amount, a guaranteed minimum prize, the maximum prize amount, the odds of winning, or any other parameter relating to prize value. In this way, the player is presented with the opportunity to purchase, such as via the wager, a better prize level, such as a higher guaranteed prize.

Figure 26:
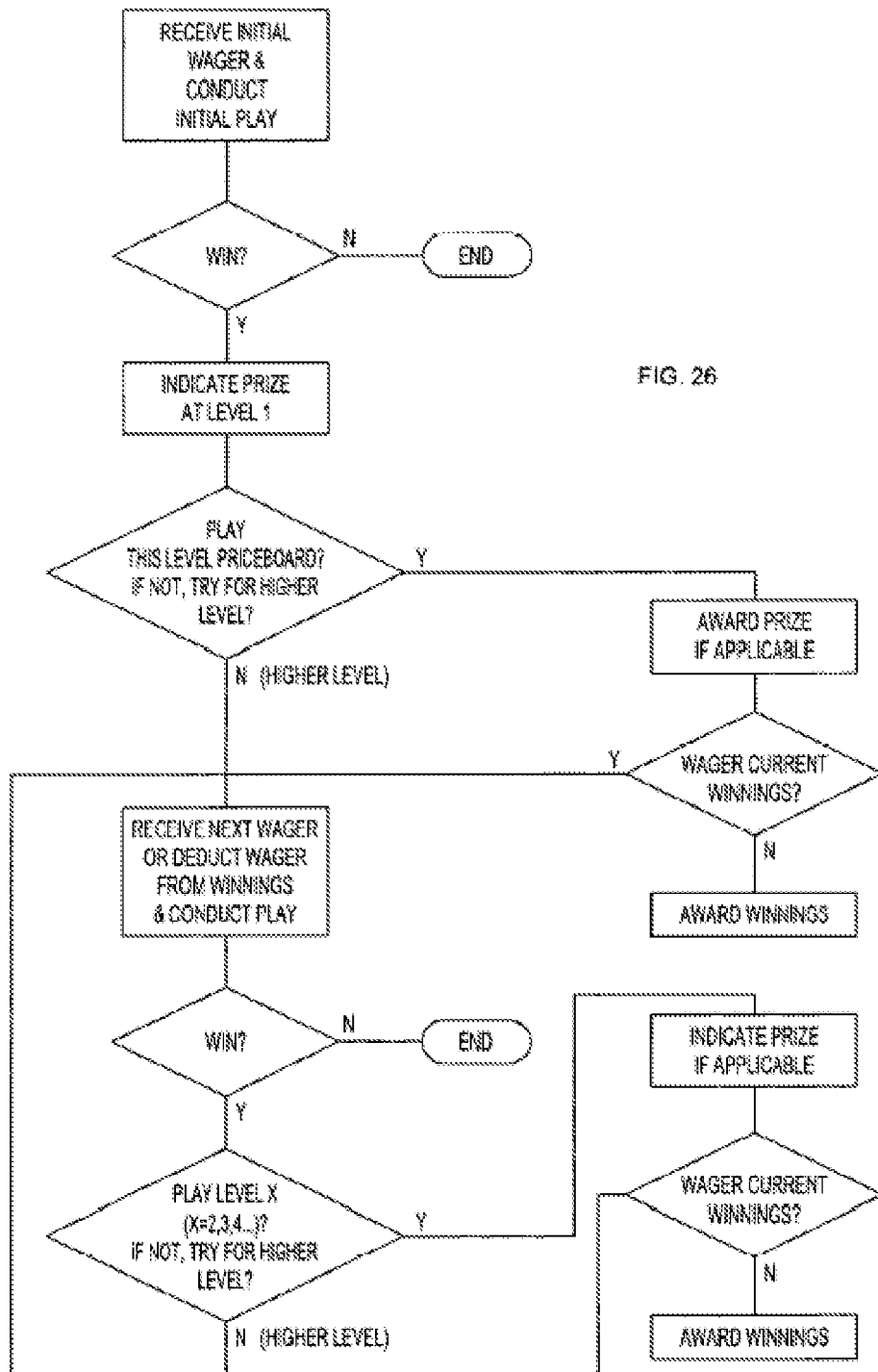
FIG. 26 is a flowchart of a system and method involving multiple levels of prizing.

FIG. 26 begins with an initial wager and initial game play. If the player wins, the system may be presented with a decision as to whether to play that prizing step at that time, at that level, or to engage in further game play with the goal of reaching a higher prizing level. Optionally, the play could make another wager for the additional game play. Alternately, the subsequent game play may not require further payment, or the player may be allowed to utilize some or all of previously revealed winnings. By requiring payment for subsequent game play, the prize amounts at higher prize levels can be increased. Alternately, the system or its operators may simply designate an additional amount of prize money or goods for use in prizing levels.

One variation on a slot machine game is Pachinko. Generally, pachinko is a game having aspect of a slot machine and pinball. The player controls the speed with which balls are put in play in the pachinko machine. While most balls pass through the machine, a relatively small number fall into special holes, the balls then entering a slot machine type system.

In yet another aspect, the system is able to monitor usage of games and to correlate the game's popularity with the prizing structure. By way of example, certain games may be more popular if there are numerous, relatively frequent low tier prizes. A game may have a guaranteed win rate of 1 out of 4 (1:4) plays for a $3 win, for example. While the game may also have a middle level or high end prize, those prizes may not be of as much interest to the player as compared to the guaranteed low end prizes. The system may monitor both usage of the game in terms of numbers of play, but may also track user specific play, such as the number of times a game is played during one contact or session, whether the player continuously plays that game without interruption, e.g., diverting to other forms of entertainment or information, and the frequency between player visits, such as to a sponsoring website. This data on game play may be utilized by the system as inputs for a decision engine to optimize the prizing structure for a desired end goal, e.g., maximizing game play and therefore sales of game plays. The system may store data on prior game play activities relative to given games, and then utilize that information, either specifically or on a statistical basis, to optimize the selection of a prizing structure. Neural networks or other adaptive networks may advantageously be used.

The system permits the monitoring of game play and market acceptance. These may be analyzed as a function of the various game play parameters and prizing parameters. Analysis may be in real time or batch basis. The system includes this mode for reporting and potential market research. By way of example, in a market research context, the system could be used with a test audience, where game play could be permitted and the various parameters monitored. Game play could be monitored, such as for player acceptance. The parameters could be varied, and the player reaction monitored for change in player acceptance. Alternately, the players may be interviewed after game play to assess levels of acceptance and/or interest, and a correlation of the results may be made relative to the game play and prizing parameters.

In yet another aspect, the game play and prizing parameters may be optimized for a subset of the population. The subset may be by geography, by time of game play, by perceived socio-economic status, by race or ethnic origin, by gender, or by source of the game play, e.g., retailer or vendor of tickets, or by any other relevant factor. The parameters may vary over time. The subgroup may be relatively large, e.g. 50% of the population, or may be a relatively small group, e.g., those with similar interest, or the subset may comprise even a single person. Further, the system may utilize information known about a player to infer optimum game play parameters. The player information may be specific as to the player, such as where the player is registered with the system, or generalized, such as where the player is not specifically identified but fits within a class, e.g., the player is a white male from age 40 to 50.

Yet another inventive aspect usable with the previously described games or in combination with other games is the for of money or value used. The games may be played either with real money, or may be played with virtual money, sometimes referred to as vCoins. A vCoin will typically be a multiplier times the corresponding numeric monetary value, e.g. one dollar equals 500 vCoins. The multiplier is typically an integer number, and is usually an amount of 100, 500 or 1000, though any amount may be used. The multiplier may be fixed over time and over games, or it may vary based on factors, such as time, game or player status. For example, play during certain times may result in 'double vCoins'. Enhanced multipliers may be used to induce play at times when other entertainment is available, e.g., sweeps weeks or prime time, as an inducement for the player to play the subject games. The multiplier may change for different games, such as where the multiplier increases where the real or perceived level of skill required is greater.

vCoins may be acquired by purchase, or may be awarded in a non-cash purchase manner such as provided for a credit, an inducement or a promotion. Other forms of non-cash value may be converted to vCoins, such as converting affinity club points or airline mileage points into vCoins.

A bonusing feature may include a vBonus, such as where a certain amount of vCoins are awarded, either as a result of game play or merely randomly. The bonusing may be unique to the player, or may be awarded over a pool of players.

The vCoins may be traded for cash or other forms of games, prizes or non-cash goods or services. They may be traded into other forms either continuously (e.g., 956 vCoins may be redeemed for $9.56) or may be redeemed in quantized or discrete amounts, e.g., vCoins may only be redeemed in groups of 1,000, corresponding to $10. vCoins may be exchanged for other valuable forms of goods or services, e.g., they may be converted into airline mileage affinity points, or directly into airline tickets, or to points in other affinity clubs or organizations.

The vCoin amounts would be stored by the system, typically the lottery system or a system operating under their supervision, direction or control. The amounts may be all treated uniformly, or may be treated differently. For example, amounts obtained from an initial non-cash purchase such as where the vCoins came as a credit or started as airline miles, may be playable but not exchanged for other forms of goods or services. Yet another options would be where vCoins may not be redeemable until 'played' a predetermined number of times, e.g. once, twice, 10 times. vCoins may be time dated, such as time of purchase or acquisition, and may be controlled based on time. For example, vCoins may expire after a certain period of time. A player may be given 60 days to play their vCoins or the expire.

vCoins provide the player with the perception of a big win since the numbers are larger than any corresponding monetary amount. Additionally, by being virtual and corresponding to electronic amounts, they may be altered or varied as desired. By being able to track specific coins, the vCoins technique leads to vastly expanded possibilities such as these.

In yet another aspect, the games may be played by an automated systems, sometimes referred to as a vBot. The player would typically set parameters for the vBot, such as defining how much to bet per game or per hand. A quick pick option may be provided.

In one aspect, a method for game play involves the use of the system electronic system environment described herein, wherein one or more virtual players are displayed to the player of the game, preferably, the virtual players have differing play characteristics, receiving from the user association with a selection of a virtual player, displaying a simulated game using the virtual players, identifying a subset of the virtual players as being winners of the simulated game, and awarding a win to the lottery user if the selected virtual player is in the subset of virtual players. In this way, the player of the game is selecting a virtual player to do the playing of the base game, thereby providing the excitement of player participation in a game of skill or chance, yet not actually be playing the game.

The virtual players may be displayed as graphical images. Such graphical images may be in the form of human images or cartoon images. The images could be of famous players, such as of famous real life sports or gaming personalities. The base game may be of any type, whether sports games or gaming. Examples of gaming would include poker, blackjack, or chess. Sports game can include, for example, tennis, football, baseball or hockey. The outcome of the simulated game may be either predetermined or not predetermined. The games may be implemented in a lottery format.

In one embodiment, the virtual players have differing play characteristics. The differing play characteristics may be revealed to the users, such as that one simulated blackjack player tends to hold at 16 or some other conservative point, whereas a competitor simulated blackjack player is more aggressive and will only hold at 18. In the event that the play characteristics are revealed to the player, compensation is made such that the probability of winning the lottery game is uniform among the lottery players. For example, a weighting may be applied to equalize the probability of winning by the virtual players. In a sports based virtual game, the weighting may be a point spread or handicap. In the event that the play characteristics are not revealed to the player, the mere selection of the virtual player will be a random event, and no additional weighting need be done.

Any number of virtual players may be used. There may be a single virtual player, such as where the question is can the basketball player make 3 free throws out of 5. There may be two virtual players, such as in a tennis game or chess game. There may be more than 2 virtual players, such as a collection of players playing card or table games. The virtual players may be organized into teams, such as where football, baseball, basketball or hockey comprises the base game.

Yet another parameter for modified and enhanced game play is the arrangement and presentation of various graphics, symbols, or icons (collectively "indicia") to the player. The arrangement of the indicia in a predefined arrangement indicates that the player has won. By way of example, a grid or array arrangement may be used wherein the winning combination is a set of indicia arranged in a line, either horizontally in a row, vertically in a column or diagonally. Other patterns using multiple adjoining segments may be used, such as an X-pattern or a T-pattern. Alternatively, a predefined patter of non-adjoining segments may be used, such as where a win includes matches in a four corners or north, south, east and west positions.

Optionally, the game may be played by a single player against the system, such as a lottery system previously described. Alternatively, the game may be a multi-player game.

Considering the single or solitary game play in an electronic environment may comprise the steps of displaying a bingo grid to the user of the system, the grid including multiple rows and columns of locations, a plurality of the locations including a unique designator, providing multiple comparative designators to the player, the multiple comparative designators being selected by the lottery system, indicating those areas of the grid in which the comparative designator matches the designators on the grid, and assigning a win to a player based upon predetermined criteria of the matches. In one embodiment, a fixed number of comparative designators are provided to the user.

Figure 27:
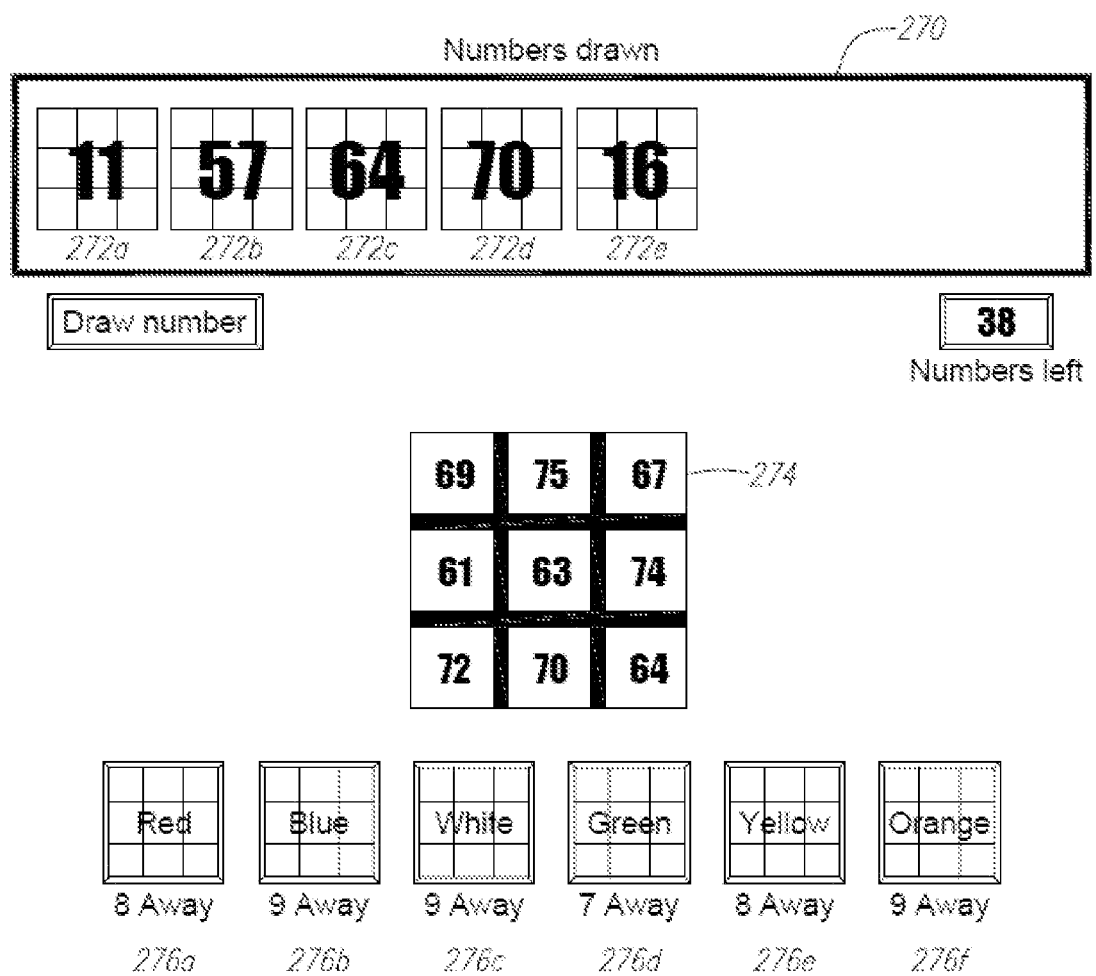
FIG. 27 is a graphical depiction of a screen for a multi-hand array based bingo style game with the denomination of Rubik's BINGO.

In yet another aspect, the multiple separate grids may be simultaneously presented to the player. FIG. 27 shows a graphical depiction of one such implementation. The upper rectangle 270 holds numbers 272a, 272b, 3tc. As shown, there are 5 numbers drawn. The numbers also have an associated color. By way of example, 272a is red, 272b is green, 272c is yellow, 272d is yellow, 272e is blue. The player has multiple cards, such as the six depicted as 276a (red), 276b (blue), 276c (white), 276d (green), 276e (yellow) and 276f (orange). The card 274 associated with the most recent draw 272e is shown in the center. In this case, 272e is blue and the blue card 274 is depicted. Optionally, the multiple grids may be arranged in a geometric pattern. One such geometric pattern is a cube and the multiple grids are arranged on the faces of the cube.

In yet another variation, the user or player may select at least some of the unique designators on the grid. As yet another variable, one or more free spaces are provided on the grid. As another alternative, the comparative designators may be obscured until selected by the user.

Yet another implementation of the indicia display system would include a word display. The display may comprise a N by 1 array or grid, such as where a single word or string of words is to be played. The correct positioning of adjacent letters reveals the winning word. The grid may be expanded into multiple dimensions, such as in a two dimensional format such as a crossword puzzle format. The parameterization systems and methods described herein may be used with this display format.

Optionally, these games may further include audio associated with game play.

Although the foregoing invention has been described in some detail by way of illustration and example for purposes of clarity and understanding, it will be readily apparent to those of ordinary skill in the art in light of the teachings of this invention that certain changes and modifications may be made thereto without departing from the spirit or scope of the appended claims.

We claim:

1. A system for electronic game play involving one or more remote users of the system having a geographic presence within a given area in an electronic environment communicating with the system through an electronic communication system, the remote users utilizing electronic communication devices having one or more displays, the displays providing at least graphical images of players, the electronic communication devices having input capability and generate an output including electronic game play data corresponding to the input, the electronic communication devices having graphical display capabilities on the one or more displays, the system being coupled to a live event generating real time data, comprising:
   a control processor to process and store:
      (1) communications of the electronic game play data from the electronic communication devices to the system,
      (2) information regarding the geographic presence of the remote users within a given area and to prevent game play within the given area, and
      (3) mandated and variable parameters for use in the electronic game play, wherein the mandated parameters represent parameters which must be achieved by the system as a whole, and the variable parameters represent parameters characterizing at least one of: a game structure and a prizing structure,
   memory for storing a registration of the remote users,
   memory for storing the graphical images of players,
   a play server and memory to:
      (1) process and store an indication of a selection of graphical images of players by the remote users, the selection being communicated by the output of the electronic communication devices over the electronic communication system, the play server using the selections in combination with the electronic game play data and a first set of variable parameters to determine a first game play experience, and
      (2) modify the variable parameters to provide a second set of variable parameters providing a second game play experience, where the first game play experience differs from the second game play experience,
   a decision engine for performing game analytics on the electronic game play,
   an input permitting entry of the live event real time data, and
   a prizing system, the prizing system being coupled to the input permitting entry of the live event real time data, to award a win to the remote users determined by the prizing system based in at least part on the live event real time data.

2. The system for electronic game play of claim 1 further including memory for storing information on differing play characteristics related to the players.

3. The system for electronic game play of claim 1 wherein the electronic game play is a sports game.

4. The system for electronic game play of claim 1 further including use of virtual currency.

5. The system for electronic game play of claim 1 further including memory for storing player's club information.

6. The system for electronic game play of claim 5 wherein the player's club information includes information on a monetary amount.

7. The system for electronic game play of claim 5 wherein the player's club information includes information on non-cash prizes.

8. The system for electronic game play of claim 1 wherein the decision engine for performing game analytics tracks user specific play.

9. The system for electronic game play of claim 1 wherein the decision engine for performing game analytics serving at least to optimize a prizing system, the game play data being utilized by the optimized prizing system to determine a prize for the remote users of the system.

10. The system for electronic game play of claim 1 wherein the graphical images of players includes human images.

11. The system for electronic game play of claim 10 wherein the human images are of sports personalities.

12. The system for game play of claim 1 wherein the control processor enforces a limit on an amount of game play by the remote users.

13. The system for game play of claim 12 wherein the limit is based on time.

14. The system for game play of claim 12 wherein the limit is based on a monetary amount.

15. The system for game play of claim 1 wherein the game play server communicates to the remote users probability information regarding the live event real time data.

16. The system for electronic game play of claim 1 wherein the game play server utilizes a threshold value to change from the first game play experience to the second game play experience.

17. The system for electronic game play of claim 16 wherein the threshold value includes information on length of time played.

18. The system for electronic game play in an electronic environment of claim 16 wherein the threshold value includes information on frequency of play.

19. The system for electronic game play of claim 16 wherein the threshold value includes information on money played over time.

20. The system for electronic game play of claim 16 wherein the threshold value includes information on a number of plays since a last win.

21. The system for electronic game play of claim 16 wherein the first set and second set of variable parameters are set based on a comparison of game play information of two or more game play experiences to the threshold value.

22. The system for electronic game play of claim 1 wherein the first set and second set of variable parameters are set based on a comparison of game play information across multiple remote users electronic communication devices.

23. The system for electronic game play of claim 1 wherein the game play data includes information on a loss.

24. The system for electronic game play of claim 1 wherein the game play data includes information on a series of outcomes.

25. The system for electronic game play of claim 1 wherein the game play data includes information on a number of wins.

26. The system for electronic game play of claim 1 wherein the game play data includes information on a first game play event.

27. The system for electronic game play of claim 1 wherein the game play data includes information on the remote users geographic presence within a given area.

28. The system for electronic game play of claim 27 wherein the system limits game play to a given geography.

29. The system for electronic game play of claim 1 wherein the game play data includes information on a user's age.

30. The system for electronic game play of claim 1 wherein the game play data includes information tracking a user's play.

* * * * *